US011503251B2

(12) United States Patent
Pflug et al.

(10) Patent No.: US 11,503,251 B2
(45) Date of Patent: Nov. 15, 2022

(54) VEHICULAR VISION SYSTEM WITH SPLIT DISPLAY

(71) Applicant: MAGNA ELECTRONICS INC., Auburn Hills, MI (US)

(72) Inventors: Goerg Pflug, Weil der Stadt (DE); Achim Gieseke, Gross-Umstadt (DE); Bernhard Thaler, Munich (DE); Christian Traub, Windach (DE); Johannes Wolf, Aschaffenburg (DE); Joern Ihlenburg, Berlin (DE); Martin Rachor, Heimbuchenthal (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 401 days.

(21) Appl. No.: 16/392,036

(22) Filed: Apr. 23, 2019

(65) Prior Publication Data
US 2019/0253672 A1 Aug. 15, 2019

Related U.S. Application Data

(63) Continuation of application No. 14/372,524, filed as application No. PCT/US2013/022119 on Jan. 18, 2013, now abandoned.
(Continued)

(51) Int. Cl.
*H04N 7/18* (2006.01)
*G06F 3/04815* (2022.01)
(Continued)

(52) U.S. Cl.
CPC ............. *H04N 7/181* (2013.01); *B60R 11/04* (2013.01); *G06F 3/017* (2013.01);
(Continued)

(58) Field of Classification Search
CPC ............... B60R 11/04; B60R 2300/105; B60R 2300/20; B60R 2300/03; B60R 2300/602; G06F 3/017; G06F 3/04815; H04N 7/181
(Continued)

(56) References Cited

U.S. PATENT DOCUMENTS

| 5,550,677 | A | 8/1996 | Schofield et al. |
| 5,670,935 | A | 9/1997 | Schofield et al. |

(Continued)

FOREIGN PATENT DOCUMENTS

| DE | 102004037644 A1 | 2/2005 |
| DE | 102009025205 A1 | 4/2010 |

(Continued)

OTHER PUBLICATIONS

International Search Report and Written Opinion dated Apr. 8, 2013 for corresponding PCT Application No. PCT/US2013/022119.
(Continued)

*Primary Examiner* — Kathleen V Nguyen
(74) *Attorney, Agent, or Firm* — Honigman LLP

(57) ABSTRACT

A vehicular vision system includes a plurality of cameras disposed at a vehicle and having respective exterior fields of view, and a display screen for displaying images derived from captured image data in a surround view format where captured image data is merged to provide a single composite display image from a virtual viewing position. A control includes a processor that processes image data captured by the cameras to detect an object present in the field of view of at least one of the cameras. During a driving maneuver of the vehicle, the display screen displays surround view video images and responsive to detection of the object, the display screen displays an enlarged view of the detected object.

19 Claims, 48 Drawing Sheets

Related U.S. Application Data

(60) Provisional application No. 61/678,375, filed on Aug. 1, 2012, provisional application No. 61/602,878, filed on Feb. 24, 2012, provisional application No. 61/588,833, filed on Jan. 20, 2012.

(51) Int. Cl.
*G06F 3/04883* (2022.01)
*B60R 11/04* (2006.01)
*G06F 3/01* (2006.01)

(52) U.S. Cl.
CPC ...... *G06F 3/04815* (2013.01); *G06F 3/04883* (2013.01); *B60R 2300/105* (2013.01); *B60R 2300/20* (2013.01); *B60R 2300/303* (2013.01); *B60R 2300/602* (2013.01)

(58) Field of Classification Search
USPC .......................................................... 348/148
See application file for complete search history.

(56) References Cited

U.S. PATENT DOCUMENTS

| | | | |
|---|---|---|---|
| 5,949,331 | A | 9/1999 | Schofield et al. |
| 7,038,577 | B2 | 5/2006 | Pawlicki et al. |
| 7,161,616 | B1 * | 1/2007 | Okamoto ............... B60R 1/00 348/148 |
| 7,295,904 | B2 | 11/2007 | Kanevsky et al. |
| 7,720,580 | B2 | 5/2010 | Higgins-Luthman |
| 7,855,755 | B2 | 12/2010 | Weller et al. |
| 7,859,565 | B2 | 12/2010 | Schofield et al. |
| 7,914,187 | B2 | 3/2011 | Higgins-Luthman et al. |
| 7,952,564 | B2 | 5/2011 | Hurst et al. |
| 8,044,776 | B2 | 10/2011 | Schofield et al. |
| 8,154,529 | B2 | 4/2012 | Sleeman et al. |
| 8,336,777 | B1 * | 12/2012 | Pantuso ............... G02B 27/017 235/404 |
| 2004/0085448 | A1 | 5/2004 | Goto et al. |
| 2005/0163383 | A1 | 7/2005 | Kim et al. |
| 2009/0244017 | A1 | 10/2009 | Pala et al. |
| 2009/0273563 | A1 * | 11/2009 | Pryor ..................... B60K 35/00 345/157 |
| 2010/0134264 | A1 * | 6/2010 | Nagamine ............. B60Q 9/005 340/435 |
| 2011/0012830 | A1 | 1/2011 | Yeh |
| 2011/0090149 | A1 * | 4/2011 | Larsen .................. A63F 13/10 345/158 |
| 2011/0311108 | A1 | 12/2011 | Badino et al. |
| 2012/0162427 | A1 | 6/2012 | Lynam |
| 2012/0218412 | A1 * | 8/2012 | Dellantoni .......... G01C 21/3602 348/148 |
| 2013/0038732 | A1 | 2/2013 | Waite et al. |
| 2013/0286193 | A1 | 10/2013 | Pflug |
| 2014/0218529 | A1 | 8/2014 | Mahmoud et al. |
| 2014/0285666 | A1 | 9/2014 | O'Connell et al. |
| 2014/0336876 | A1 | 11/2014 | Gieseke et al. |
| 2015/0009010 | A1 | 1/2015 | Biemer |
| 2015/0022664 | A1 | 1/2015 | Pflug et al. |
| 2015/0156383 | A1 | 6/2015 | Biemer et al. |
| 2015/0232030 | A1 | 8/2015 | Bongwald |
| 2015/0294169 | A1 | 10/2015 | Zhou et al. |

FOREIGN PATENT DOCUMENTS

| | | |
|---|---|---|
| DE | 102009009047 A1 | 8/2010 |
| DE | 102010010912 A1 | 12/2010 |
| EP | 2136346 A2 | 12/2009 |
| WO | 2009117632 A1 | 9/2009 |
| WO | 2010099416 A1 | 9/2010 |
| WO | 2010144900 A1 | 12/2010 |
| WO | 2011028686 A1 | 3/2011 |
| WO | 2012006189 A2 | 1/2012 |
| WO | 2012075250 A1 | 6/2012 |
| WO | 2012145822 A1 | 11/2012 |
| WO | 2013016409 A1 | 1/2013 |
| WO | 2013019707 A1 | 2/2013 |
| WO | 2013074604 A2 | 5/2013 |
| WO | 2013086249 A2 | 6/2013 |
| WO | 2015117904 A1 | 8/2015 |
| WO | 2015117905 A1 | 8/2015 |
| WO | 2015117906 A1 | 8/2015 |

OTHER PUBLICATIONS

Klefenz, "Real-Time Calibration-Free Autonomous Eye Tracker," Fraunhofer Institute for Digital Media Technology IDMT, Ilmenau University of Technology, Dept. Biosignal Processing, Germany, IEEE, 2010.

Kong et al., "Accurate Iris Segmentation Based on Novel Reflection and Eyelash Detection Model," Biometrics Technology Centre, Proceedings of 2001 International Symposium on Intelligent Multimedia, Video and Speech Processing, May 2-4, 2001, Hong Kong.

Wildes et al., "A System for Automated Iris Recognition," David Sarnoff Research Center, Inc., Princeton, NJ 08543, IEEE, 1994.

\* cited by examiner virtual View direction
Sceneplay time arrow
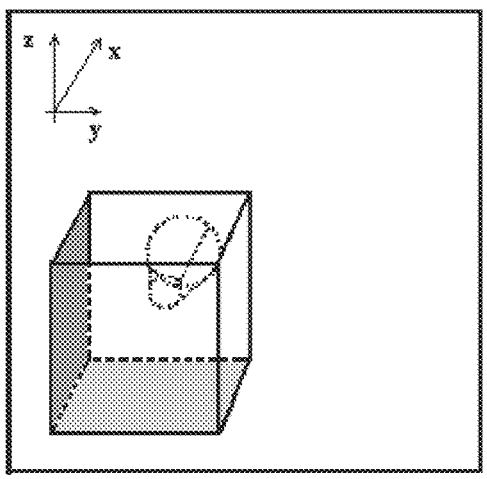
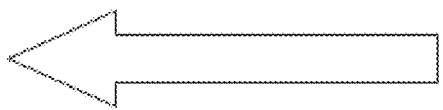
| Tipping point | 1st finger's (e.g. thumb) initial position | 1st finger's end position | 2nd finger's (e.g. index finger) initial position | 2nd finger's end position | finger's moving path |
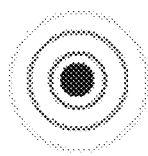     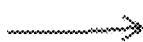
Touch screen
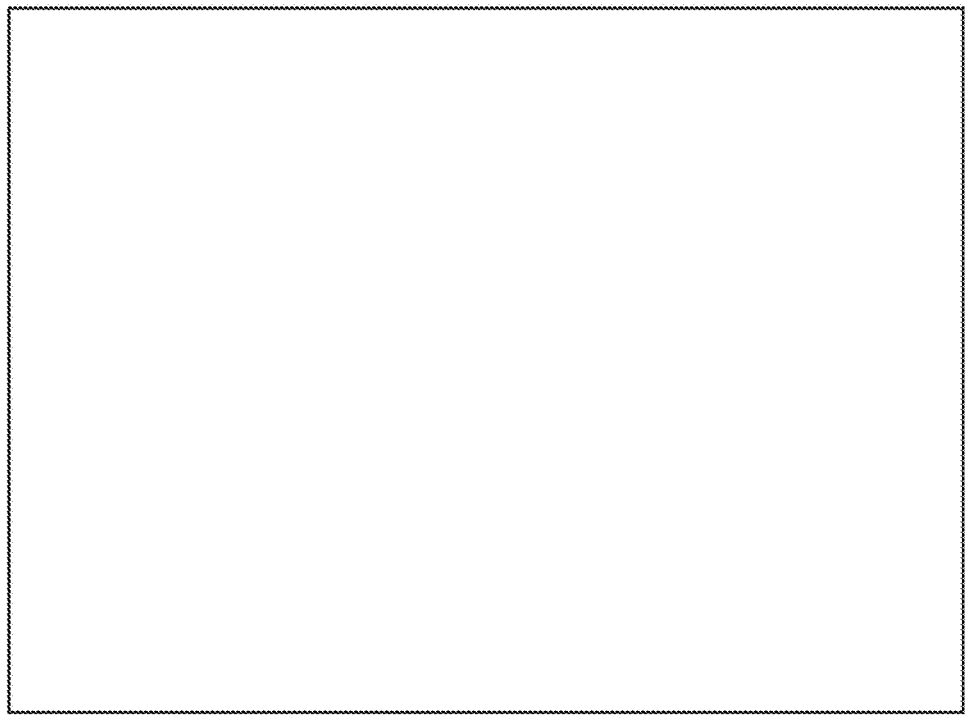
FIG. 2A

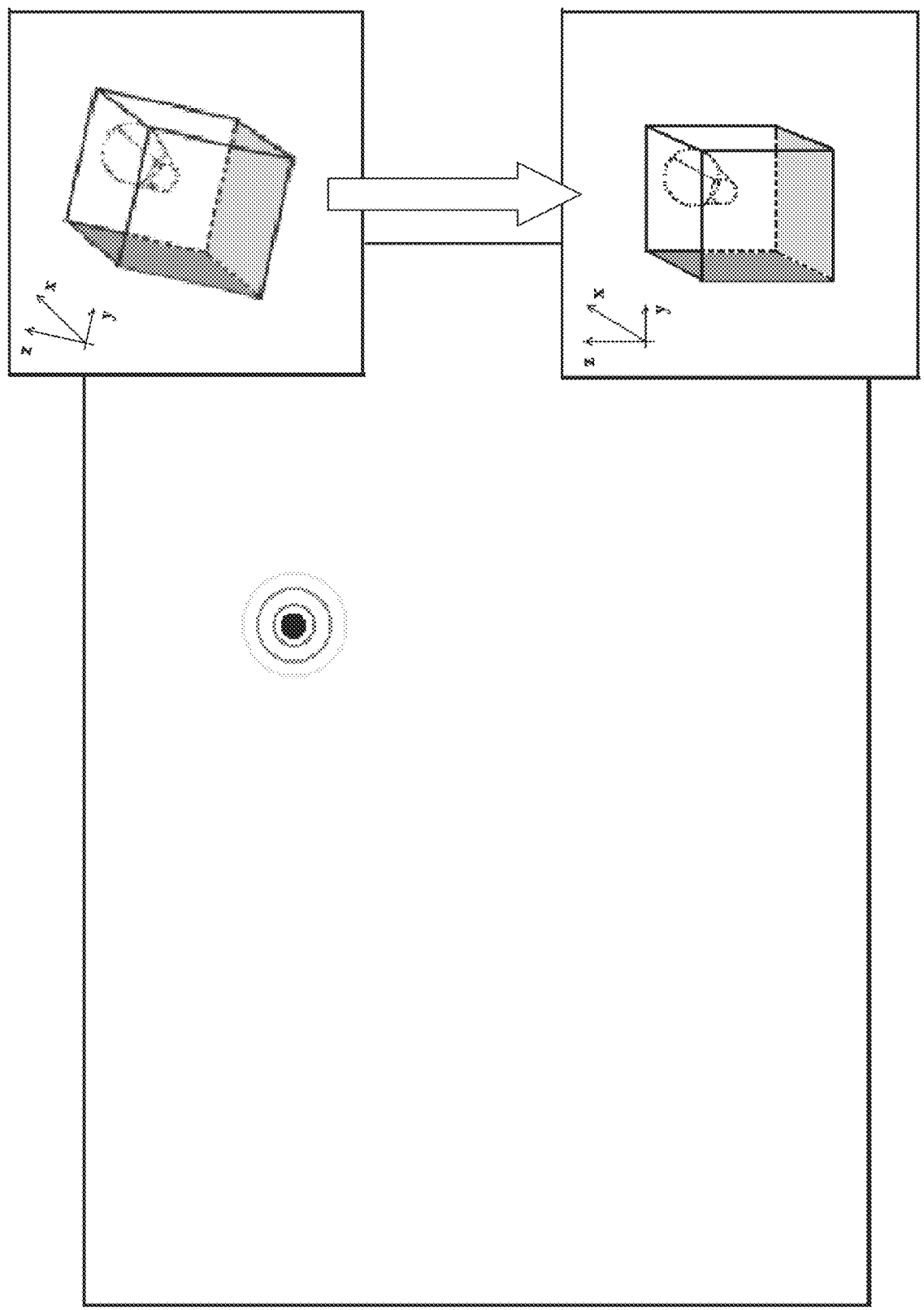

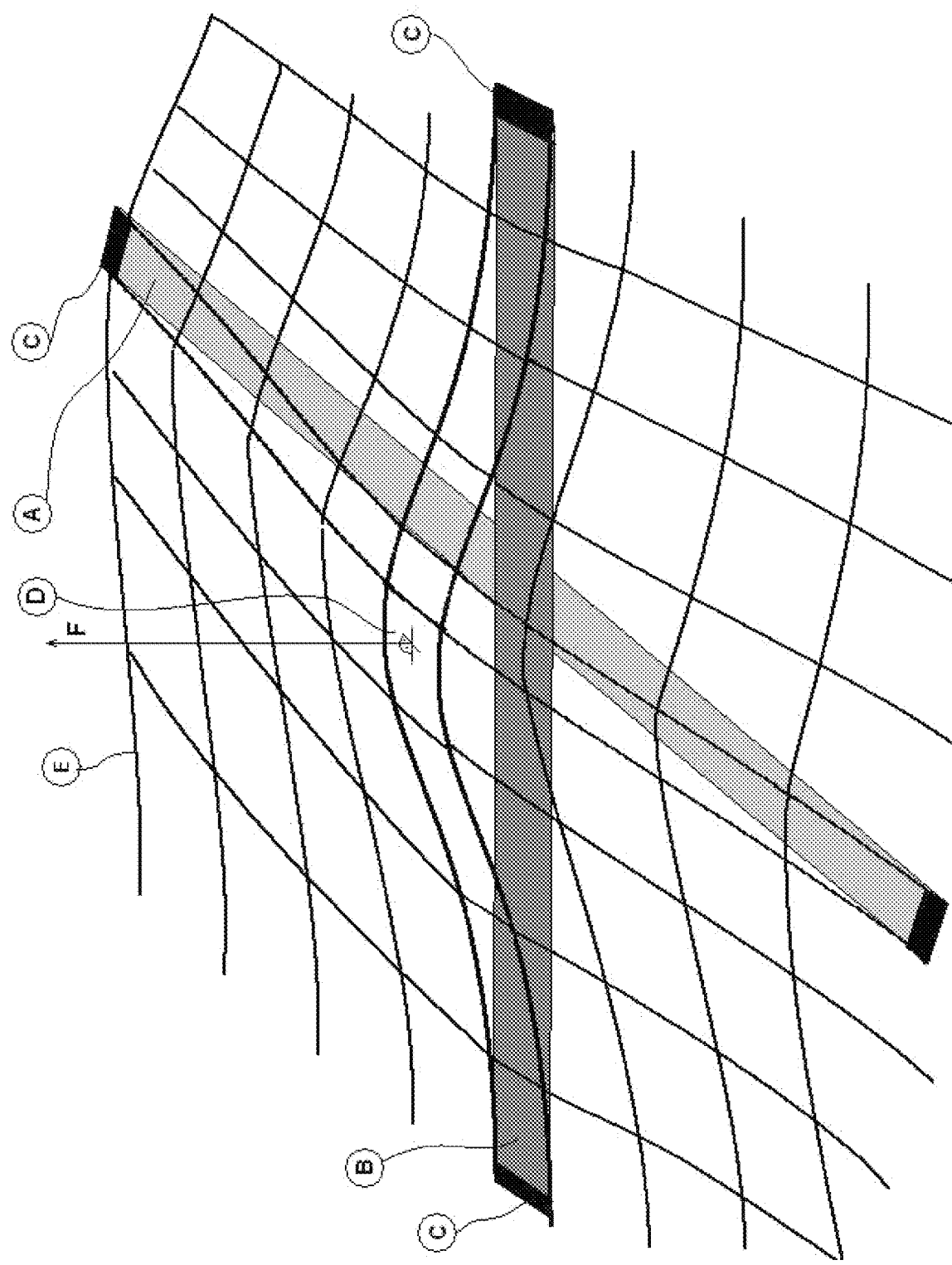

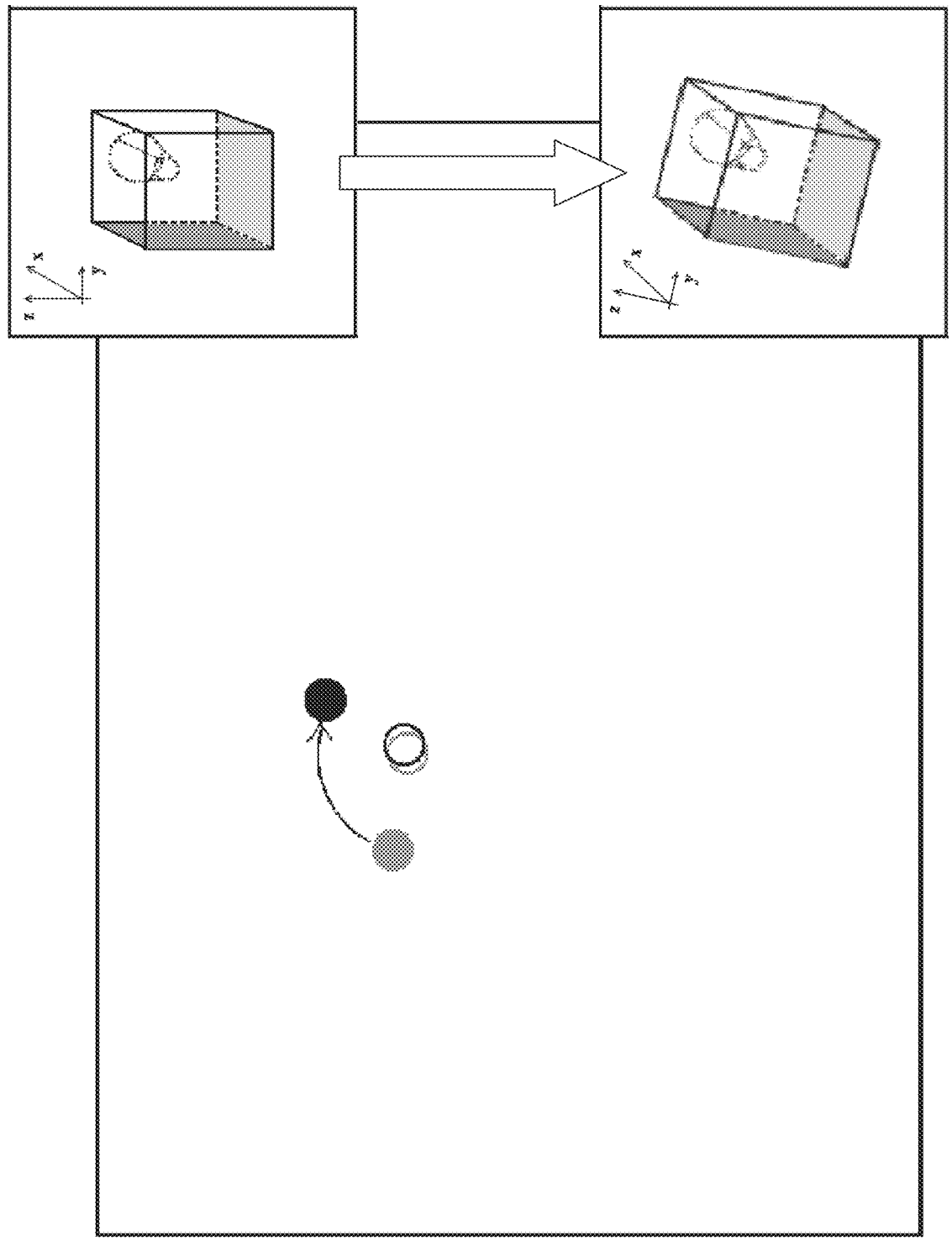

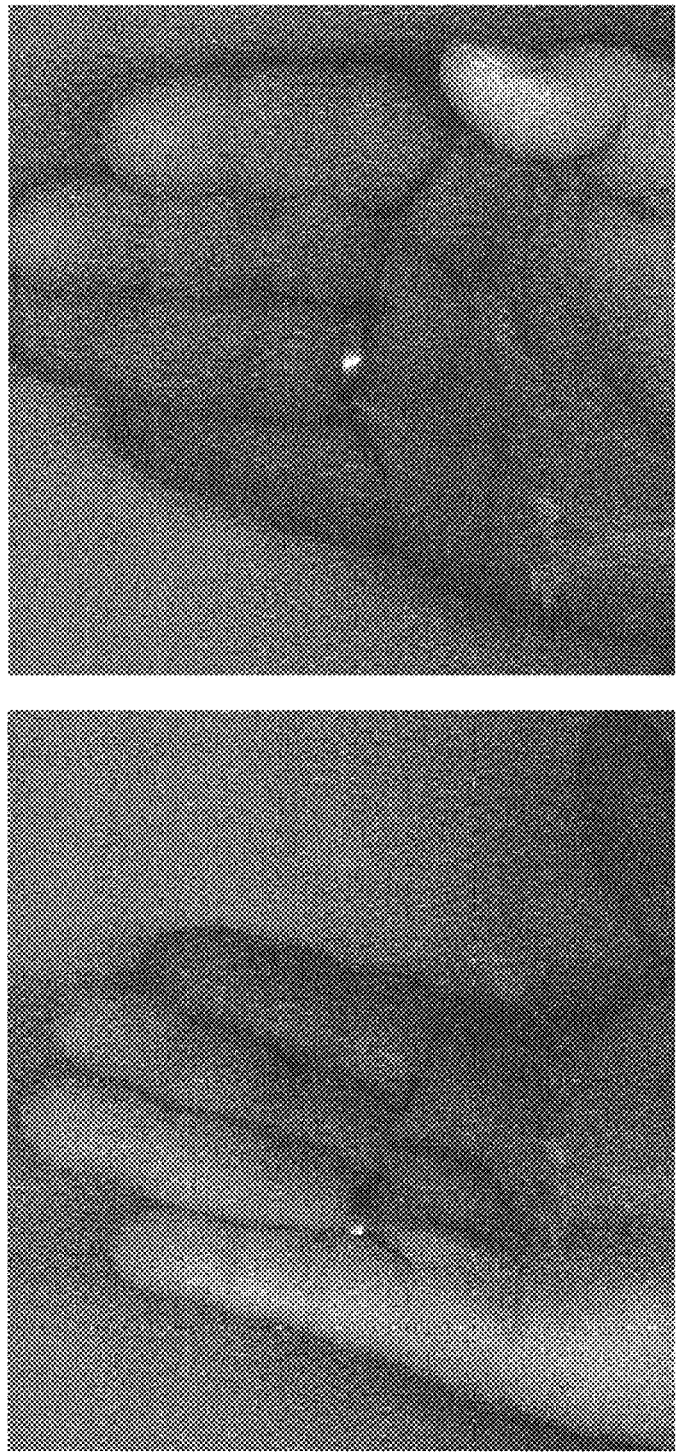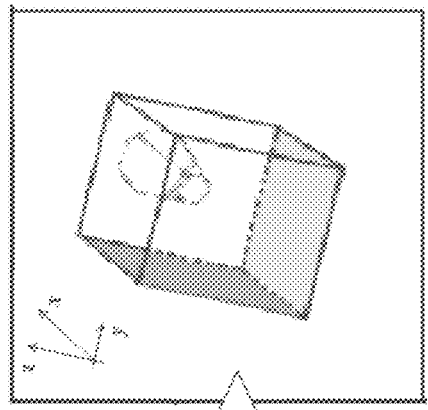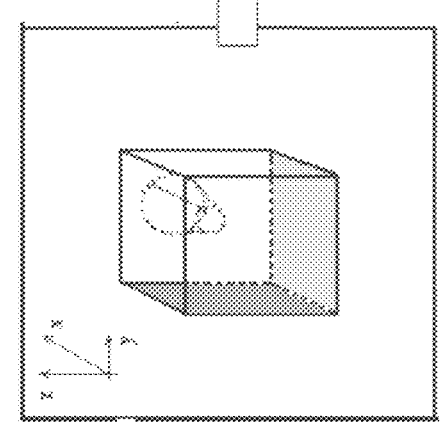
FIG.9B

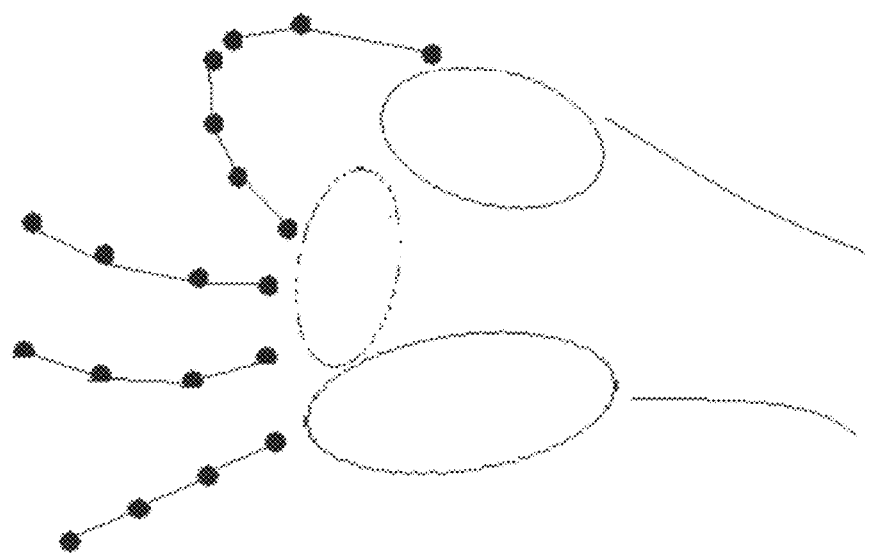
FIG. 9C
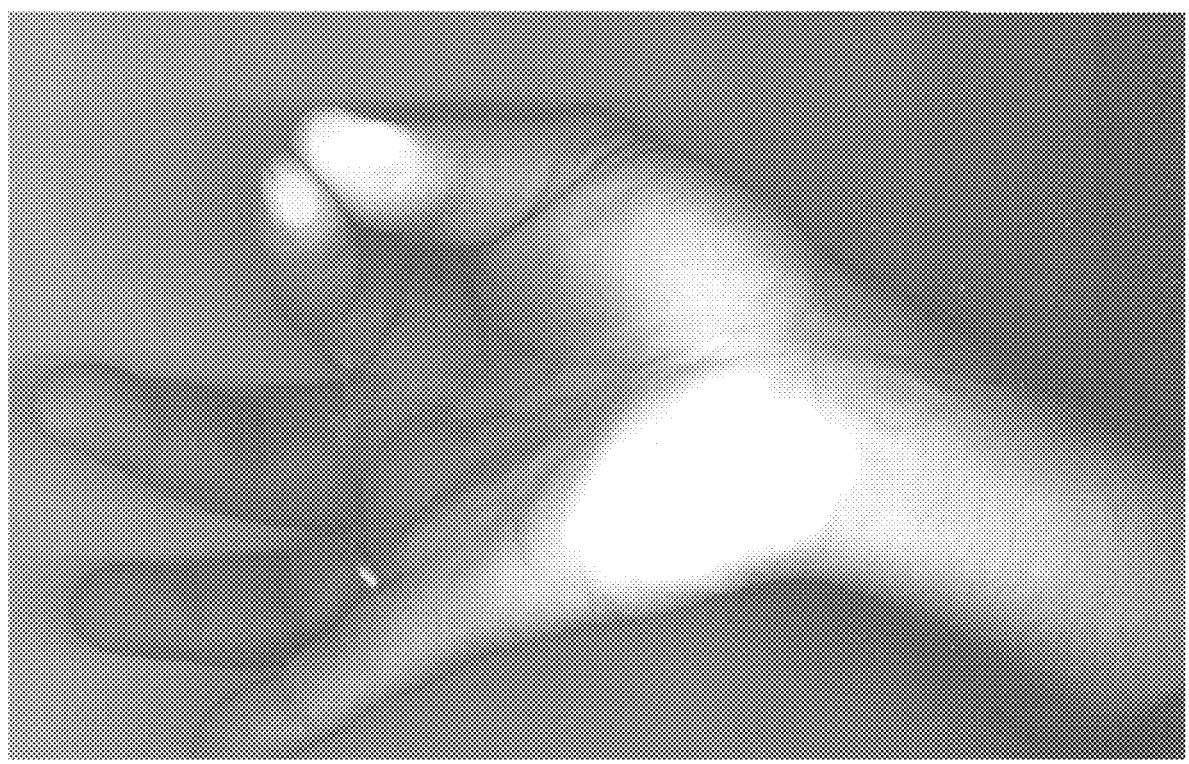

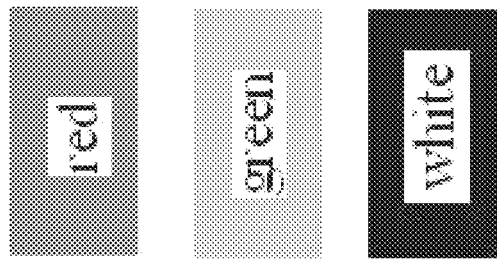
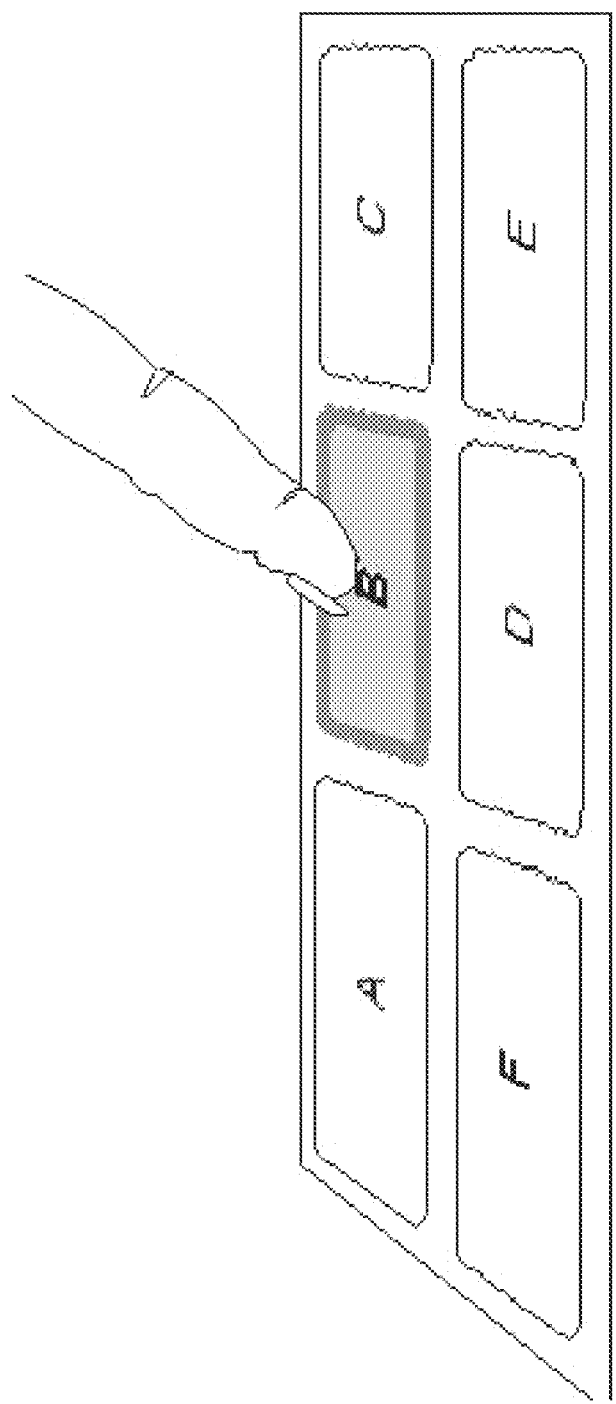
FIG.9G

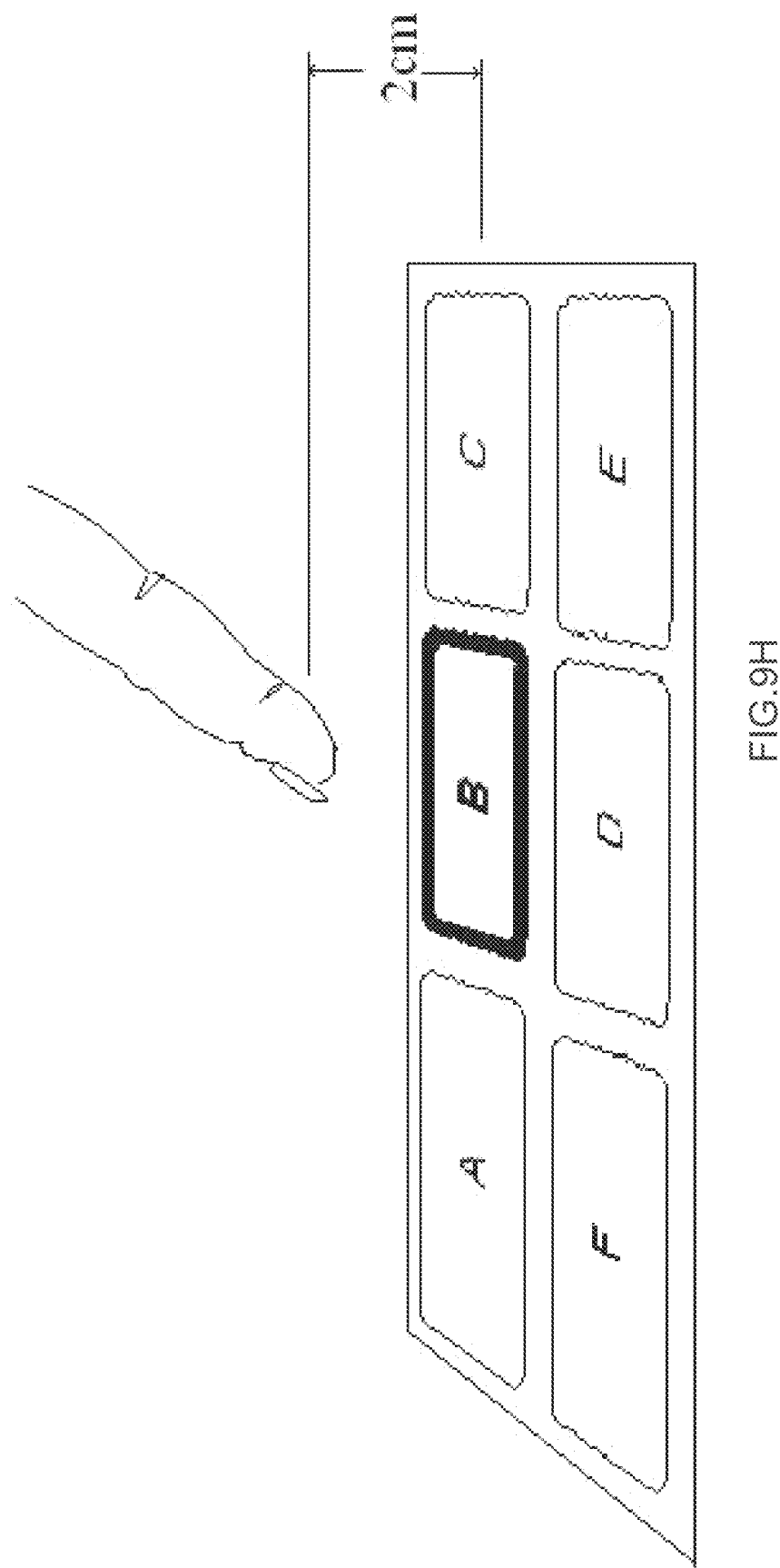

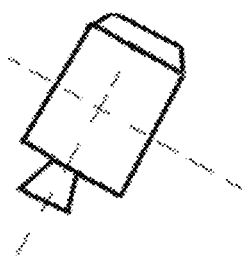
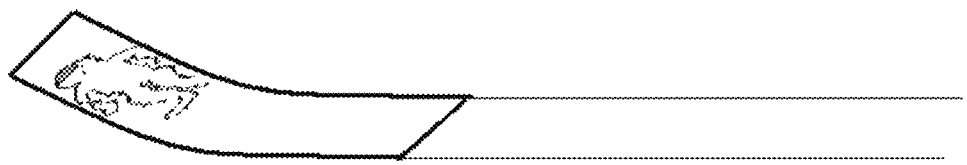
FIG. 23B
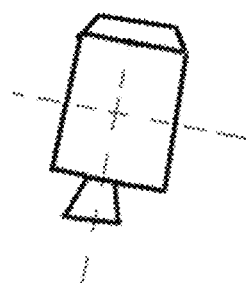
FIG. 23C
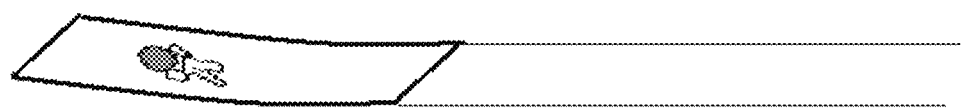

VEHICULAR VISION SYSTEM WITH SPLIT DISPLAY

CROSS REFERENCE TO RELATED APPLICATIONS

The present application is a continuation of U.S. patent application Ser. No. 14/372,524, filed Jul. 16, 2014, which is a 371 national phase filing of PCT Application No. PCT/US2013/022119, filed Jan. 18, 2013, which claims the filing benefit of U.S. provisional applications, Ser. No. 61/678,375, filed Aug. 1, 2012, Ser. No. 61/602,878, filed Feb. 24, 2012, and Ser. No. 61/588,833, filed Jan. 20, 2012, which are hereby incorporated herein by reference in their entireties.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras to capture images exterior of the vehicle, and provides the communication/data signals, including camera data or image data that may be displayed or processed to provide the desired display images and/or processing and control, depending on the particular application of the camera and vision or imaging system. The present invention provides a touch screen or user input that allows the driver of the vehicle to selectively adjust the displayed images, such as to adjust the virtual viewing angle or viewing point or to zoom or pan the image, in order to provide the desired displayed images to the driver for the particular driving condition or scenario.

According to an aspect of the present invention, a vehicle vision system includes a plurality of cameras at the vehicle and having exterior fields of view (such as forwardly, rearwardly and sidewardly of the vehicle) and a display screen for displaying images captured by the cameras, such as in a top view or surround view format (where the images are merged or synthesized to provide a single composite display image from a virtual viewing angle). The system includes a control that is operable to adjust the virtual viewing point or virtual viewing angle or the degree of zoom or degree of panning or the like of the displayed images to provide a desired or appropriate display to the driver of the vehicle to assist the driver of the vehicle during a particular driving maneuver or operation. The control is responsive to a touch screen or a gesture interface or touch sensitive user input that detects a touch or approach of a driver's finger (either gloved or non-gloved) and allows the driver to adjust the displayed images by touching and/or moving one or more fingers at the touch screen to at least one of zoom or pan or adjust a virtual viewing point or adjust a virtual viewing angle or the like. The touch screen may have actuators for applying a haptic feedback to the driver's touch inputs.

These and other objects, advantages, purposes and features of the present invention will become apparent upon review of the following specification in conjunction with the drawings.

BRIEF DESCRIPTION OF THE DRAWINGS

FIG. 2A illustrates a legend for reference in connection with FIGS. 3-17;

FIG. 3A is an example of an inventive embodiment of a touch screen controlling a driver assistant virtual view, with the case shown in which a tipping triggers a realigning) or redirecting of viewing angles of the virtual view, and with the virtual viewing direction and position of 'before' and 'after' doing the sliding action illustrated in the boxes on the side;

FIG. 3I is the touch screen actuator pad of FIG. 3H, showing the muscles in region (D) controlled to actuation, such that the screen bends outbound in that region;

FIG. 3J is a schematic perspective view of the region (D) of the touchscreen actuator pad of FIG. 3I;

FIG. 9A is an example of a case of the invention's embodiment, showing the TILT, sidewards turning of the virtual view point controlled by a two finger sliding action, with the virtual viewing direction and position of 'before' and 'after' doing the sliding action illustrated in the boxes on the side;

FIG. 9B is an example of a case of the invention's embodiment, showing the TILT, sidewards turning of the virtual view point controlled by a ROL gesture command, with the virtual viewing direction and position of 'before' and 'after' executing the ROL command illustrated in the boxes at the lower portion of FIG. 9B;

FIG. 9C is an example of PICK gesture command, closing the index finger and thumb finger tips of the right hand seen from underneath, with a real hand's image shown side by side a schematized hand at the same position reduced to the basics that the gesture algorithm may compute to discriminate relevant phalanges, with each joint reduced to a point;

FIG. 9G shows the projected key area from FIG. 9F in a stimulated condition with a closing finger within a distance of 2 cm, with the projection illumination, borderline size and font width increased.

FIG. 9H shows the projected key area from FIGS. 9F and 9G in a switched condition with a finger just tipping at the key areas surface, with the projection illumination changing the color (from white to red) and the keys inside changing from deilluminated to green;

FIG. 15 is a consecutive example to an inventive embodiment from FIG. 14, showing that the driver may input the two finger slide command for CLOSING up or zooming in;

FIG. 23B is similar to FIG. 23A, but shows that the virtual view point has risen (either by manual input, automated by the system or because the viewer has elevated his viewing angle by raising his or her head which was captured by a head/eye tracking system) in comparison to FIG. 23A, and the virtual projection pane (the imposter) has been bent down further to stay orthogonal;

FIG. 23C is similar to FIG. 23A, but shows that the virtual view point has risen furthermore in comparison to FIGS. 23A and 23B, and shows that the virtual projection pane (the imposter) has been bent down to nearly horizontal;

DESCRIPTION OF THE PREFERRED EMBODIMENTS

A driver assist system and/or vision system and/or object detection system and/or alert system may operate to capture images exterior of the vehicle and process the captured image data to detect objects at or near the vehicle and in the predicted path of the vehicle, such as to assist a driver of the vehicle in maneuvering the vehicle in a rearward direction. The object detection may utilize detection and analysis of moving vectors representative of objects detected in the field of view of the vehicle camera, in order to determine which detected objects are objects of interest to the driver of the vehicle, such as when the driver of the vehicle undertakes a reversing maneuver.

Figure 1:
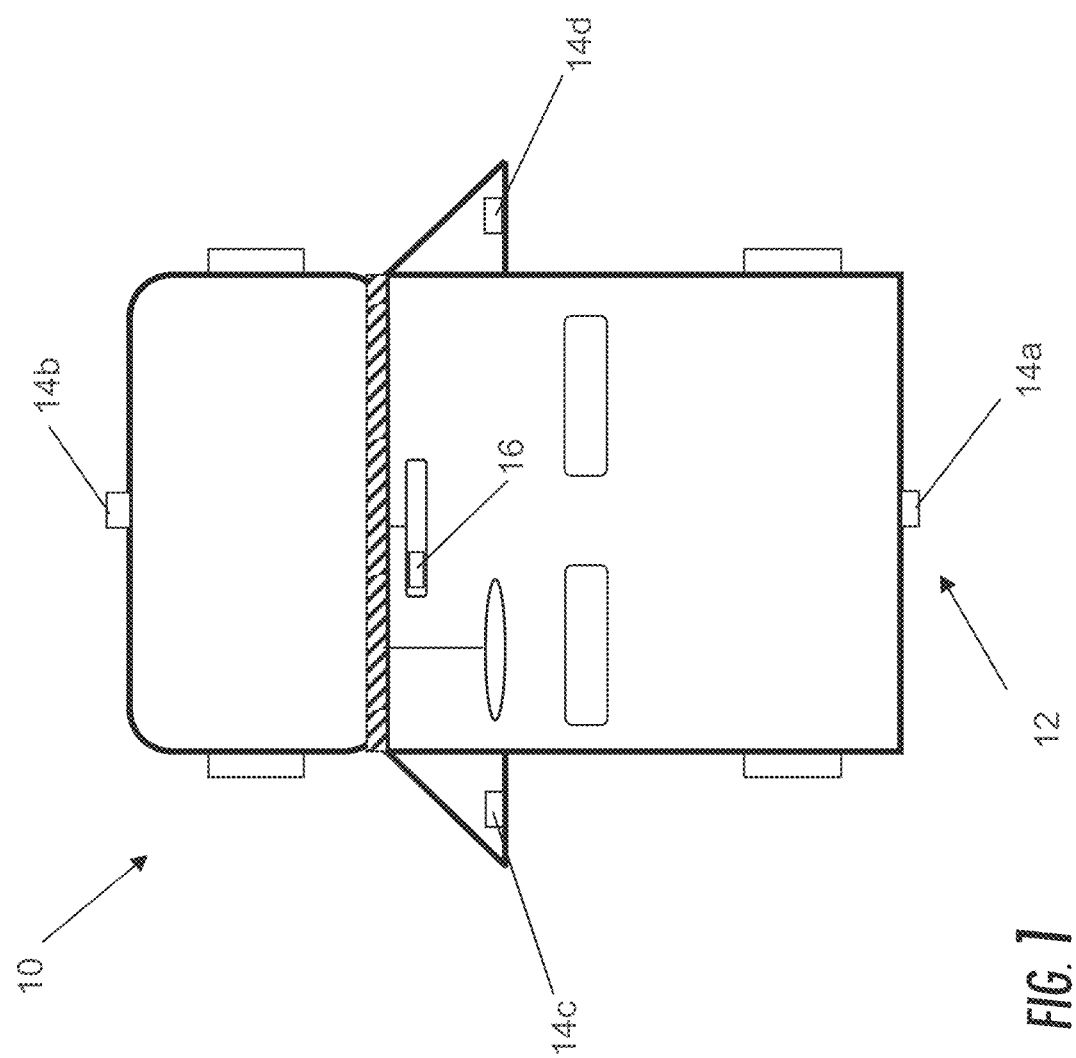
FIG. 1 is a plan view of a vehicle with a vision system and imaging sensors or cameras that provide exterior fields of view in accordance with the present invention.

Referring now to the drawings and the illustrative embodiments depicted therein, a vehicle 10 includes an imaging system or vision system 12 that includes one or more imaging sensors or cameras (such as a rearward facing imaging sensor or camera 14a and/or a forwardly facing camera 14b at the front (or at the windshield) of the vehicle, and/or a sidewardly/rearwardly facing camera 14c, 14b at the sides of the vehicle), which capture images exterior of the vehicle, with the cameras having a lens for focusing images at or onto an imaging array or imaging plane of the camera (FIG. 1). The vision system 12 is operable to process image data captured by the cameras and may provide displayed images at a display device 16 for viewing by the driver of the vehicle. Optionally, the vision system may process image data to detect objects, such as objects to the rear of the subject or equipped vehicle during a reversing maneuver, or such as approaching or following vehicles or vehicles at a side lane adjacent to the subject or equipped vehicle or the like.

Driver assistant vehicle vision systems featuring virtual top views are known (such as described in U.S. Pat. No. 7,161,616 and/or PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US11/62834, filed Dec. 1, 2011 and published Jun. 7, 2012 as International Publication No. WO 2012-075250, and/or PCT Application No. PCT/US2012/048800, filed Jul. 30, 2012, and published on Feb. 7, 2013 as International Publication No. WO 2013/019707, and/or PCT Application No. PCT/CA2012/000378, filed Apr. 25, 2012, and published Nov. 1, 2012 as International Publication No. WO 2012/145822, and/or PCT Application No. PCT/US2012/064980, filed Nov. 14, 2012, and published May 23, 2013 as International Publication No. WO 2013/074604, and/or PCT Application No. PCT/US2012/068331, filed Dec. 7, 2012, and published Jun. 13, 2013 as International Publication No. WO 2013/086249, and/or U.S. patent application Ser. No. 13/333,337, filed Dec. 21, 2011, now U.S. Pat. No. 9,264,672, and/or U.S. provisional application Ser. No. 61/613,651, filed Mar. 21, 2012, and/or German Publication Nos. DE102009025205A1 and DE102010010912A1, and/or European Publication No. EP000002136346A2, which are all hereby incorporated herein by reference in their entireties). Such top view systems are used for assisting the driver while backing up the vehicle, filling in blind spots for safe turning of the vehicle and/or the like.

Figure 4:
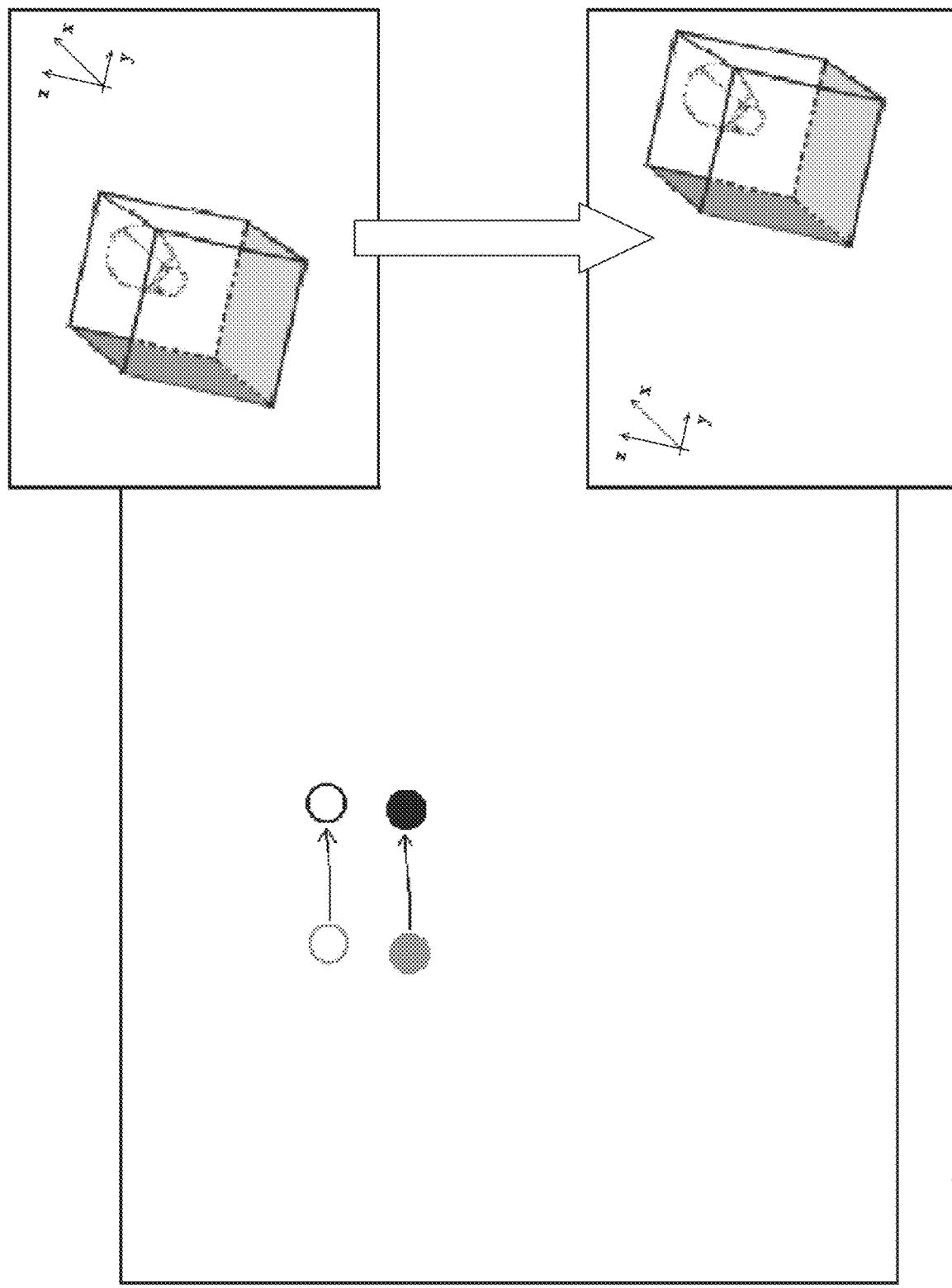
FIG. 4 is an example of a case of the invention's embodiment, showing the TRAVERSING of the virtual viewing point controlled by a two finger slide sidewards, with the virtual viewing direction and position of 'before' and 'after' doing the sliding action illustrated in the boxes on the side.
Figure 5:
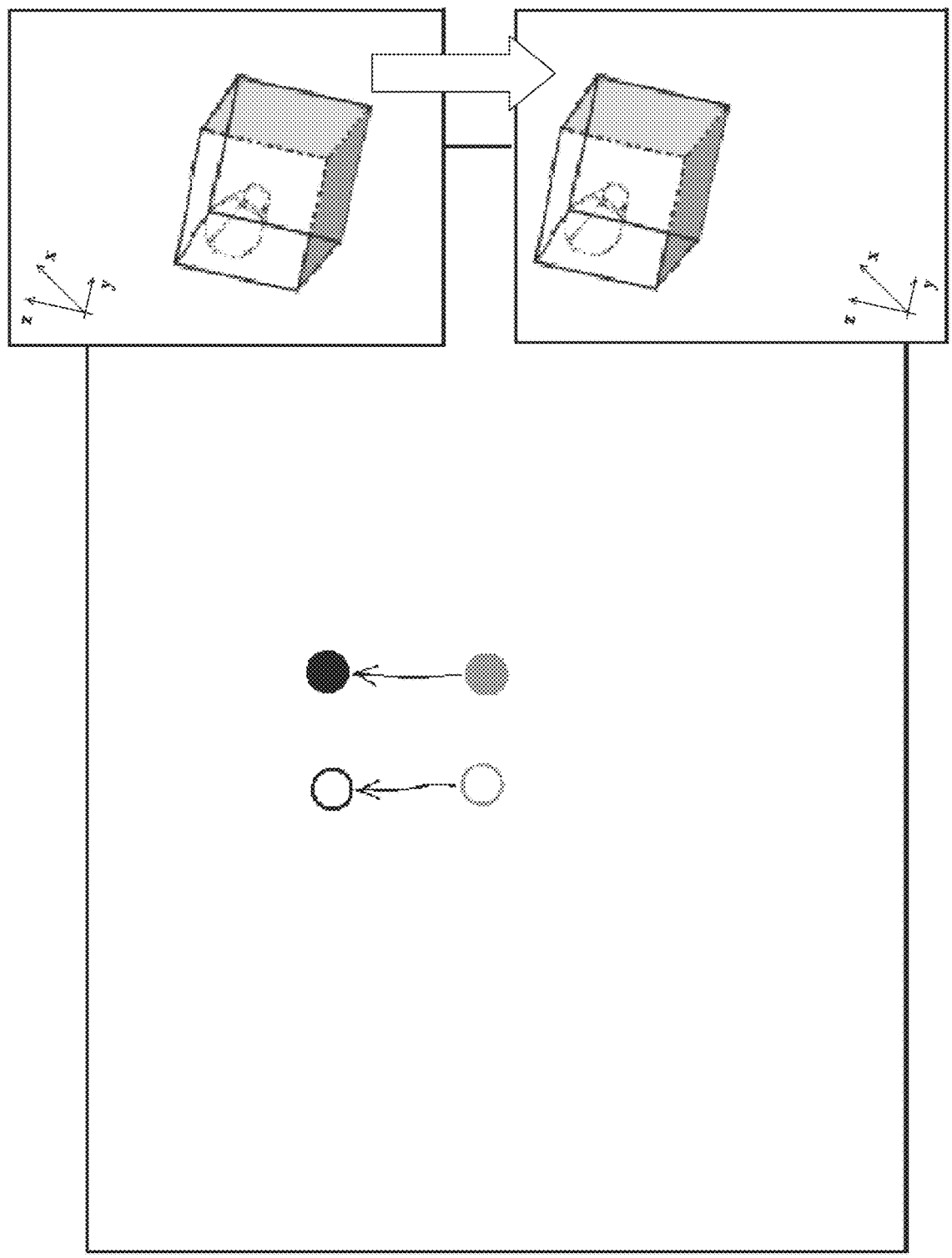
FIG. 5 is an example of a case of the invention's embodiment, showing the changing of the viewing HEIGHT of the virtual viewing point controlled by a two finger slide upwards, with the virtual viewing direction and position of 'before' and 'after' doing the sliding action illustrated in the boxes on the side.
Figure 6:
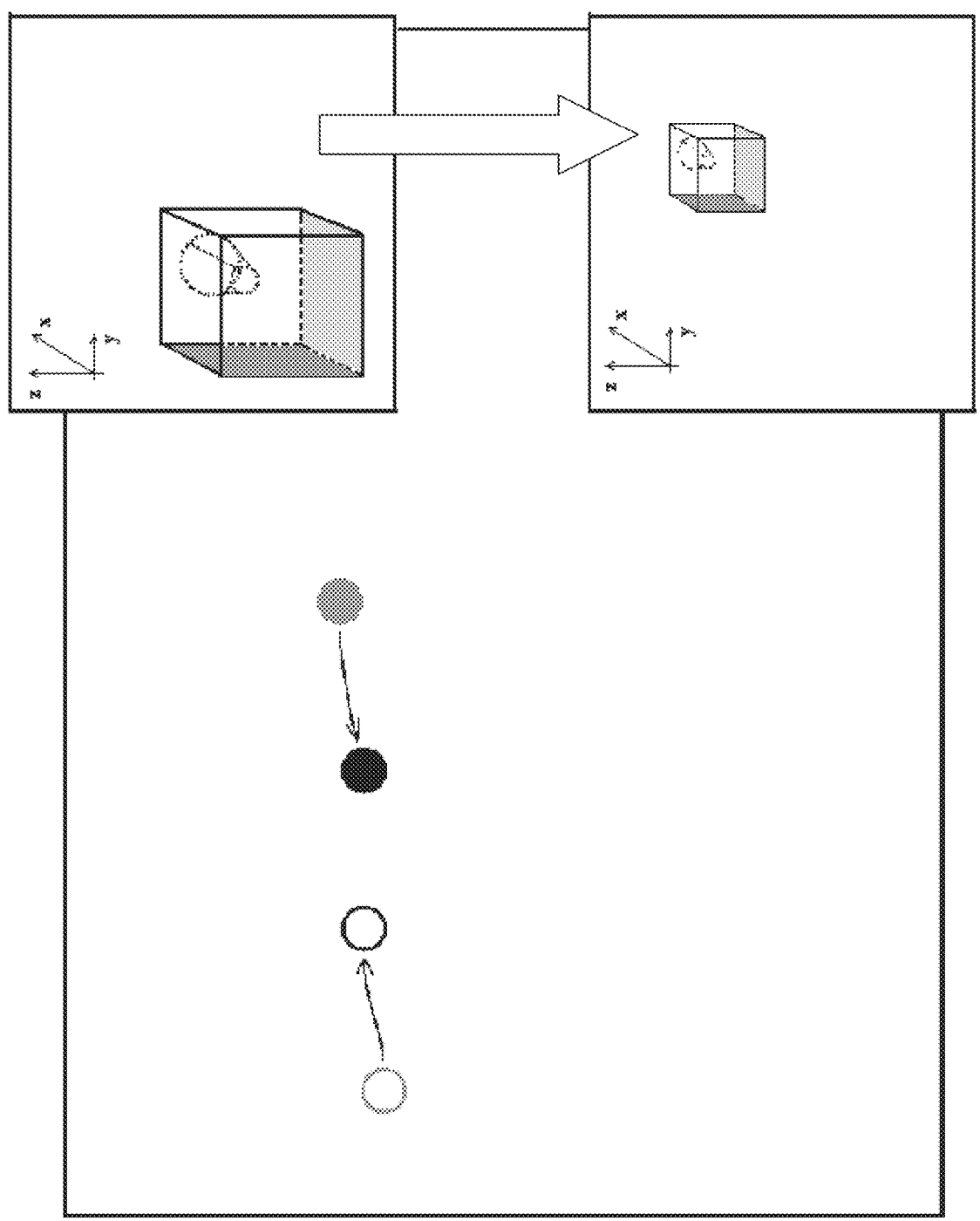
FIG. 6 is an example of a case of the invention's embodiment, showing the DEPARTING, so the increase of view distance to an object of the virtual viewing point controlled by a two finger slide in direction of one another, with the virtual viewing direction and position of 'before' and 'after' doing the sliding action illustrated in the boxes on the side.
Figure 27:
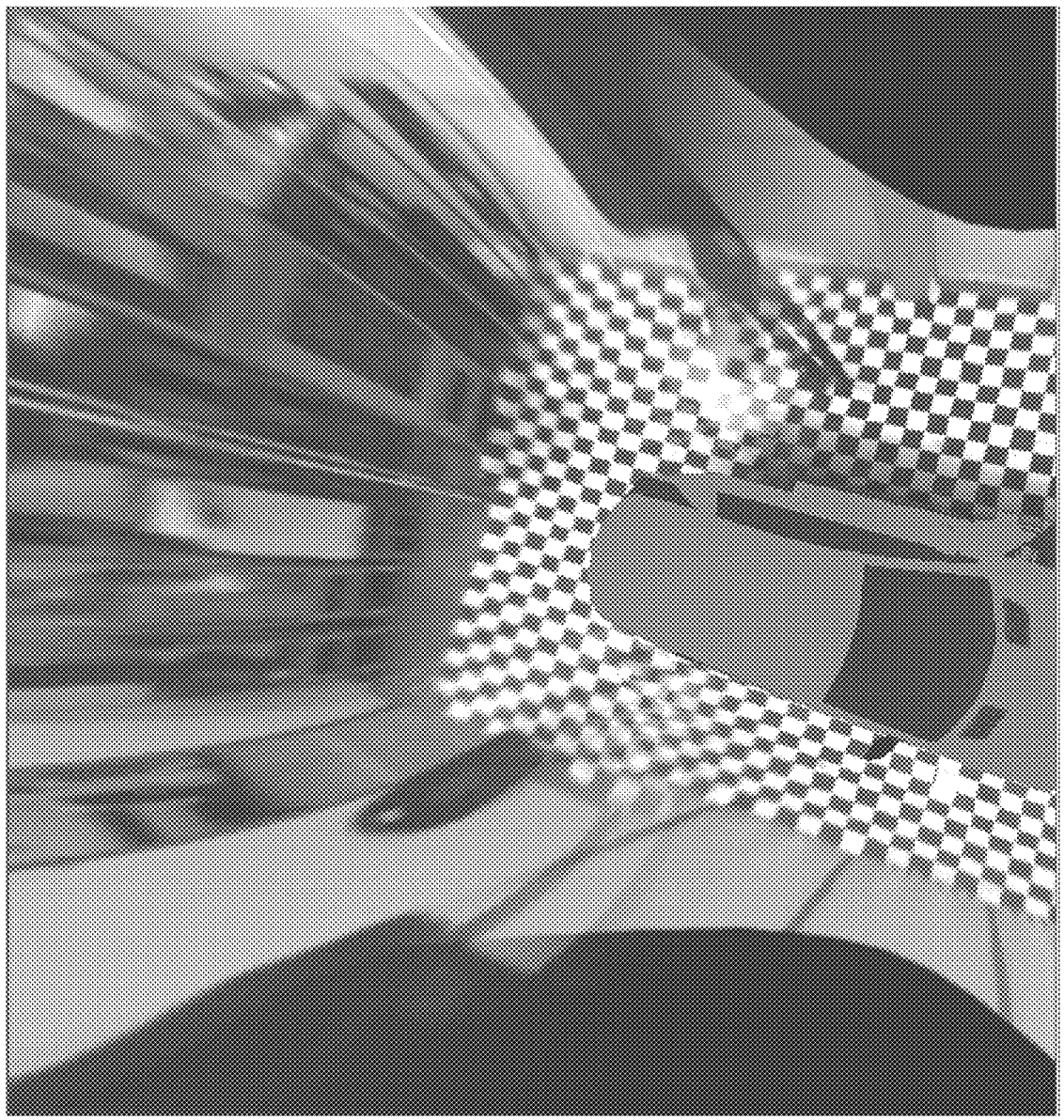
FIG. 27 shows a virtual top view, with the source images taken from the vehicle wide angle view cameras 14a, 14b, 14c, 14a, from FIG. 1 for composing the virtual image which is projected to a bowl shape virtual projection pane, shown with the view to the rear, shifted to the front left in an angle.
Figure 28:
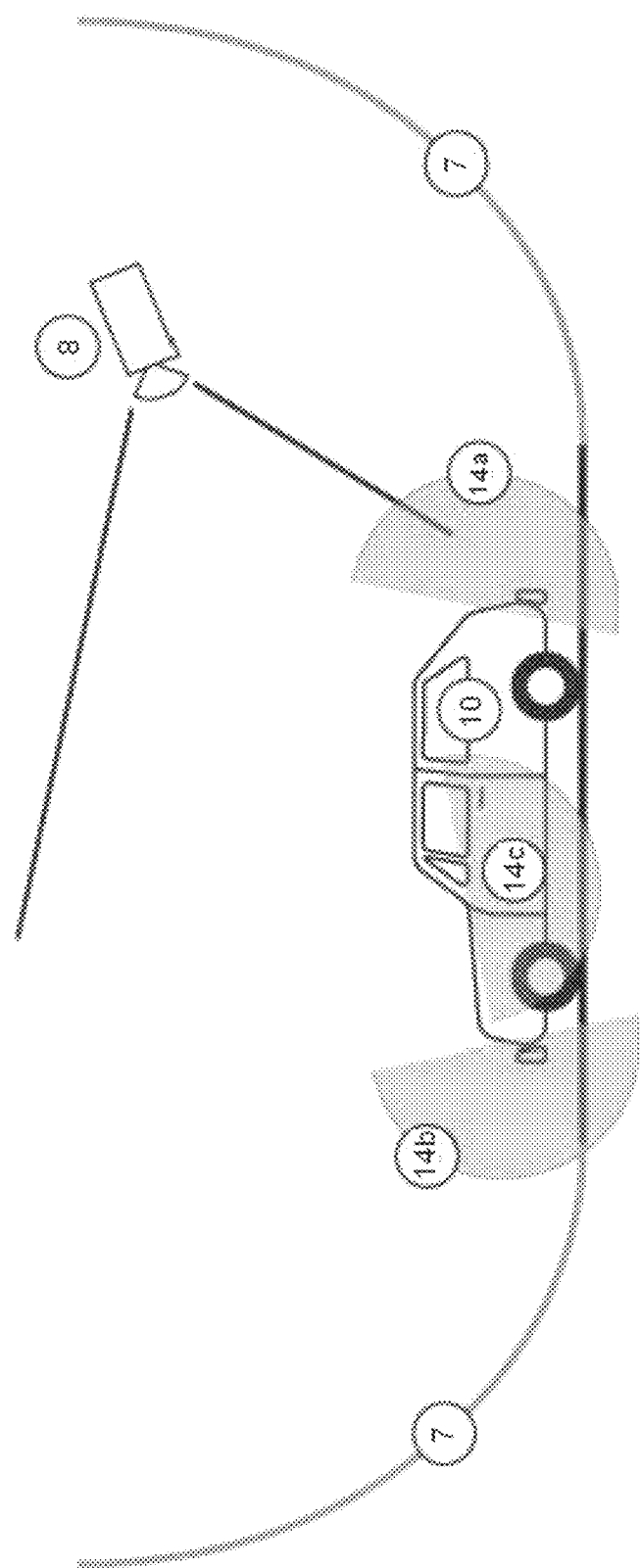
FIG. 28 is a two dimensional (2D) schematic of the virtual top view shown in FIG. 27, with the virtual bowl shape projection pane (7) shown, and with the elevated view from the rear of the virtual camera (or virtual viewpoint) (8) schematized and the camera's (14a, 14b, 14c) viewing angle schematized in gray as well.

It is known to generate a top view by synthesizing images captured by multiple vehicle incorporated cameras in a bowl like shape (such as described in U.S. Pat. No. 7,161,616, such as at FIG. 33 and FIG. 50 of U.S. Pat. No. 7,161,616). It is also known to use different z-x angles of the virtual viewpoint looking at the car body (such as described in U.S. Pat. No. 7,161,616, such as at FIGS. 20A-20D of U.S. Pat. No. 7,161,616), and/or to have a view from the top (z direction) to specific sections (such as described in German Publication No. DE102009025205A1, such as at FIG. 4, and/or U.S. Pat. No. 7,161,616, such as at FIG. 27D of U.S. Pat. No. 7,161,616) and/or having virtual view point highs (z-direction), such as described in U.S. Pat. No. 7,161,616, such as at FIGS. 19A-19F of U.S. Pat. No. 7,161,616).

The system described in U.S. Pat. No. 7,161,616, provides or includes preselected virtual viewpoints which mappings are precalculated and stored in look up tables. All virtual viewpoint angles are tilted in a x-z angle, no angles other than 0 degrees are provided into y-direction. Views onto other preselected regions beside the center of the vehicle body are disclosed in German Publication No. DE102009025205A1, but there is no tilt angle in the y-direction involved, just a shift of the virtual viewpoint in x-y-z direction.

Procedures for adapting the virtual projection plane according the virtual viewpoint's elevation for receiving plausible projection views are also described in PCT Application No. PCT/US2012/048110, filed Jul. 25, 2012, and published on Jan. 31, 2013 as International Publication No. WO 2013/016409, which is hereby incorporated herein by reference in its entirety.

Overlays and highlighting of hazards around the vehicle are also described in German Publication No. DE102010010912A1 and/or U.S. Pat. No. 7,161,616, which are hereby incorporated by reference in their entireties.

Receiving remote destination data, particularly parking spot coordinates is described in European Publication No. EP000002136346A2. The disclosure of EP000002136346A2 does not reveal any intention or method for judging the feasibility or quality of the pointed parking spots. There may be gaps which are big enough in the size, but still not relevant to consider, due to areas where parking is prohibited or impossible.

Motion parallax (or parallax scrolling) is a natural optical effect. It can be used artificially when trying to give a more or less flat scene a depth view impression comparable to a stage having flat paper coulisses in the foreground and background of a scene play. More technically, but in a similar manner, this effect can be used in computer games (see, for example, http://en.wikipedia.org/wiki/Parallax_scrolling). Such parallax scrolling is a special scrolling technique typically used in computer graphics, wherein background images move by the camera slower than foreground images, creating an illusion of depth in a 2D video game and adding to the immersion. See also, the short video at 'http://www.youtube.com/watch?v=Jd3-eiid-Uw', which shows a so called 'fake 3D' effect based on motion parallax under synchronization to the viewer's head or eye movement. For such a fake 3D effect, an appliance is required for tracking the head of the watching person. On conventional single 2D display systems just one person can enjoy the fake 3D effect at a time. Parallax mapping (see, for example, http://en.wikipedia.org/wiki/Parallax_mapping), which is also referred to as offset mapping or virtual displacement mapping, is an enhancement of the bump mapping or normal mapping techniques applied to textures in 3D rendering applications such as video games.

In vehicle systems, a vision system may be operable to track the driver's eye, such as for determining a gaze direction or determining drowsiness of the driver. For example, systems are used for detecting the driver's drowsiness are disclosed in U.S. Publication No. US-2005-0163383 (which is hereby incorporated herein by reference in its entirety), and systems for controlling airbag deployment are disclosed in U.S. Publication No. US-2004-0085448 (which is hereby incorporated herein by reference in its entirety), or a vision system may adjust the view or alignment on head up display overlays to the outside scene, or may control airbag deployment or control a camera and/or illumination source of the vehicle (such as described in U.S. Pat. No. 7,914,187, which is hereby incorporated herein by reference in its entirety) and/or the like.

Also, German Publication No. DE102009009047A1 (which is hereby incorporated herein by reference in its entirety) describes how a three dimensional (3D) scene can become segmented into two dimensional (2D) layers coulisses (so called 2D Imposters) positioned in different distances for a collision avoidance system, and this is meant for machine vision (data processing of image data) and not for human vision (displayed on a display screen for viewing by the driver of a vehicle). Later referred 2D imposters are known from computer games (see, for example, http://www.gamasutra.com/view/feature/2501/dynamic_2d_imposters_a_simple_.php).

Driver assistant vision system virtual cameras are typically not independent in position and angle. The driver typically cannot control the virtual viewing position freely and easy. To suit all driving or environmental conditions, especially to show all hazards, the virtual view position and direction should be independent, preferably selectable in x-y-z height and tilt angle by the driver or automatically by the vision system control, in order to always provide the best view according the current condition. The virtual viewpoint should be intuitively steerable. The present invention provides a useful improvement to such vision systems, such as the system described in European Publication No. EP000002136346A2, incorporated above, in conjunction with vision system virtual cameras control.

The present invention provides a system that uses depth segmented 2D layer coulisses (2D imposters), such as described in DE102009009047A1, incorporated above, to provide a fake-3D effect in a vehicular surround view vision system based on tracking of finger and/or hand movement at or proximate a touch screen or touch sensitive device and/or tracking of the driver's head and accordingly motion parallax scrolling of the virtual view point.

Referring now to the drawings, the following provides a description of the driver assist system of the present invention:

(1) Instead of using pre-calculated mapping tables, the mappings of the virtual view become calculated in real time.

Figure 2:
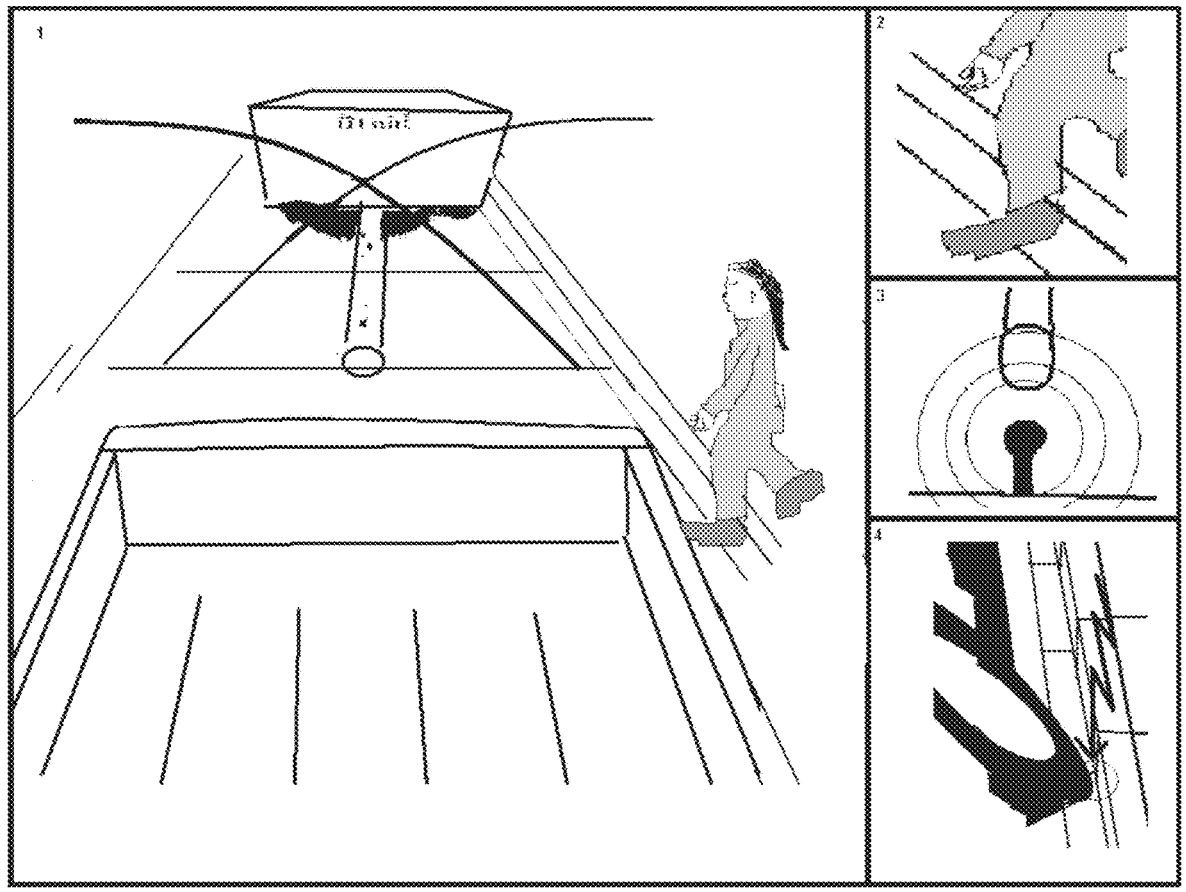
FIG. 2 is an example of the invention's solution showing a top view having an angle from the Z-direction to the rear (1) and several xyz-angled side views in split screens showing relevant tasks or hazards.

(2) Instead of providing a fully vertical top view on situations, hazards become provided within a close up or centering (maybe split) screen, and flexible, preferably freely or manually positionable views from an x-y-z angle come into use. Optionally, the system may capture images of one or more than one hazard at a time (see FIG. 2).

(3) The close up or centering itself draws the driver's attention to the hazard. The hazards may also become highlighted by overlays (see image 4 in FIG. 2) or by color change.

(4) The virtual viewpoint may be altered by gestures, such as hand gestures or finger gestures or the like. The gestures may be detected by suitable gesture sensing devices such as, for example (one, several or in combination):
  a. Time of Flight sensor (as like PMD from PMD-Technologies®);
  b. Stereo camera disparity detection;
  c. Mono camera with pseudo stereo via motion disparity detection;
  d. Structured light sensor (as like Microsoft Kinect®); and/or
  e. Touch screen or touch sensitive device or proximity sensor.

The detection devices may be installed inside the passenger compartment at a position suitable to detect the driver's gestures at most or all times, preferably integrated to the center glove compartment, the top light column or the central mirror mounting area. By utilizing an image-based or non-touch based gesture detection device, the gesture detection device may detect the gestures of a gloved hand as well as a non-gloved hand. Optionally, a touch sensitive device or proximity sensor may be utilized to detect and discern hand gestures by the driver of the vehicle, and optionally the touch sensitive device or proximity sensor may be operable to detect touch or proximity of a gloved hand or finger or fingers as well as a non-gloved or covered hand or finger or fingers.

The system may be operable to detect and discern various gestures and may associate various individually discernible gestures with various operations. For example, the system may detect and discern the following gestures for switching camera modes and controlling the camera and its viewpoint:

'CHOOSE' or 'PICK' or 'ENTER' (mode/control/enter functional group/sub function);
'ABORT' mode;
'RECENTER' viewpoint;
'RECALIBRATE' viewpoint;
'REALIGN' viewpoint;
'TRAVERSING' (sideward) shifting viewpoint;
'CHANGING viewpoint's HEIGHT';
'CLOSING UP' viewpoint;
'DEPARTING' viewpoint;
'NICKING VERTICAL' viewing angle;
'NICKING LATERAL' viewing angle;
'ROL' view;
'TILT' view;
'LOCK' entry; and/or
'UNLOCK' entry
(description similar as referred in (4)).

Figure 9D:
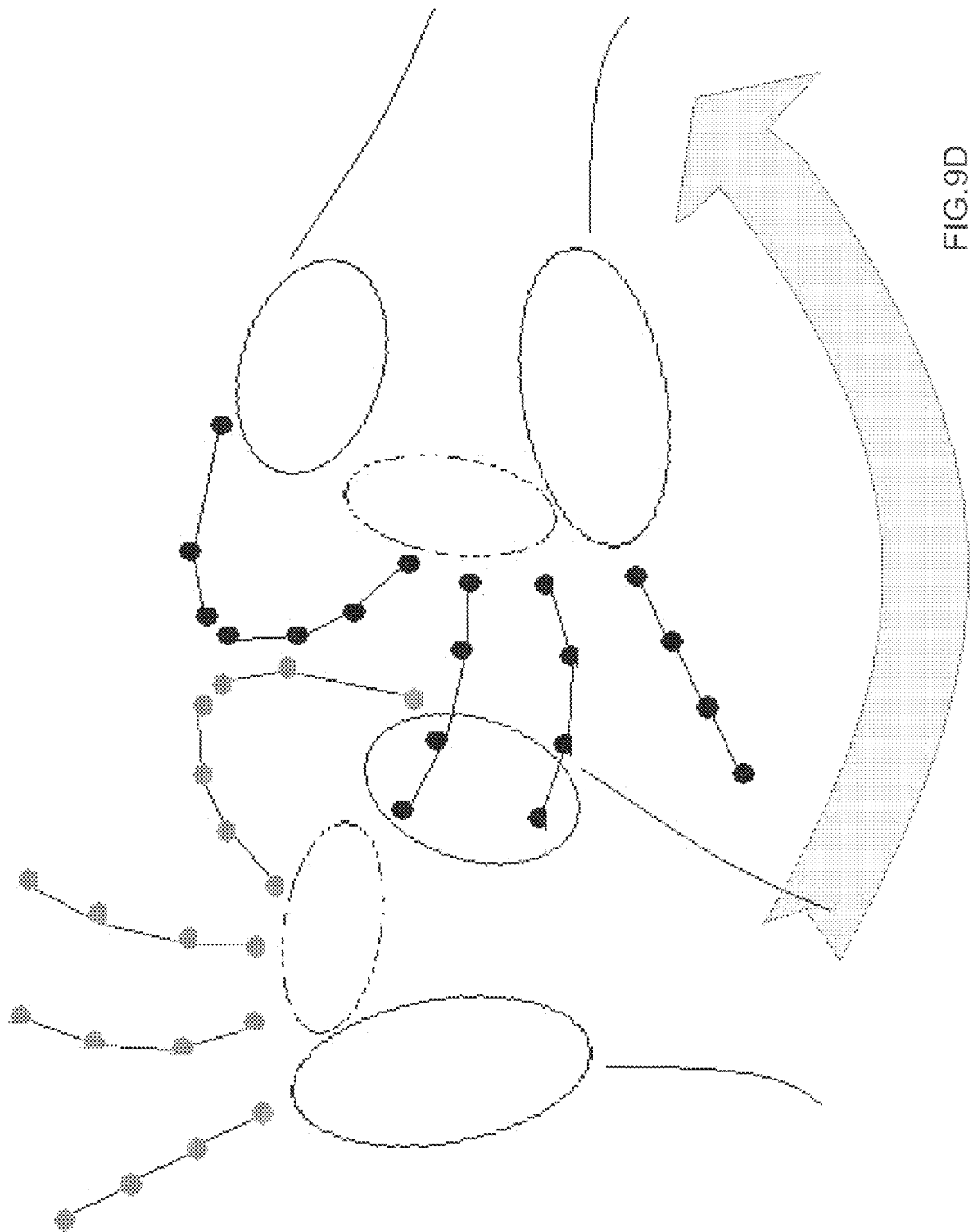
FIG. 9D shows a schematized hand such as like in FIG. 9C, showing a 90 degree turning gesture as a LOCK gesture.

'LOCK' entry may be performed by a turning gesture of the right hand while having the index finger and the thumb closed (see, for example, FIG. 9C), exemplifying the turning of a key inside a key hole such as like shown in FIG. 9D. The 'LOCK' entry may function comparable to key pad lock functions on cell phones, here for gestures entries (not necessarily limited to automotive vision camera application). As soon as a user enters a gesture LOCK command, any subsequent or following gestures entered willingly or by mistake (use case) may be ignored except the 'UNLOCK' command or alternatively the system may be "unlocked" by a conventional (physically) button entry or speech command (known art speech command acknowledgement). The present invention thus provides two dimensional menus that are controllable by just three gestures:

'UP-DOWN'—rolling the menu downwards; such as, for example, by whipping from rearward to forward or vice versa;
'LEFT-RIGHT'—rolling the menu sidewards; such as, for example, by whipping from the right to the left or vice versa;
'PICK'—for picking a choice; such as, for example, by closing the index finger and thumb finger tips (such as shown in FIG. 9D) or by moving the index finger downwards or tapping, such as like when clicking a computer mouse.

One dimension may be the (choice of one) general functional group as like:
Viewing driver assistant system;
Radio;
Navigation;
Phone;
Internet;
Heating, Ventilation, Air Conditioning System, Seat heating;
Seat position (actuator) control;
Window lifter control; and/or
Openers (Roof top/tilt window control, trunk actuator control, fuel lid and/or the like).

Figure 9E:
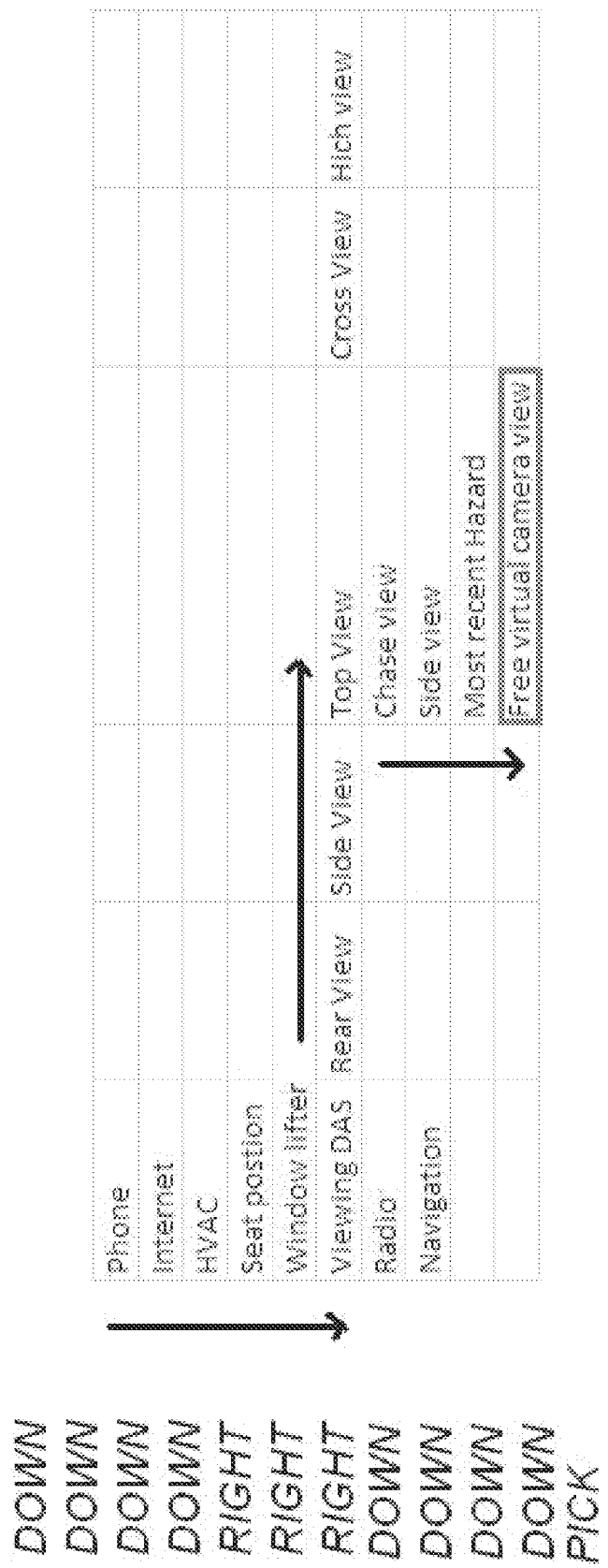
FIG. 9E shows a schematic of the two dimensional function menu controllable by three gestures, and the left row tells the order of the commands necessary to end at the choice of 'Free virtual camera view'.

The second dimension may be the (choice of one) specific feature that changes when wiping to an orthogonal direction then the general functional group dimension (see FIG. 9E) as like:
Sound volume (under the functional group 'Radio'); such as, for example, becoming louder to the right;

Phone functions (under the functional group 'Phone'); such as, for example, giving the choices one by one when whipping from left to the right:
Pick up;
Dial/Redial;
Phone Contacts;
Forward phone;
Configure.

Virtual Top View Camera (under the functional group 'Viewing driver assistant system'); such as, for example, giving the choices one by one when whipping from left to the right:
Most recent hazard view;
Second recent hazard view (when whipping up down up after entering 'Most recent Hazard view');
Third recent hazard view;
Chase view (from the virtual rear);
Side view;
Free virtual camera view.

For example, after 'PICK'-ing the 'Free virtual camera view', the system may offer a control mode for the virtual camera which can be used intuitively by the driver. It may perform as like laying the right hand onto a globe's top surface. When emphasizing to role the hand forward or sideward, the virtual camera is set up to copy that rolling simultaneously (or in a scaled ratio) such as in the manner shown in FIG. 9B. By using the 'PICK' gesture (closing the index finger and thumb finger tips such as like shown in FIG. 9C) while moving the hand, the viewing angle may stay fixed but the virtual camera may move transversal forward, sideward and vertically. Opening the index finger and thumb finger tips while moving the hand downward may comprise the earlier mentioned 'CLOSING UP viewpoint' gesture. When the user carries out this gesture the virtual view may zoom up. The opposite 'DEPARTING' viewpoint gesture may effect a de-zooming.

(5) The virtual viewpoint may become altered by sliding and tapping or tipping on a touch screen.
a. The slides may follow an intuitive logic.
b. One, two and/or three finger slides and tapping action are dedicated to specific vision control groups:
  i. Tapping may be dedicated as a 'CHOOSE', 'ENTER', 'ABORT' or 'RECENTER' or 'RECALIBRATE' or 'REALIGN'.
    1. The realigning function may automatically turn the virtual view back to the vehicle's body and turns the views top upright.
  ii. Sliding two fingers (mostly) horizontal may be dedicated as viewpoint 'TRAVERSING'. The virtual view point moves side wards, without changing the viewing angle.
  iii. Sliding two fingers (mostly) vertical might be dedicated as 'CHANGING viewpoint HEIGHT'.
    1. Functions (ii) and (iii) may alternatively behave slightly different by fixing the aiming point that the virtual view looks at. The virtual view point turns in all three angles while TRAVERSING side wards or in HEIGHT or both.
  iv. Sliding two fingers (mostly) away from each other be dedicated as 'CLOSING UP' (or Zooming in, but zooming is not fully identical to rolling a camera, and rolling is preferred). The virtual view point is rolling towards the aiming point looking at. The position changes, but not the viewing angle.
  v. Sliding two fingers (mostly) in direction of one another be dedicated as 'DEPARTING'. The virtual view point is rolling away (or De-Zoom) from the aiming point looking at. The position changes, but not the viewing angle.

vi. Sliding one finger (mostly) vertical may be dedicated as changing the viewpoint's 'NICKING' (vertical) angle.

vii. Sliding one finger (mostly) horizontal may be dedicated as changing the viewpoint's 'LATERAL' angle.

1. NICKING and LATERAL angles may be combined to 'ROL' which serves both functions at the same time with one finger. The virtual view changes the viewing angle, but not the position during this function.
2. The ROL(-ing) function may come with a behavior as if the rolling view has a kind of inertial mass and friction, so the already rolling view continues rolling in the same direction with decreasing speed when taking the sliding finger tips off the touch screen.

viii. Sliding one finger around another might be dedicated to 'TILT' the virtual view side wards (the third degree of freedom beside NICKING and LATERAL turning).

Figure 9F:
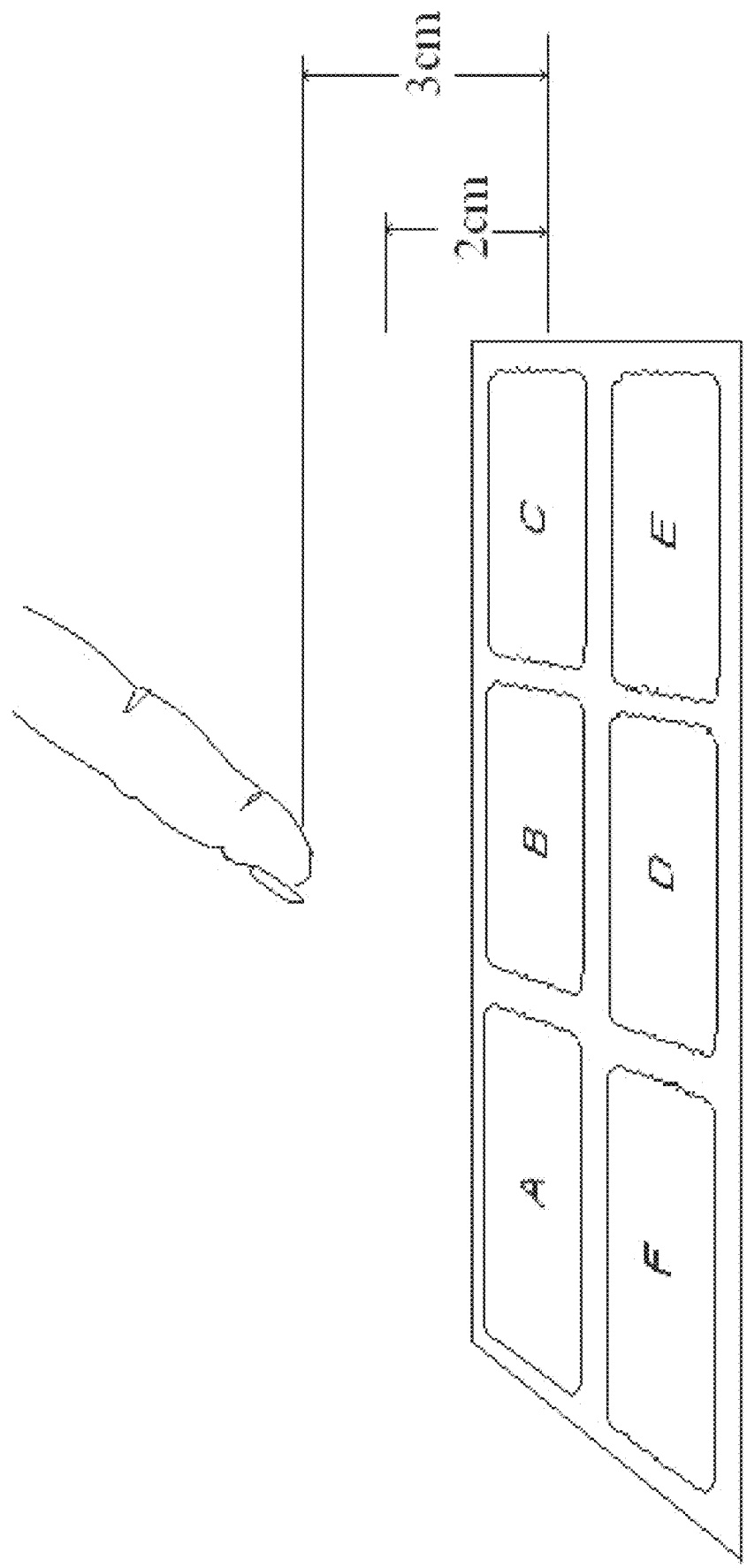
FIG. 9F shows the normal condition of a projected key area with a closing finger further than 2 cm from the key area.
Figure 10:
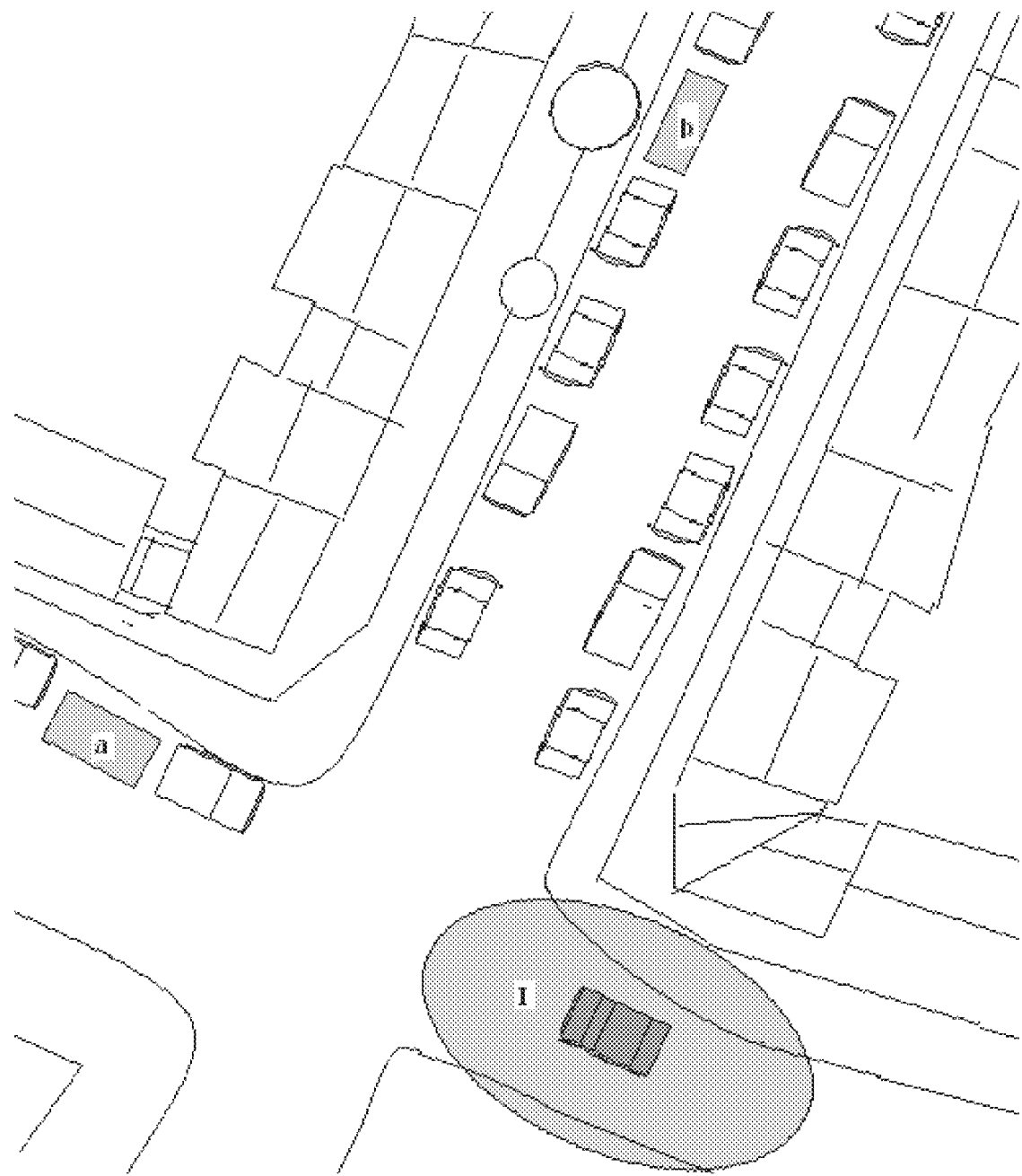
FIG. 10 is an example of a state of the art scene such as known from European Publication No. EP000002136346A2, showing the subject vehicle within the gray oval (I) and wireless transmitted parking spot positions a and b, transmitted by one or more other vehicles having appropriate means for measuring out the parking gap distance and transferring its coordinates.
Figure 11A:
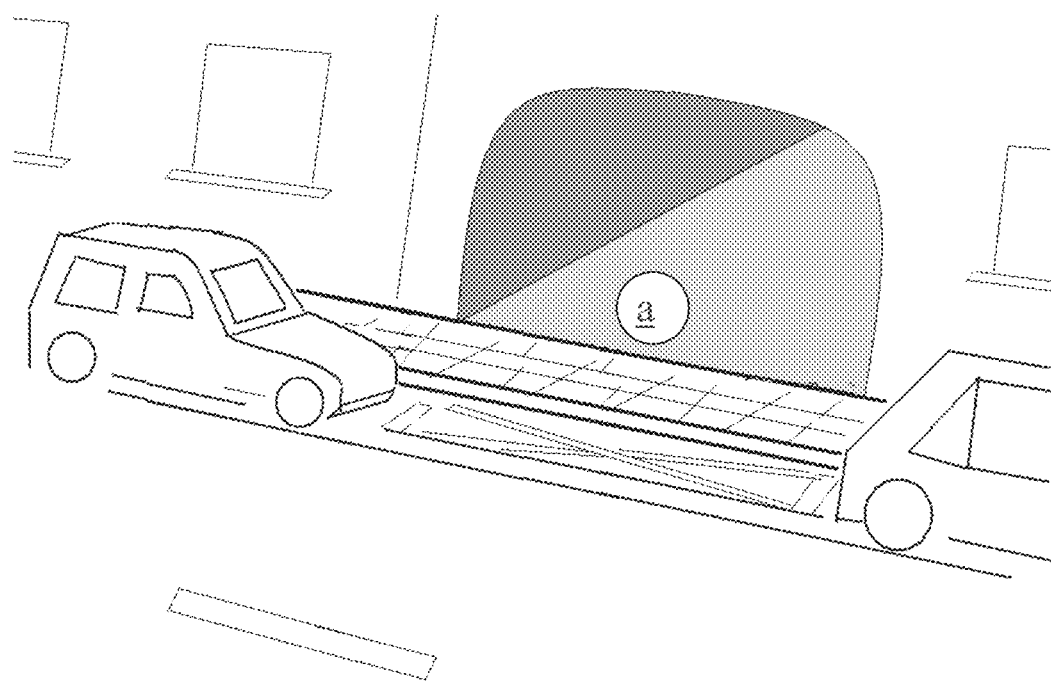
FIGS. 11A and 11B show examples of parking gaps, where there may be gaps which are big enough in size, but still not relevant to consider, such as shown in the example of FIG. 11A, with the example of FIG. 11B showing a relevant parking gap, with both FIGS. 11A and 11B corresponding to the parking spots marked with (a) and (b) in FIG. 10.
Figure 11B:
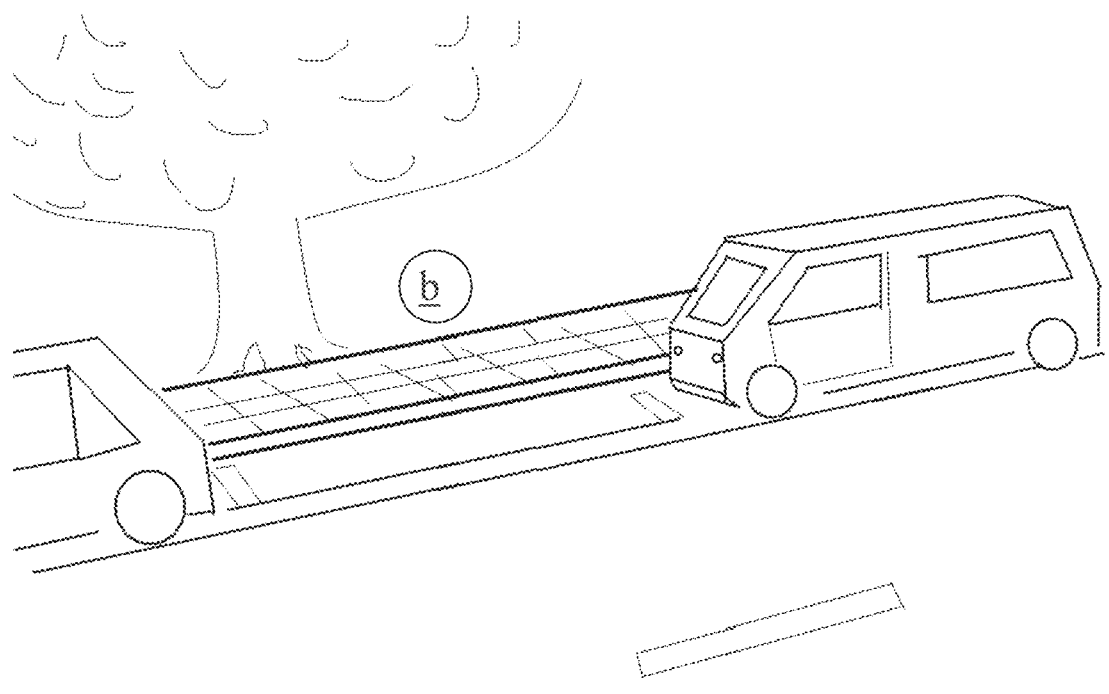

(6) Referring now to FIGS. 9F-H, the gesture interface may work in combination to physically present keys or keys projected onto a surface or a capacitive sensor key pad as another aspect of the invention and optionally utilizing the later referred haptical interface comprising incorporated pad or needle actuators or the like. When the user is closing (such as, for example, to within about 2 cm) to a key pad or key area or the like (any of above mentioned types), the projection illumination or backlight illumination may increase simultaneously or may change color, or its shape may changes, or projected lines may increase in size or the key may increase in size or pop out (or pop out more) as like attracted from the user's closing finger (see FIGS. 9F and 9G). This provides the user the feedback that his or her intention is acknowledged. When striking and/or when lifting the button the key may change its projection illumination, or backlight illumination, such as, for example, a short flickering or inverting or turning on the center or may change color (again), or projected lines may decrease or increase in size or the key may decrease in size or pop in (as later referred, compare FIGS. 3F and 3G) or its shape may change as like rounding up the edges (more)(see FIG. 9H). After releasing the key, its effect may fade out slowly (such as over about two seconds or thereabouts) to its normal state.

(7) When increasing the distance of the virtual view from the vehicle, by raising the viewpoints highs or distance, the scene captured by the vehicle's cameras is limited, so the more distant area must become filled.

a. This may happen by using image data of remote image providing facilities or vehicles connected by any kind of remote communication channel, or
b. by using historical image data, stored earlier, when passing the scene which is to project, or
c. by using image data out of a street and/or satellite view database like 'GOOGLE STREET VIEW'™ and/or 'GOOGLE EARTH'™ or the like.

i. This kind of top view departure and/or approach may be performed automatically . . .

1 . . . when turning on or switching of the vision system as a start up/end up animation or . . .

Figure 12:
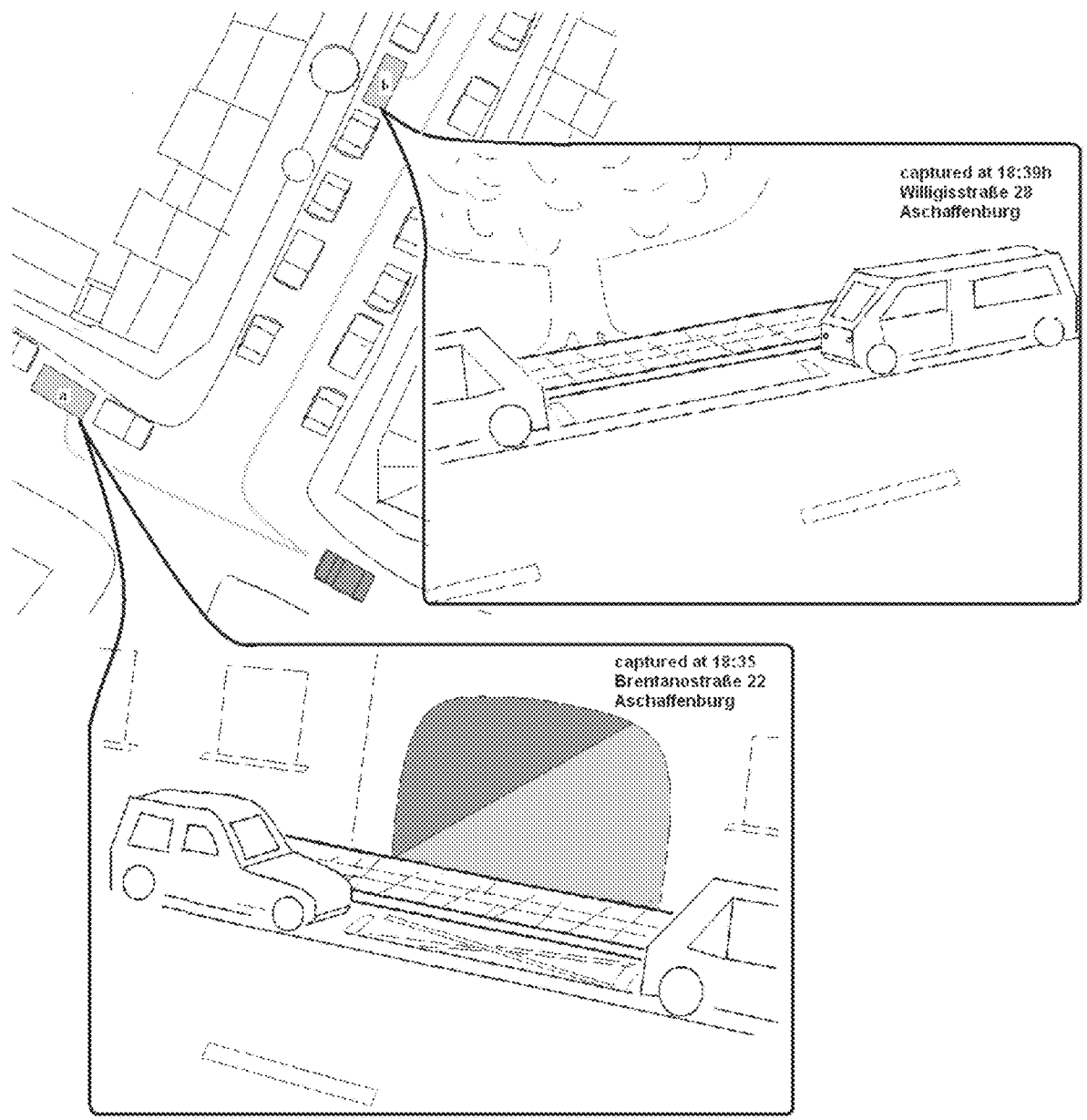
FIG. 12 is an example of an inventive embodiment of a display system, preferably a touch screen, showing an advance to what is shown in FIG. 10 and known systems, not only are the parking spot coordinates transmitted, but also visual data, with the scenery at and around parking spots captured by vehicle vision cameras from vehicles which have passed the potential parking spots, are also transmitted, and shown with (a) and (b) becoming transferred as well and presented to the driver for consideration, and with the potential driving path also shown to the driver of the vehicle.
Figure 13:
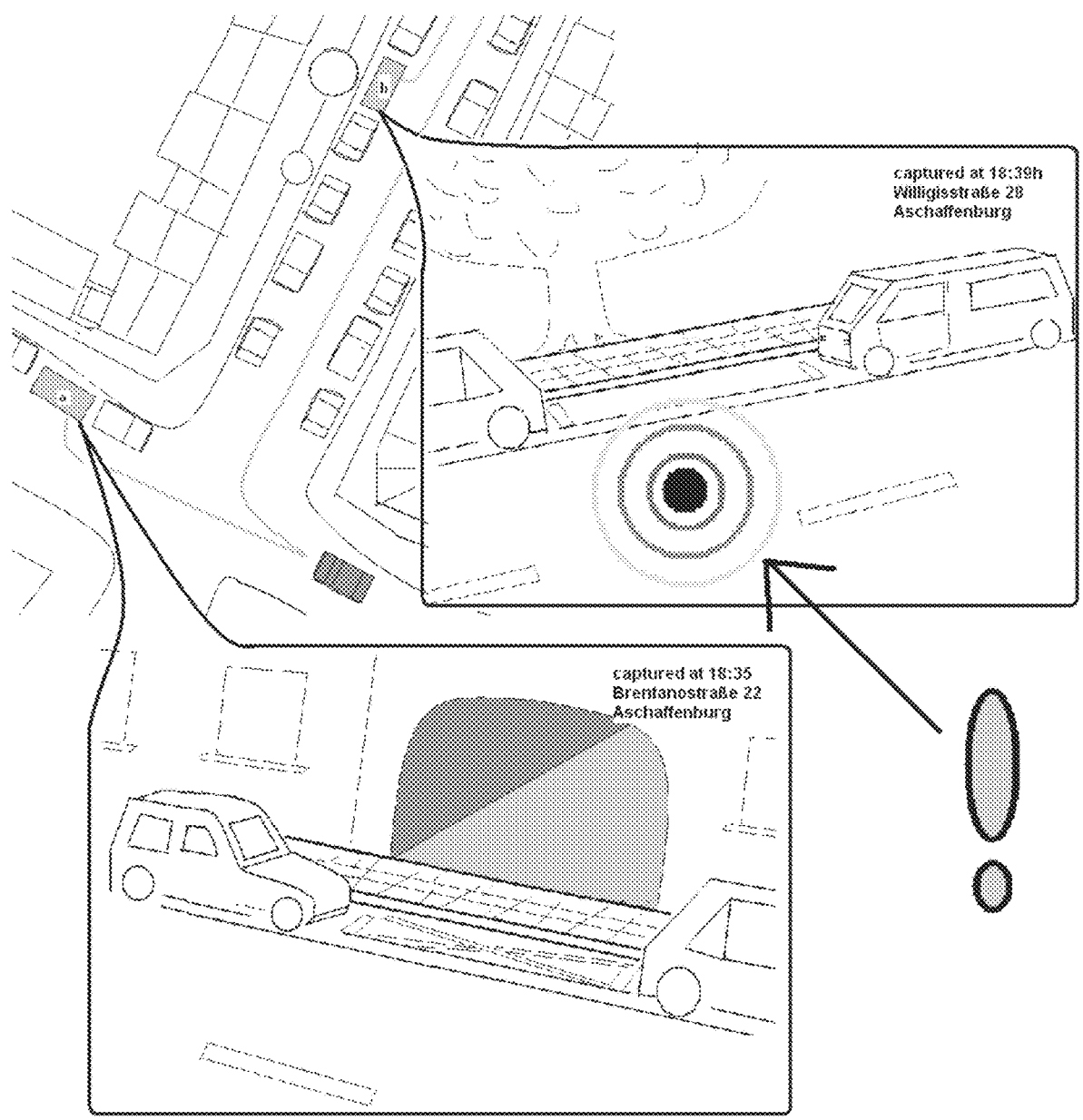
FIG. 13 is a consecutive example to the inventive embodiment from FIG. 12, with the user providing a touch action (or approach or proximity of the driver's finger) onto the scene area (b), which triggers the choice so the ENTER(-ring) of scene b.
Figure 14:
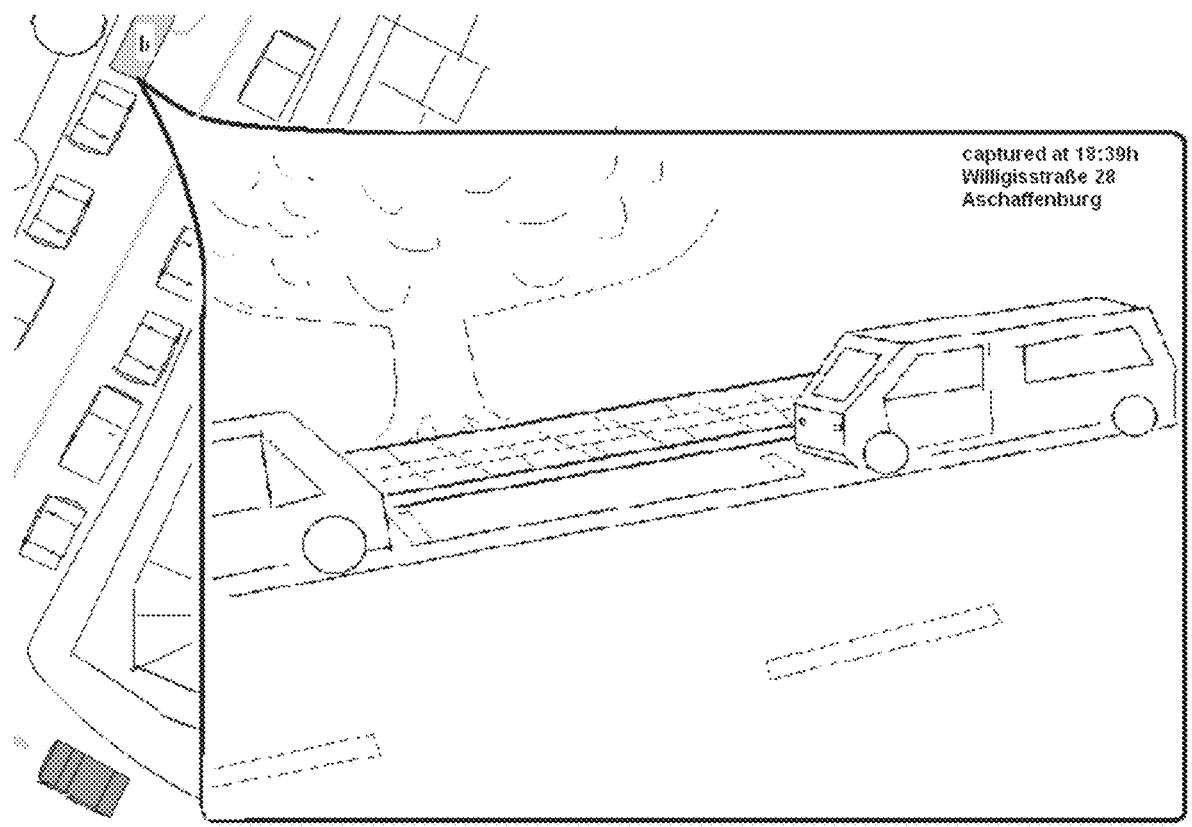
FIG. 14 is a consecutive example to an inventive embodiment from FIG. 13, showing that, when triggering/ENTER(-ring) of scene (b), the icon like parking lot scene becomes enlarged to the major part of the display for exploration by the driver.
Figure 15:
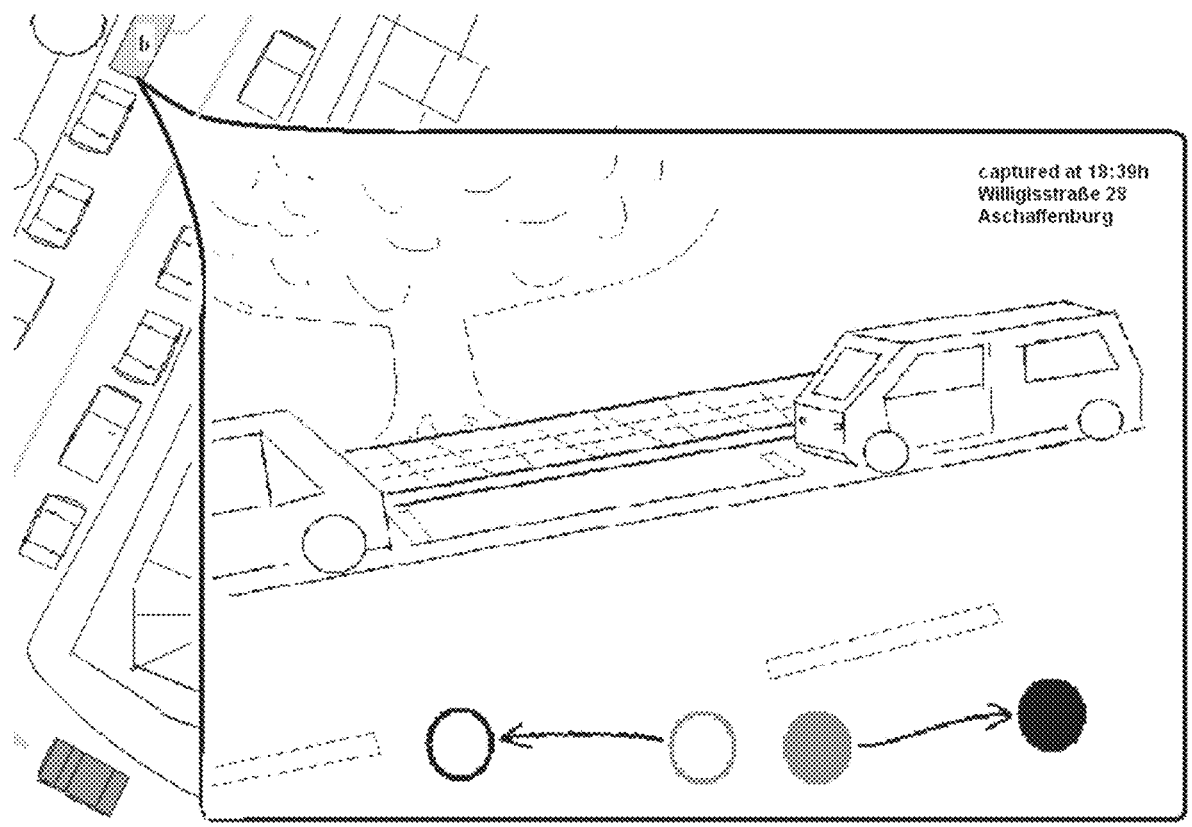
Figure 16:
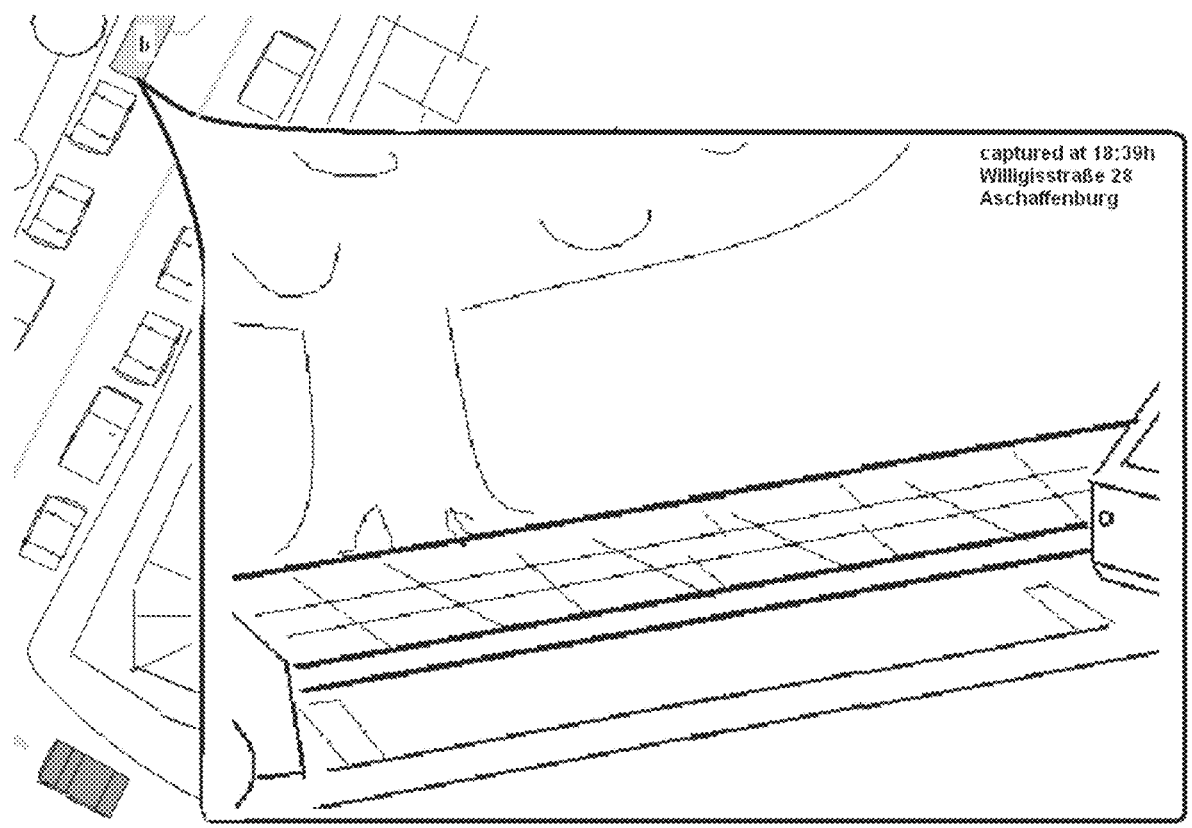
FIG. 16 is a consecutive example to FIG. 15 of the invention's embodiment, with the virtual viewing point driven forward, which closes up the scene for deeper inspection.
Figure 16A:
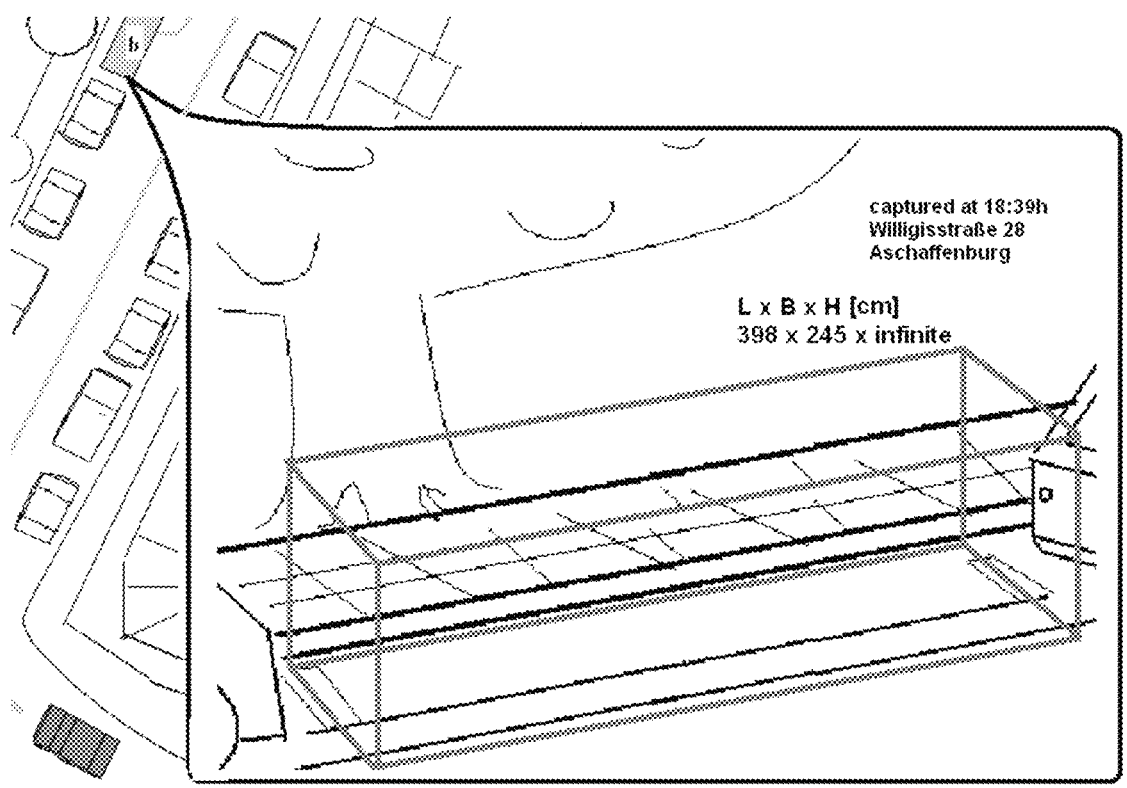
FIG. 16A is a consecutive example to FIG. 16, showing a park box in the size of the host vehicle being projected (overlaid) to the displayed parking spot scene.
Figure 17:
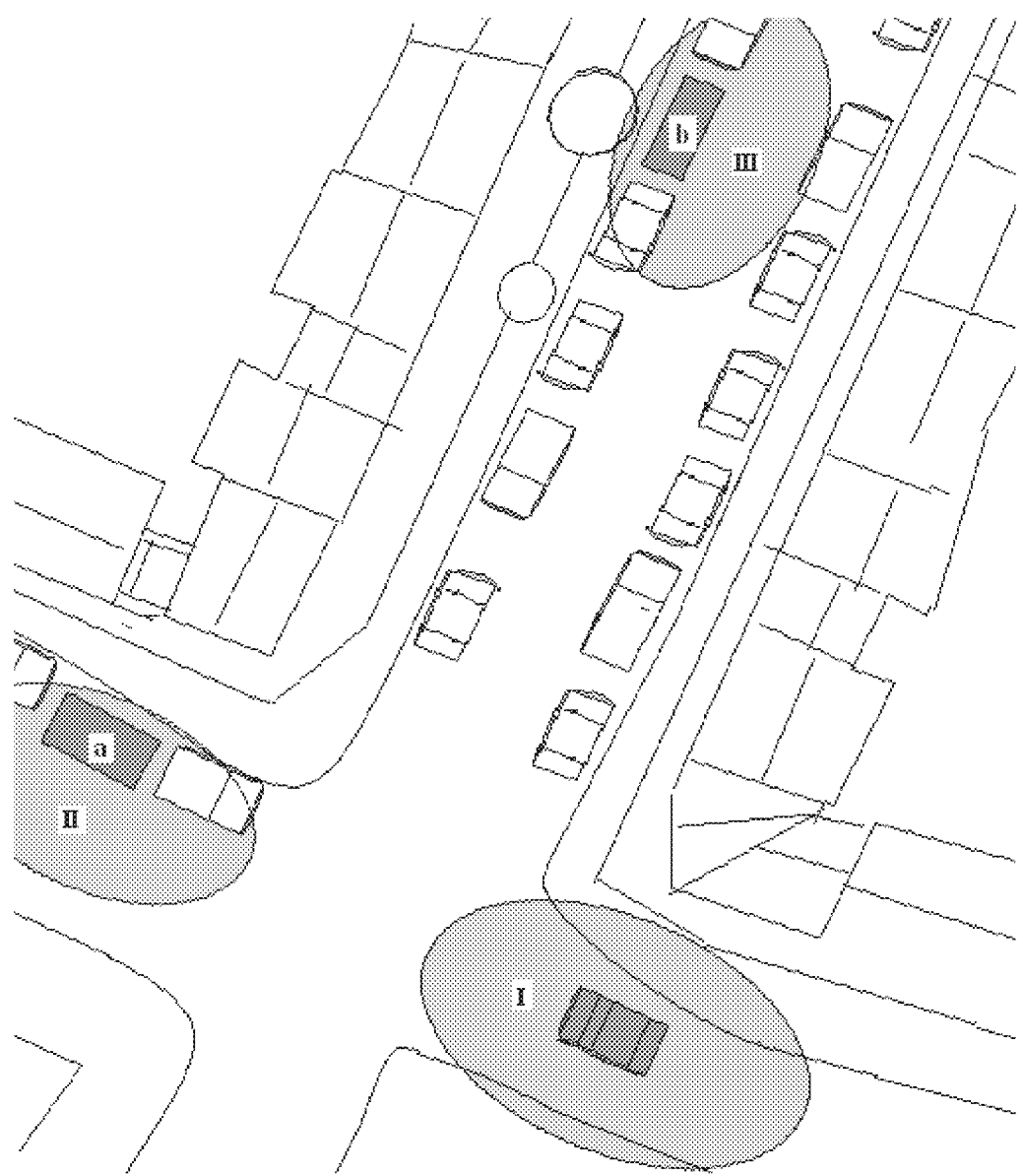
FIG. 17 is an example of an inventive embodiment, with the scenery of the gray oval areas I, II and III captured by vision cameras lately or recently, and with the area outside the oval not captured lately, and with this data consisting of mostly historical satellite and mapping data from providers like GOOGLE STREET VIEW™, and when departing a scenery, first the vision camera's images, then the (historical) street view data and then satellite and/or map data are displayed.
Figure 18A:
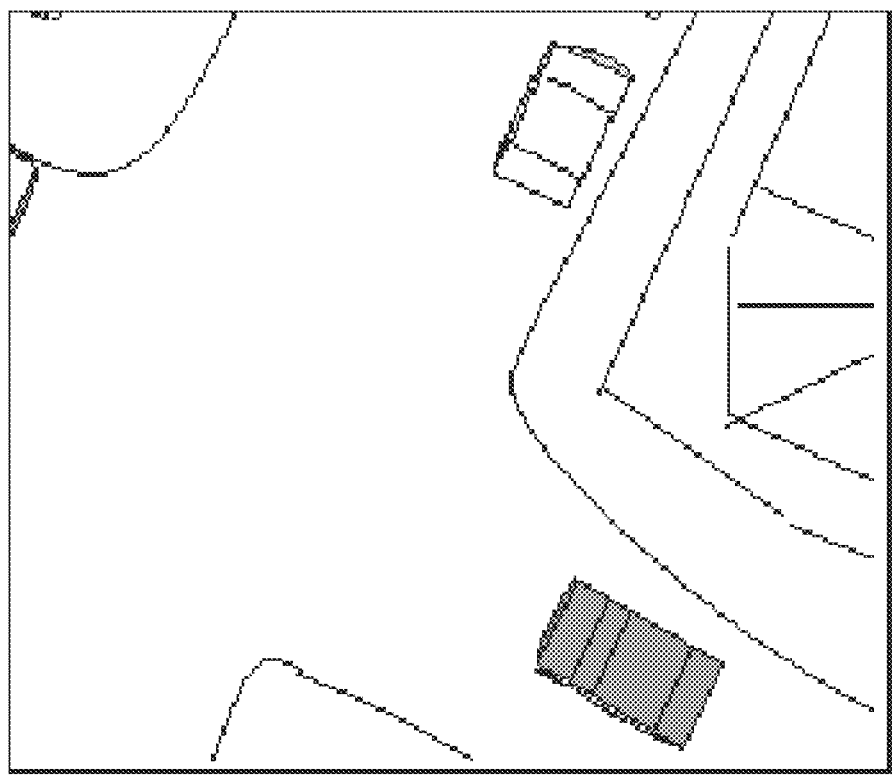
FIGS. 18A and 18B illustrate the maximum height which may be displayed by a real time top view, before switching to historical data when increasing the height or distance.
Figure 18B:
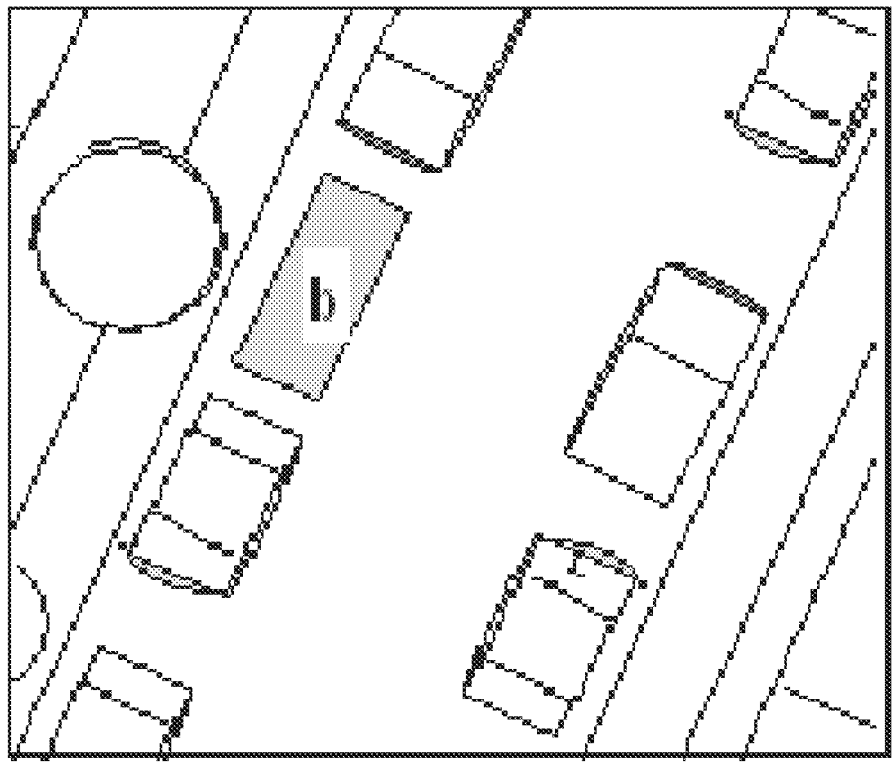

2 . . . in conjunction with navigation mapping to provide the actual vehicle's position onto a map (maybe relatively in a distance to a destination spot).

a. Also a camera side and/or top view of the parking spot scene may be provided and also a time stamp of when the spot was detected (see FIG. 12).
b. To determine whether the host vehicle is fitting into the optional parking spot, there may be a 'park box' overlayed to the parking spot scene, which has the same size that the host vehicle would take within that scene. The box may be semi transparent and may be adapted according to the virtual distance (such as shown in FIG. 16B). Additionally, the parking spot dimensions may be displayed as numbers as an additional overlay. Mismatching may be highlighted (such as in a selected color, such as red, and/or such as by flashing or blinking, and/or such as via hatched borderline bars of the park box and/or the text overlay). The park box may appear automatically or may be selectively triggered by the user, preferably by a touch onto a touch screen in the vehicle.
c. The gap may become rated in a best choice algorithm of elapsed time to when the parking gap was spotted, a degree of difficulty to reach the gap, a walking distance to destination, a driving distance to parking gap, a criminal or accident focus, a child safety when departing, a POI, parking costs, and/or the like.

ii. This kind of top view departing and/or closing may be controlled automatically or manually, such as via a user input or the like controlled by the driver or occupant of the vehicle.

(8) Optionally, the virtual viewpoint may become shifted according the driver's head movement.

a. The driver's head and/or eyes may be tracked by a surveillance system, which is preferably within the vehicle compartment, preferably fixed vis-à-vis the driver.

i. Optionally, the driver surveillance system may comprise a camera based system.

1. The camera may use any suitable image algorithm that is capable to discriminate the position and distance of the driver's head and/or eyes relative to the camera.
2. The camera may operate within visible light, and optionally, and desirably, within invisible wave lengths, such as infrared light wavelengths and/or near infrared light wavelengths.
3. The system may include an active light source to illuminate the driver's contours so the surveillance system receives enough contrast to operate. Optionally, and desirably, the light source may comprise one or more infrared or near infrared light emitting light emitting diodes (LEDs).

ii. Optionally, the driver surveillance system may comprise a LASER based system.

1. The LASER may actively scan a surveillance area in which the driver's head is typically found or located and/or may track the driver's head. An algorithm may form a cloud of scan point data, which may be processed in a manner where typical body markers are discriminated so these can be tracked, which enables the system to determine the driver's head position and distance relative to the LASER source.
b. The tracked driver's head position in relation to the position of the camera or LASER or sensor may be brought on according to the display's position by any suitable trajectory algorithm of the vision system.
c. At the time the driver moves his or her head, the virtual vision view point will be shifted accordingly. Due to correct parallax scrolling (fake 3D) such as from computer games, the depth segmented 2D layer coulisses known from DE102009009047A1 for machine vision (also known as '2D imposters' known from computer games) become virtually shifted accordingly within the inventive automotive human vision embodiment. Accordingly, the fake 3D vision image on the display shifts over the display responsive to the driver's head movement.
d. The present invention thus turns dynamic 2D imposters orthogonal to the user's view, such as by using aspects of computer games.
e. In DE102009009047A1, the imposters layers are arranged in parallel lines of distances. The present invention provides a panoramic vehicle vision system that arranges the distance lines (layers/shells) of the imposters circumferential, onion-like shell around the virtual view point (equates to the virtual projector) so that the user always faces the surfaces orthogonal to the user's point of view (the user's head).
f. When raising the view point, the imposters tilt (bend) to the back still showing their front to the viewer.
   i. The lower end may turn in a curved shape towards the center when the view point is raised.
g. According to the rules for having motion parallax at times when the virtual view point is shifting forward (x direction) (compare to FIGS. 24A to 24C) the 2D imposters move against the viewer. The close imposters move further and respectively faster as compared to the imposters in the background. The imposters in front move less than those at the side. The imposter may grow in size when they approach and shrink when they get more distant. The behavior is accordingly opposite when moving virtually away. These effects more or less apply when the view is mostly in a horizontal angle (x-z pane).
   i. For economic reasons (including the processing load of the control or microprocessor), the imposter's size and mappings may not change continuously but may change in steps according to the distance and angle.
   ii. The mappings may be simplified by not projecting the captured (and maybe transformed) images from the vision system's cameras itself than simplified symbols (such as a car, a person, a dog, a tree, a shopping cart, and/or the like). The symbols mappings may be offline calculated and stored in a look up table for every angle and size which is desired for use in the vision system.
h. The present invention thus provides a system that is operable to scroll the mappings on the 2D imposters surfaces according the viewing angle the driver is looking at. This is different to 'parallax occlusion mapping' also known from the computer game area (see, for example, http://en.wikipedia.org/wiki/Parallax_occlusion_mapping; and/or http://www.youtube.com/watch?v=gcAsJdo7dME&feature=related). Such parallax occlusion mapping is used to procedurally create 3D definition in textured surfaces, by using a displacement map (similar to a topography map) instead of through the generation of new geometry.
   i. The present invention thus provides a vehicle vision system that uses 'parallax occlusion mapping' effects on high performance systems.
   j. The present invention thus provides a vehicle vision system that uses 'parallax mapping' (or 'parallax shading') effects known from computer games (see, for example, http://en.wikipedia.org/wiki/Parallax_mapping), which may require less processor capacity than 'parallax occlusion mapping' ('parallax mapping' is faking shades onto where virtual gaps would be depending of the virtual light source's direction, and 'occlusion mapping' is additionally virtually hiding structures/profiles in the background which should become hidden by structures/profiles in the foreground but still just maps all that onto a flat projection surface, not calculating geometries of the structure/profile itself, and 'parallax occlusion mapping' requires more calculation power than 'parallax shading').

Figure 19:
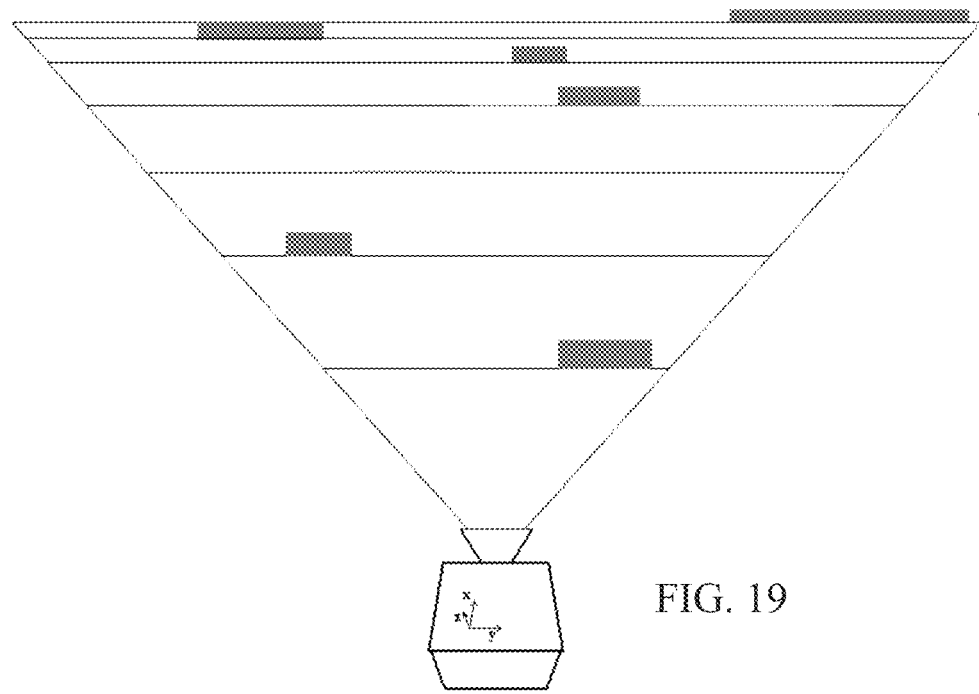
FIG. 19 is a schematic illustration of a two dimensional (2D) imposter which are set up in horizontal lines, with the horizontal shells having the same distance, and with the lines on the horizon appearing closer to each other than the closer ones from the slightly elevated viewing angle.

With reference to the drawings, FIG. 19 is a schematically illustration of 2D imposter which are set up in horizontal lines, with the horizontal shells having the same distance. The lines on the horizon appear closer to each other than the closer ones due to the slightly elevated viewing angle. In the illustrated embodiment, all imposter shells have the same height, with the more distant ones appearing smaller than the close ones. In this example, no real scenes are mapped (projected) by the virtual projector to the imposters surfaces. In the illustrated embodiment, the use is for human visualization. Such a vision system may utilize aspects described in DE102009009047A1, incorporated above, such as for machine vision purposes.

Figure 20:
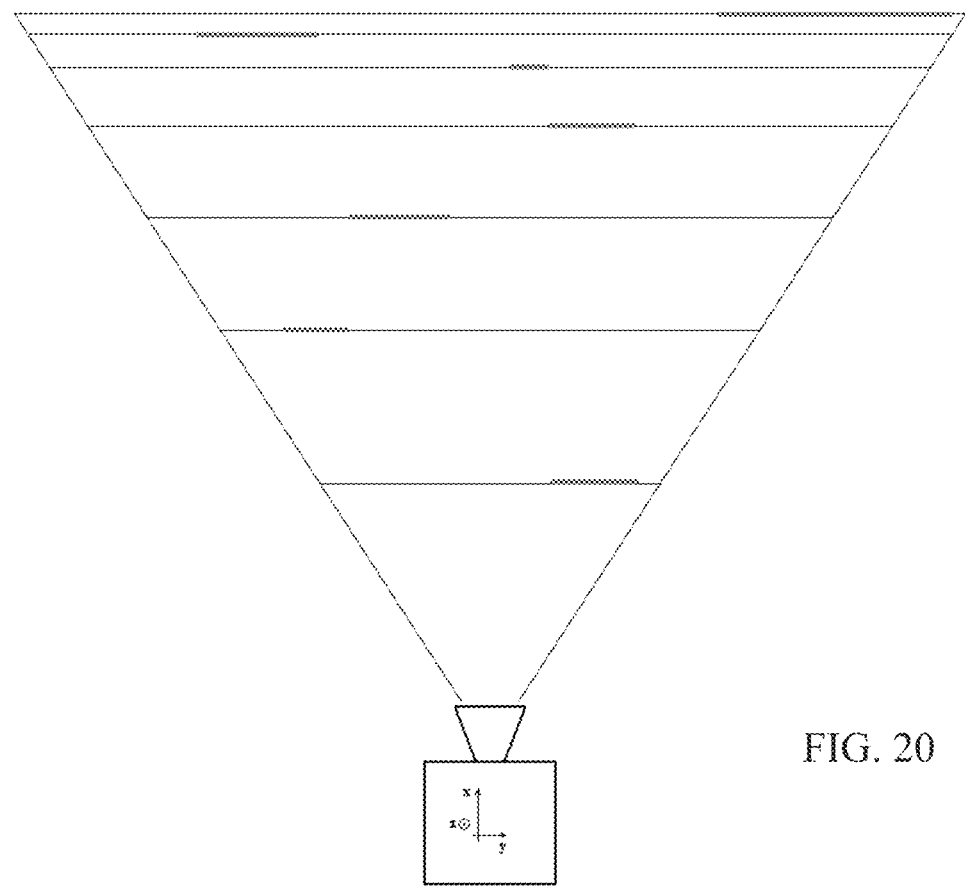
FIG. 20 is the same scenery as shown in FIG. 19, with the view being elevated such that the viewing angle in FIG. 20 is substantially or fully vertical.

FIG. 20 is an illustration of the same scenery as in FIG. 19, with the view being elevated so that the viewing angle is now substantially or fully vertical. In cases where the imposters do not turn toward the viewer but stand upright, such as shown in FIG. 20, the (projected mapping) surfaces are not visible any more. The top view is more important for driver assistance vision systems than flat viewing angles.

Figure 21:
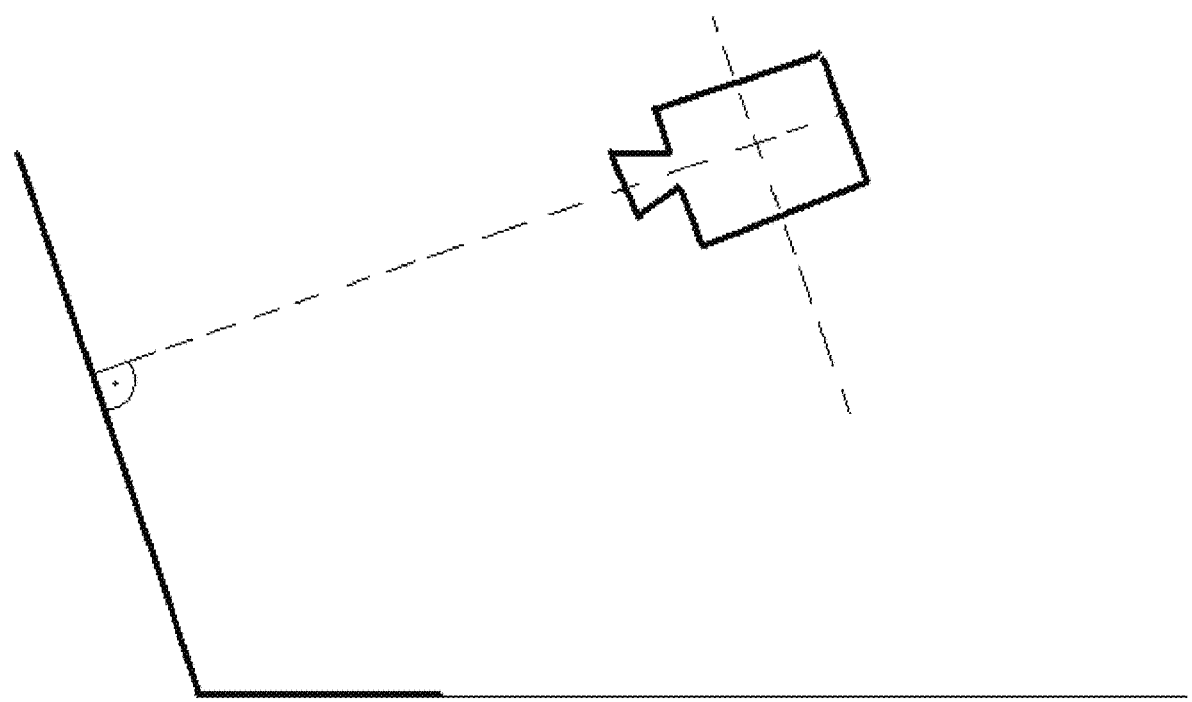
FIG. 21 is different from FIGS. 19 and 20, and shows the virtual view point as being identical to the virtual projector position and direction.

FIG. 21 is different from FIGS. 19 and 20, and the virtual view point is identical to the virtual projector position and direction (typically in automotive human vision systems). To avoid that the projection pane, so the imposters turn out of the view when the virtual view point (and the projector) become elevated, the present invention (in vehicle vision) provides that imposters are bent back in a way that the surface always stays orthogonal or substantially orthogonal to the viewer (projector). As shown in FIG. 21, the example has the lower end of the imposter bent in at an edge. Such a system may utilize aspects of the systems described in PCT Application No. PCT/US2012/048110, filed Jul. 25, 2012, and published on Jan. 31, 2013 as International Publication No. WO 2013/016409, which is hereby incorporated herein by reference in its entirety, where it is disclosed that a 2D vision system may bend down fully enveloping bowl shape like projection panes, such as when the virtual view point becomes increasingly elevated. In the illustrated embodiment of FIG. 21, the projection pane is divided up in several projection panes, having different distances (see also FIG. 19).

Figure 22:
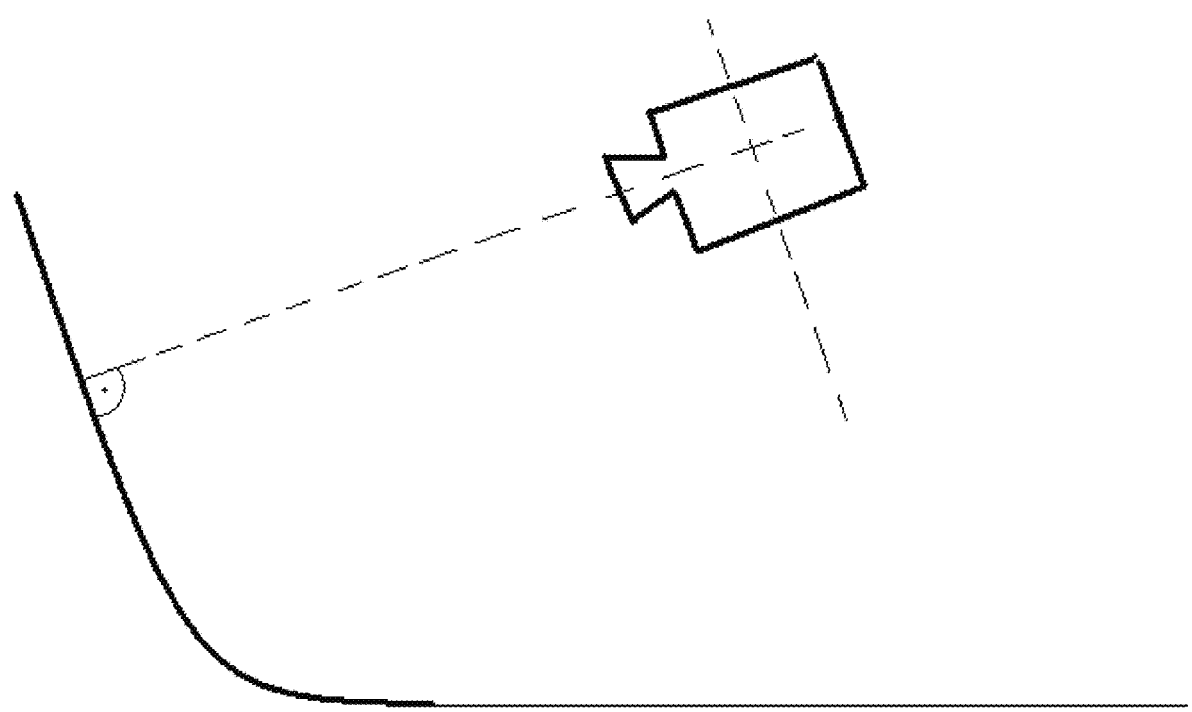
FIG. 22 is the same as FIG. 21, with the exception that the 2D imposter or at least its lower end becomes smoothly turned instead of a sharp edge.
Figure 23A:
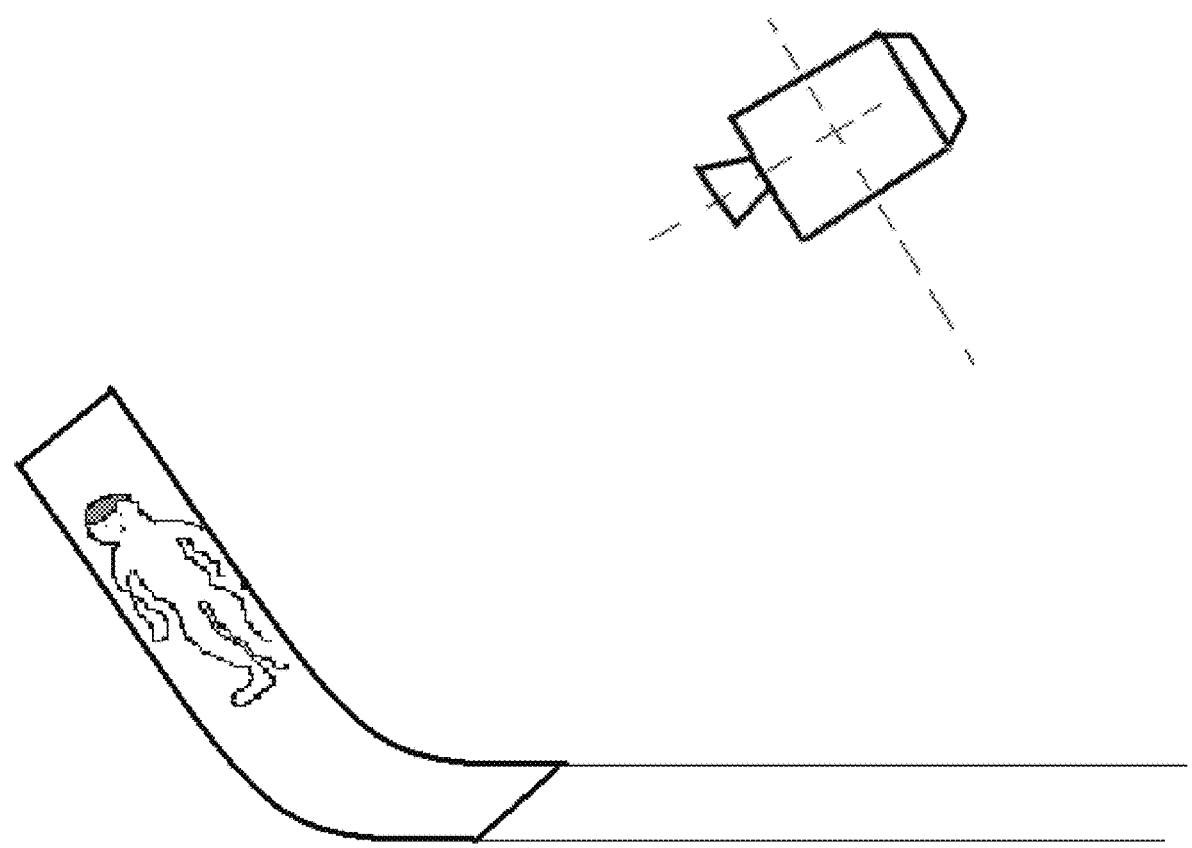
FIG. 23A shows a human image that is captured by the vision system camera(s) as a relevant object as being projected onto a (single) imposter, with the virtual view point slightly elevated looking down.

FIG. 22 is identical to FIG. 21 with the exception that imposter or at least the lower end becomes smoothly turned instead of a sharp edge. This may improve the appearance of the transitions from bottom projections to vertical objects projections. FIG. 23A illustrates a human captured by the visions system camera(s) as a relevant object is being projected onto a (single) imposter. The virtual view point is slightly elevated looking down in FIG. 23A, while FIG. 23B shows the virtual view point after it has been risen (either by manual input, automated by the system or because the viewer has elevated his viewing angle by rising his head which was captured by head/eye tracking). The virtual projection pane (the imposter) has been bent down further to stay orthogonal. The mapped (projected) image of the human might have been altered according parallax shading. Additionally, occlusion mapping might have use in the system of the present invention. FIG. 23C shows that the virtual view point has been risen further in comparison to FIGS. 23A and 23B, such that the virtual projection pane (the imposter) has been bent down to nearly horizontal. The projection (mapping) may show the captured human more as like looking from overhead than from the front. Parallax shading and/or occlusion mapping may also find use in this situation.

Figure 24A:
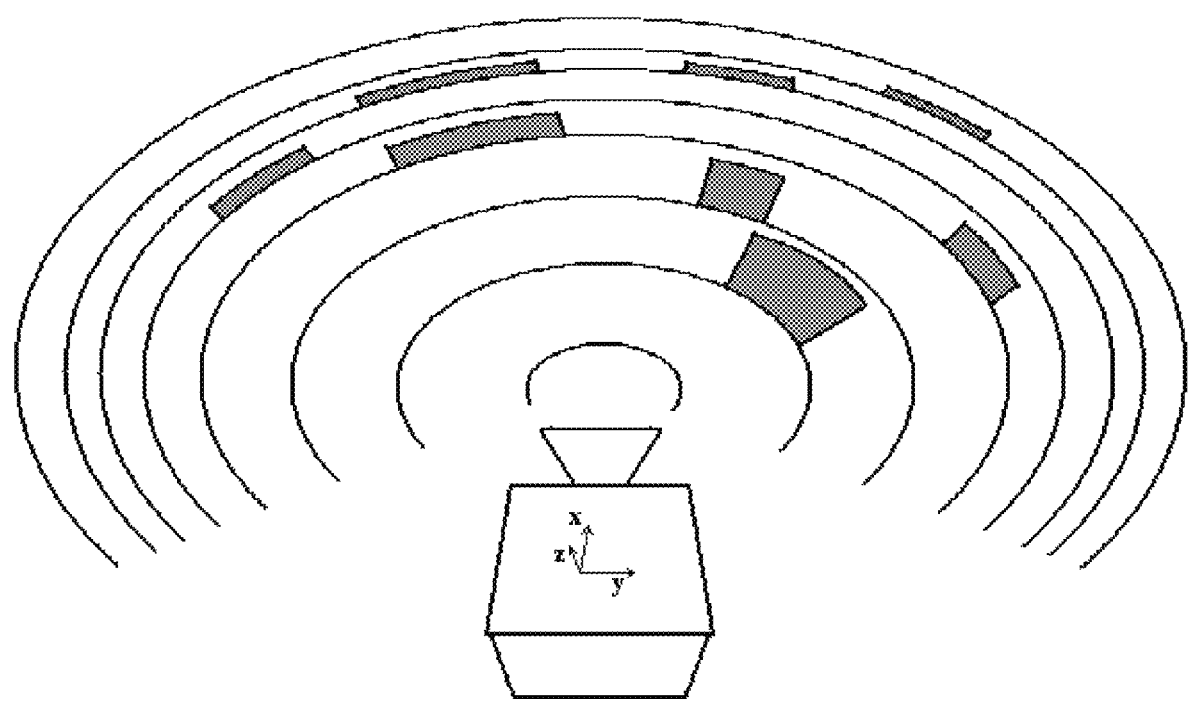
FIG. 24A is a schematic of an inventive embodiment of the present invention, which does not arrange the imposters in parallel lines of distances but arranges the distance lines (layers) of the imposters circumferentially around the view point like an onion shell and so as to always face the surfaces orthogonal to the user's view point (user's head), with the scenery in the condition of to (before movement or at an initial time frame)

FIG. 24A illustrates that the system of the present invention may arrange imposters or distance lines or layers of the imposters circumferentially around the view point (such as like layers of an onion) so as to always face the surfaces orthogonally to the user's view point or the user's head. This is different from what is shown in FIG. 19, which arranges the imposters in parallel lines of distances. The scenery shown in FIG. 24A is in the condition of to according to the timestamps of FIG. 24B (before move).

Figure 7:
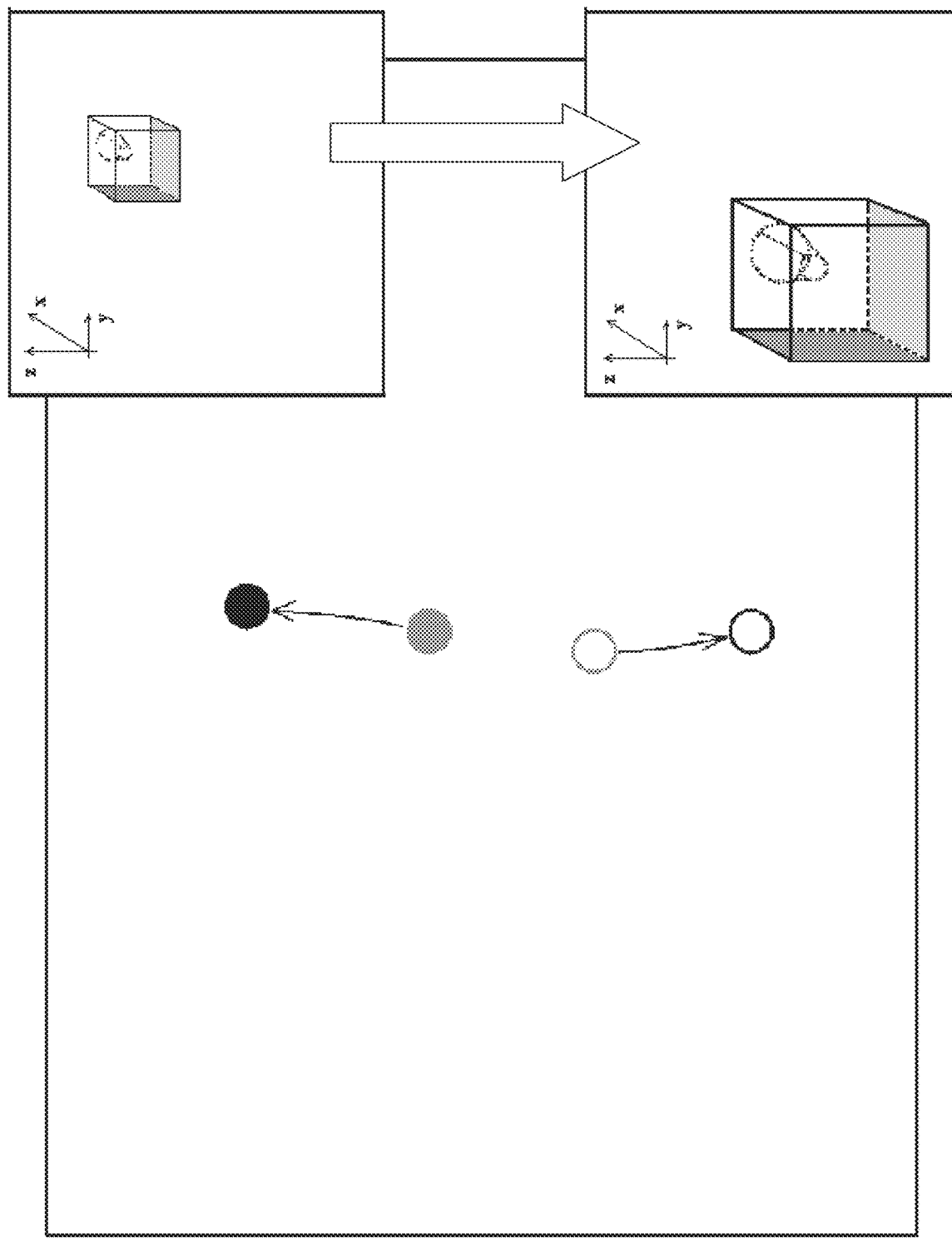
FIG. 7 is an example of a case of the invention's embodiment, showing the CLOSING UP, where the decrease of view distance to an object of the virtual viewing point is controlled by a two finger sliding away from each other, with the virtual viewing direction and position of 'before' and 'after' doing the sliding action illustrated in the boxes on the side.
Figure 8:
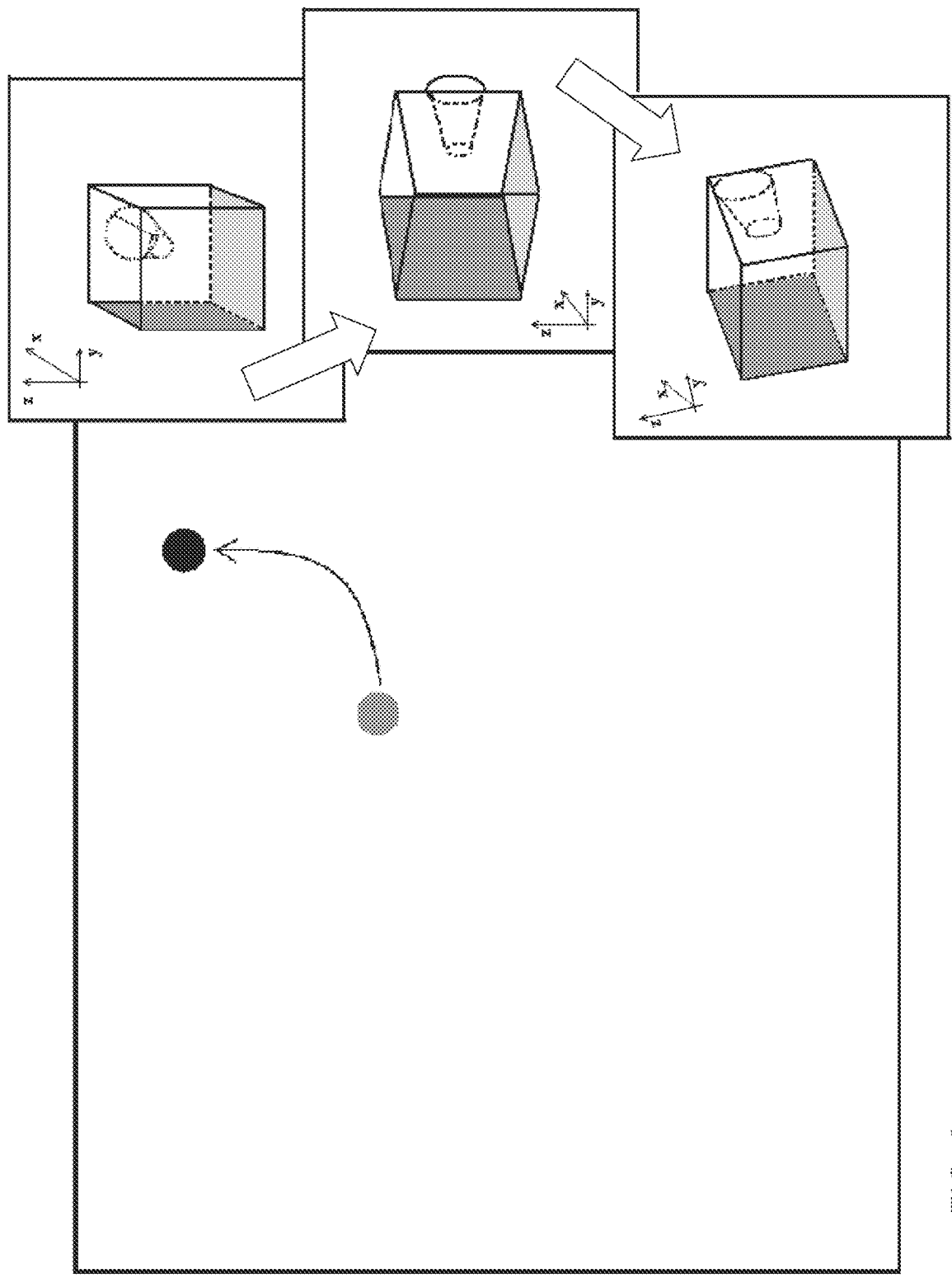
FIG. 8 is an example of a case of the invention's embodiment, showing the NICKING and LATERAL turning of the virtual view point in one consecutive one finger sliding action, with the virtual viewing direction and position of 'before' and 'after' doing the sliding action illustrated in the boxes on the side.
Figure 24B:
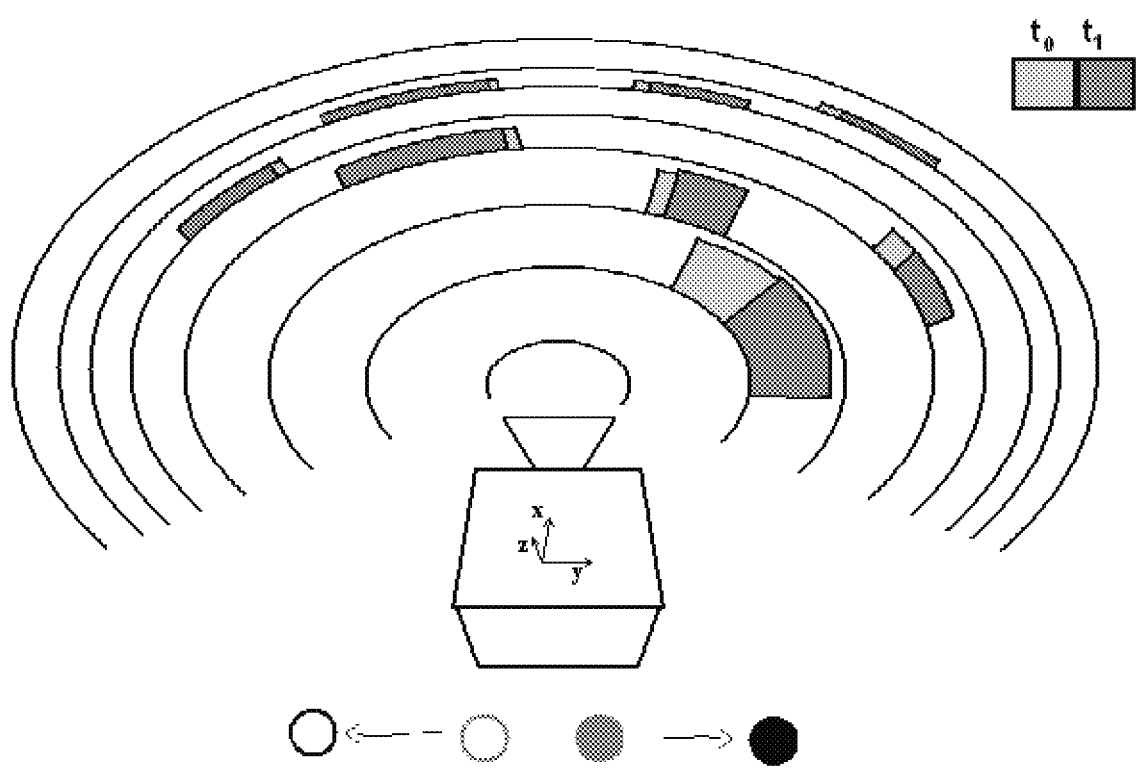
FIG. 24B is an illustration of the 3D parallax effect in accordance with the present invention, showing that at times when the virtual view point is shifting forward (x direction) (compare to FIG. 24A and FIG. 24C), the 2D imposters move against the viewer, with $t_0$ being the timestamp of beginning the movement and $t_1$ being the timestamp after some movement or at the finish or completion of the movement.
Figure 24C:
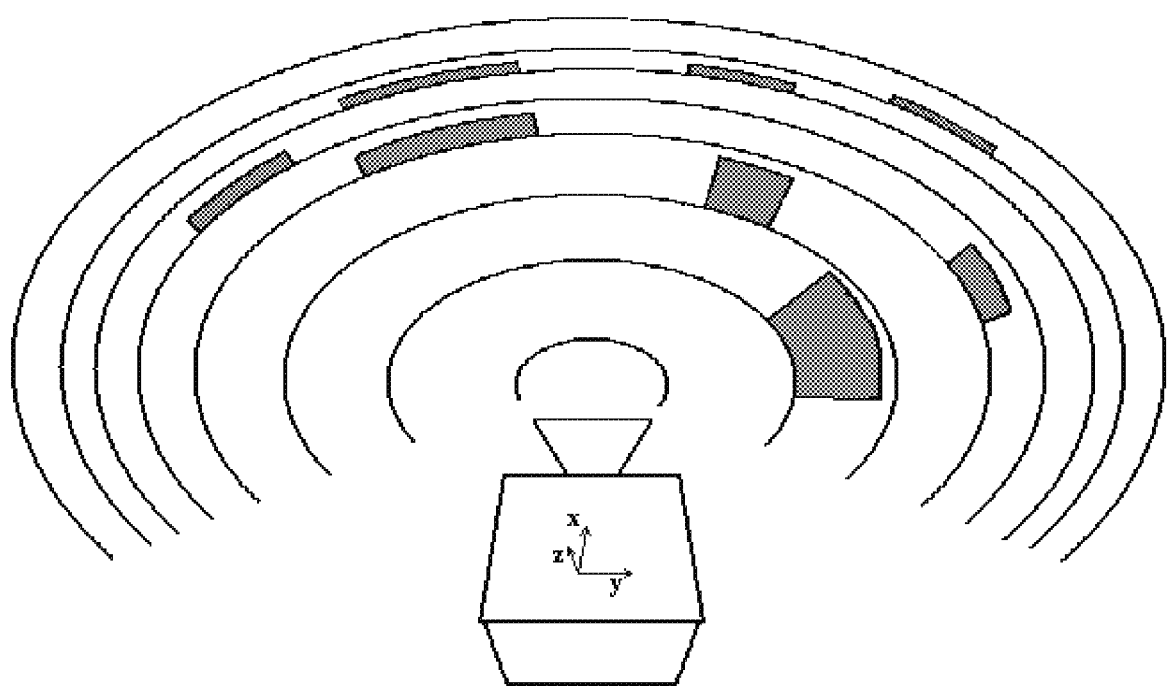
FIG. 24C is an illustration of the scenery as in the condition of $t_1$ according the timestamps of FIG. 24B (after movement)

FIG. 24B is an illustration of the 3D parallax effect in accordance with the present invention. At times when the virtual view point is shifting forward (such as in the x direction), and as can be seen with reference to FIGS. 24A and 24C, the 2D imposters move relative to the viewer. The close imposter moves further and respectively faster as the imposters in the background, and the ones in front move less than those at the side. The imposter may grow when they advance and shrink when they get more distant. In the illustrated example, the virtual move forward may be manually controlled by a touch screen sliding command (such as discussed above and such as shown in FIG. 7), but may also or otherwise be automated by the system or may move because the viewer has moved his or her head forward and this movement was captured by a head/eye tracking system which controls the scenery movement online in all three dimension to provide the 3D parallax effect to the viewer within the 2D display. The $t_0$ timestamp is the timestamp of beginning the movement and the $t_1$ timestamp is the timestamp after movement or at the finish of the movement. FIG. 24C illustrates the scenery in the condition of the time $t_1$ of FIG. 24B (after movement or after completion of the movement).

An entry area or preferably the (flexible) screen (underneath) may incorporate pad or needle actuators which preferably act in an orthogonal direction for providing an active haptic feedback to inputs of the driver or to actively form structural content that is haptically perceptible or conceptual such as the likes of (soft-) buttons or borderlines. The haptic feedback input may comprise any suitable haptic feedback, such as, for example, a "popping in" or depression of a soft button surface such as shown in FIGS. 3D and 3E. The structural area may comprise one or several actuators. The haptic conceivable embossed structure may also be capable of virtually moving over the screen, such as in the form of a transverse wave or the like, by employing actuator needles in the direct neighborhood or region at which the embossed structure shell virtually moves while releasing actuators in the back end of the virtual structure. Examples of haptic feedback systems and actuators are disclosed in U.S. Publication No. US-2009-0244017, German Pat. No. DE102004037644, and International Publication No. WO 2009/117632 (which are hereby incorporated herein by reference in their entireties).

In the present inventions a solution of the actuator materials is provided. There are three materials within the range of choice:

Electroactive Polymers (EAPs);
(Electro-)Pneumatic Artificial Muscles (E-PAMs);
Carbon Nanotube Muscles (CNMs); and/or
Embedded coils.

An EAP named Vivitouch® (distributed by Artificial Muscle Inc.) is suggested to become used in vehicle control panels and mobile computing on their website: http://www.artificialmuscle.com/technology.php.

Figure 3B:
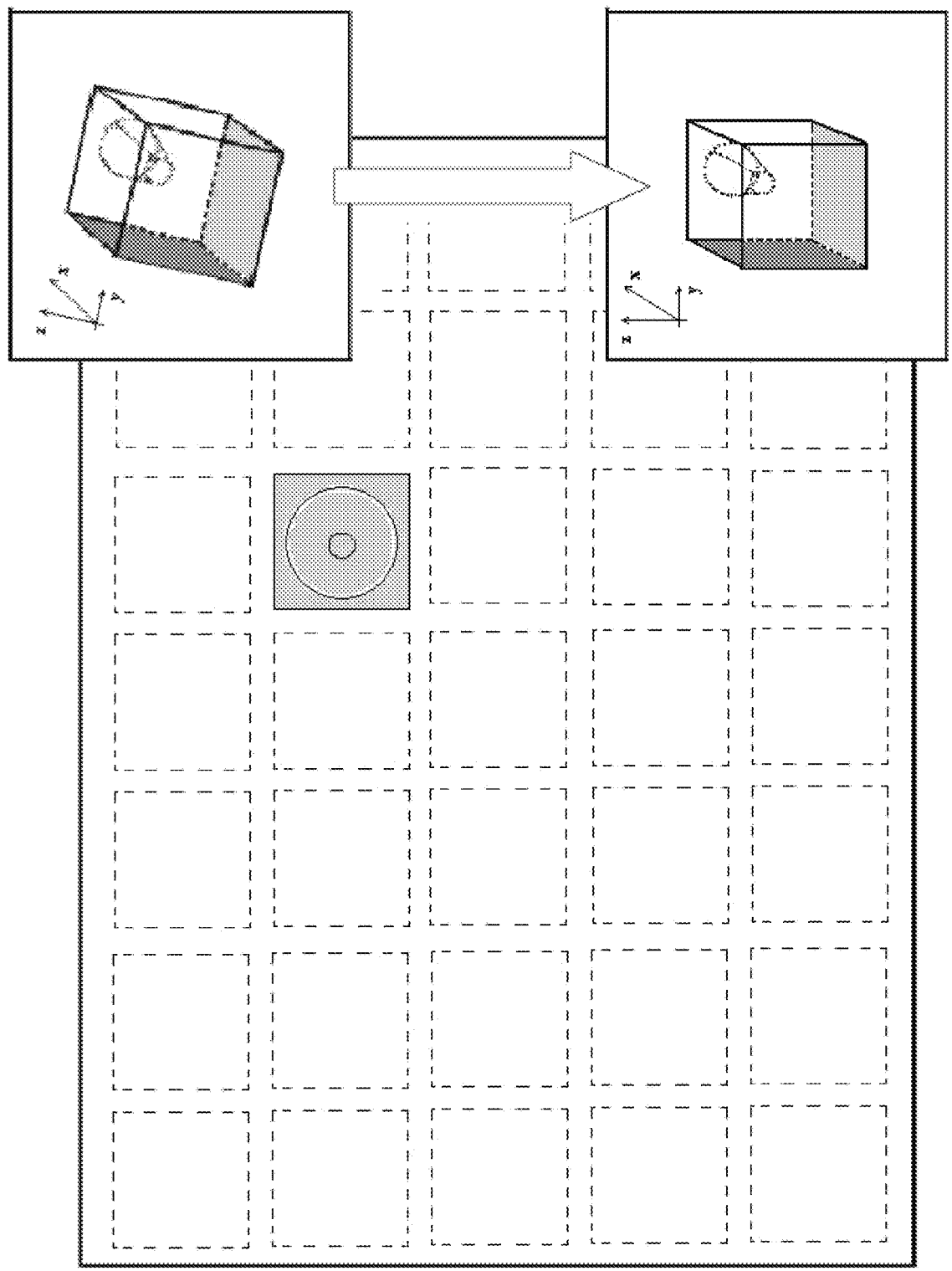
FIG. 3B is a schematic of a screen of the present invention, showing an activation of a feedback actuator pad at the position where the touch activity has occurred, with the screen having a relatively low resolution of grid of actuators for clarity.
Figure 3C:
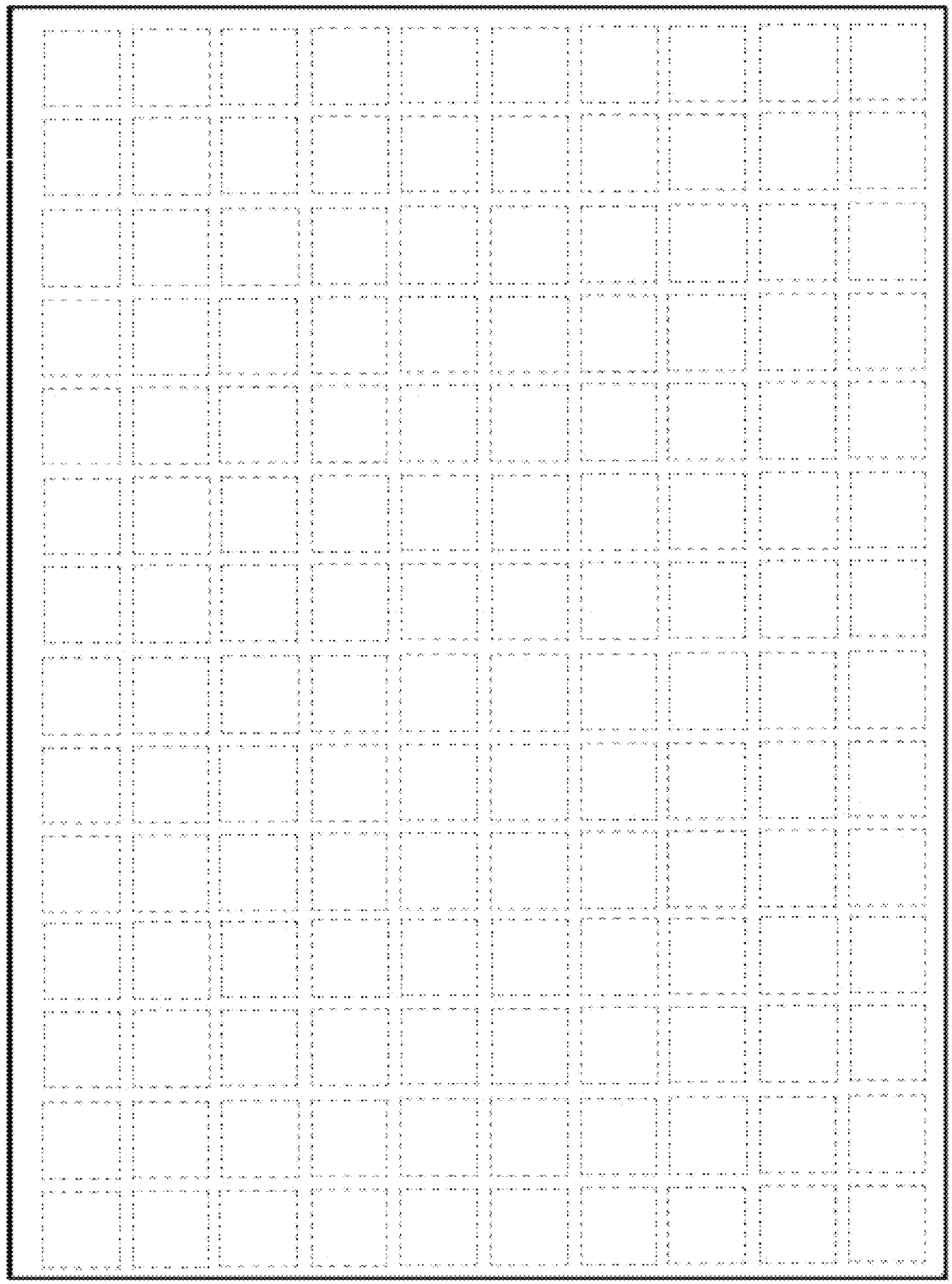
FIG. 3C is a schematic of a screen of the present invention, showing a feedback actuator pad having a higher resolution as compared to the screen of FIG. 3B.
Figure 3D:
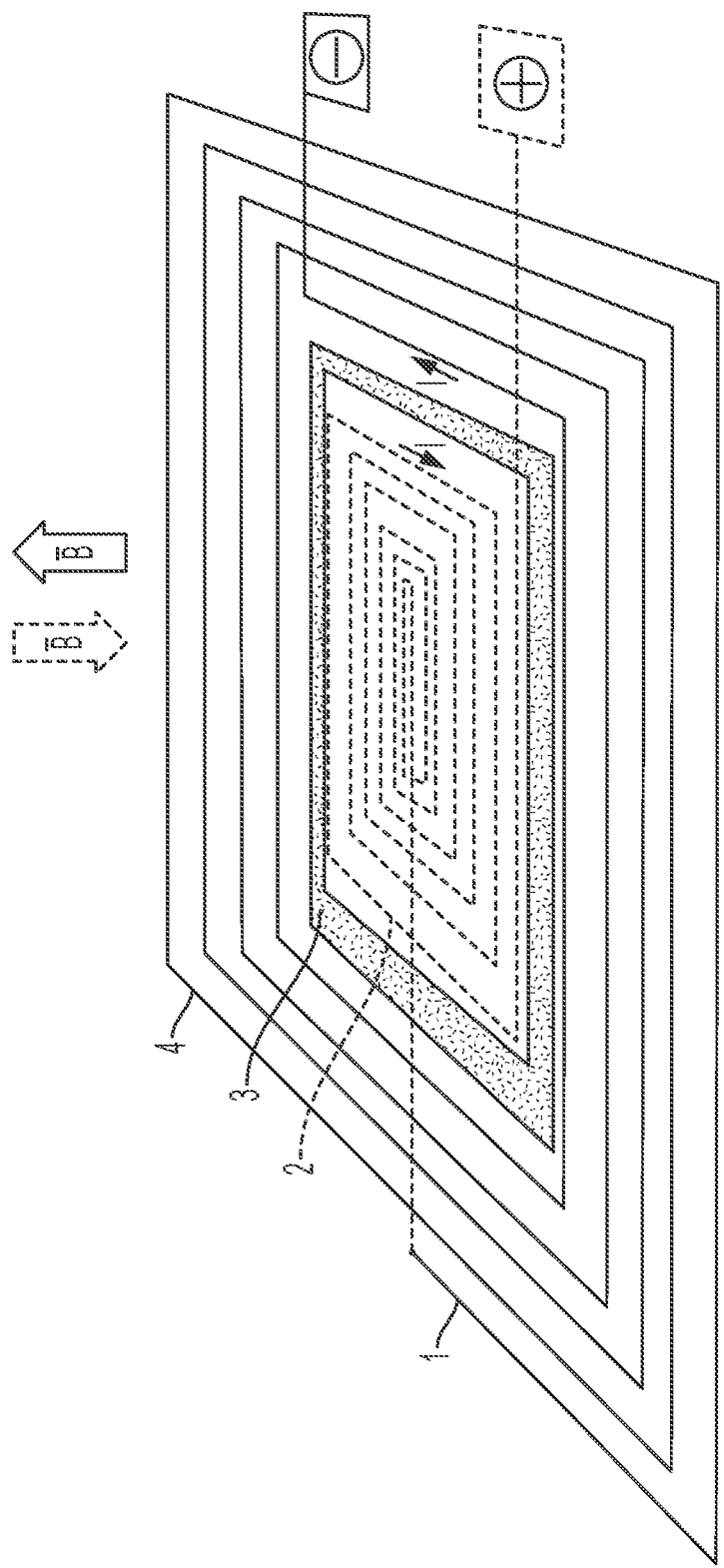
FIG. 3D is a perspective view schematic of a pad actuator, when a current is applied.
Figure 3E:
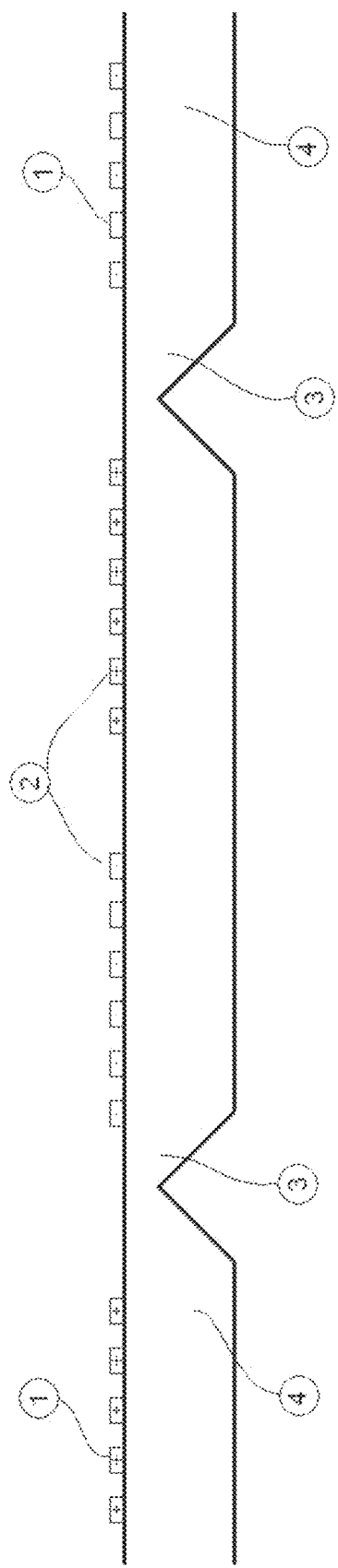
FIG. 3E is a sectional view of the pad actuator of FIG. 3D, showing the inner coil (2) acting against the outer coil (1), which leads to an opposing force.
Figure 3F:
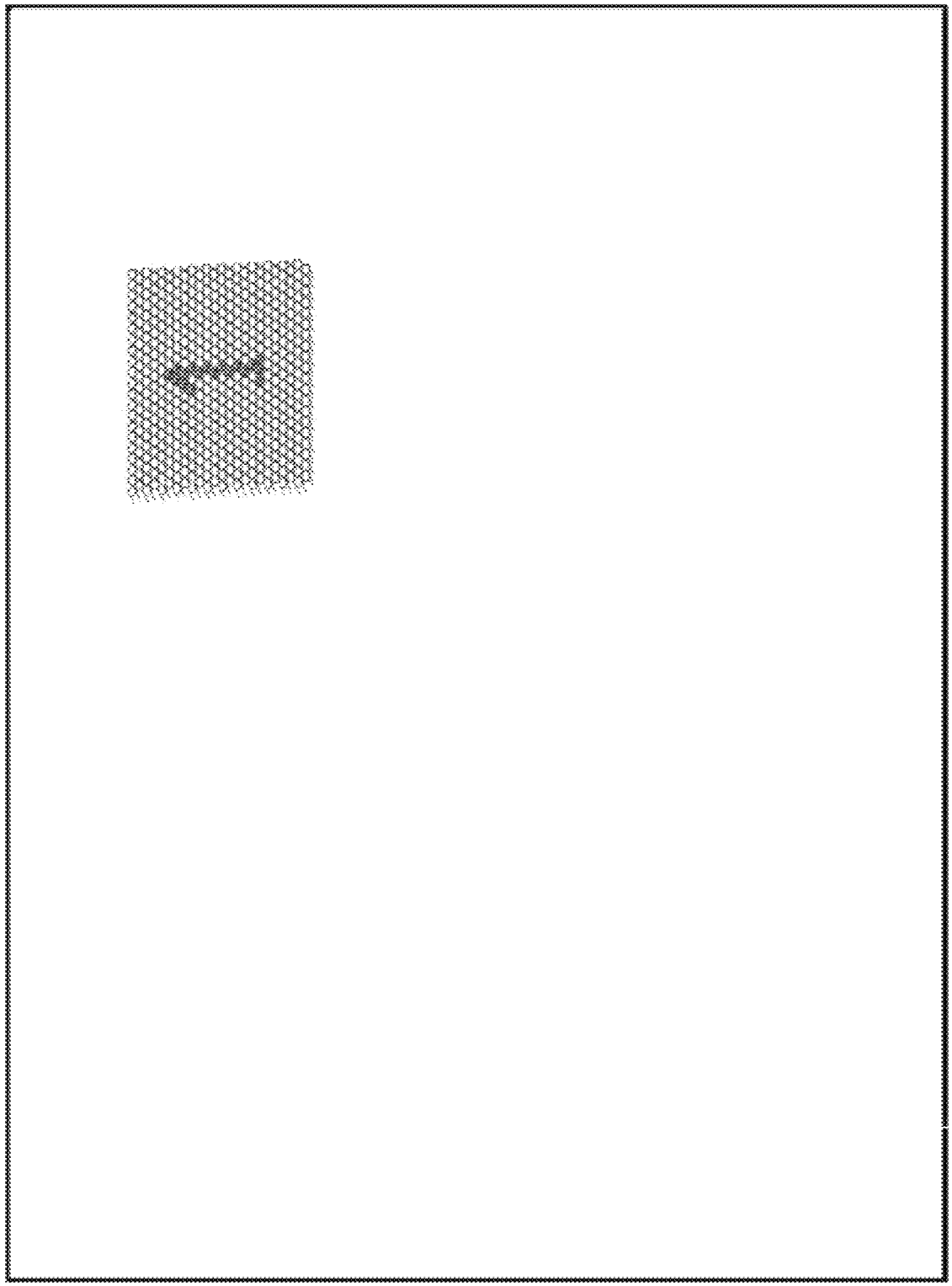
FIG. 3F is a plan view of a screen showing a touch region or "soft button" that has haptic feedback actuator needles that extend so that the button protrudes out of the plane of its surroundings.
Figure 3G:
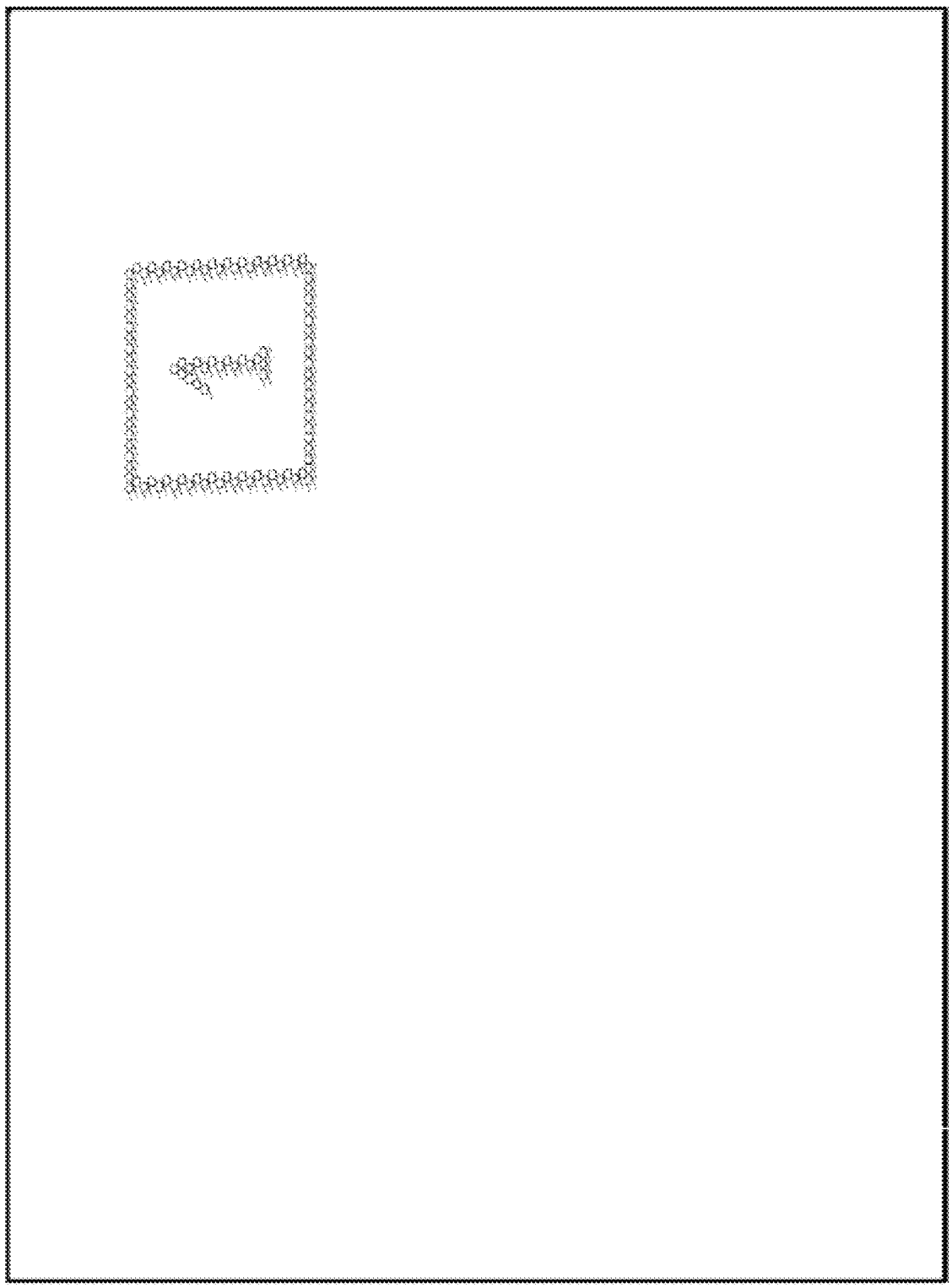
FIG. 3G is a plan view of the screen of FIG. 3F, showing the button's structure as an inverted structure, which may occur when the user actuates the touch region so that it feels like the button is depressed by the applied touching force.

The present invention may utilize (E-)PAMs to actuate single needle (-like) actuators, such as shown in FIGS. 3F and 3G, or in pad (-like) actuators, such as shown in FIGS. 3B and 3C. For reaching a feasible longitudinal actuation range (such as about 1 mm or thereabouts) and/or force, the (E-)PAMs may be packed into a stack.

As soon as the feedback actuator density reaches a comparably high level, the touchable structures can become displayed in the haptic sense. In the example shown in FIG. 3F, a soft button or touch region is structurally formed by the haptic (feedback) actuator needles, such that the button emerges out of the level of its surroundings within the pad. In this way, the touch region or button is haptically experienceable and discernible. As a reaction to a touch detection at the soft button's surface, and such as shown in FIG. 3F, the button's structure may be changed to an inverted structure. Such an inverted structure may feel to the user as if the button popped in or depressed by the applied touching force.

Figure 25:
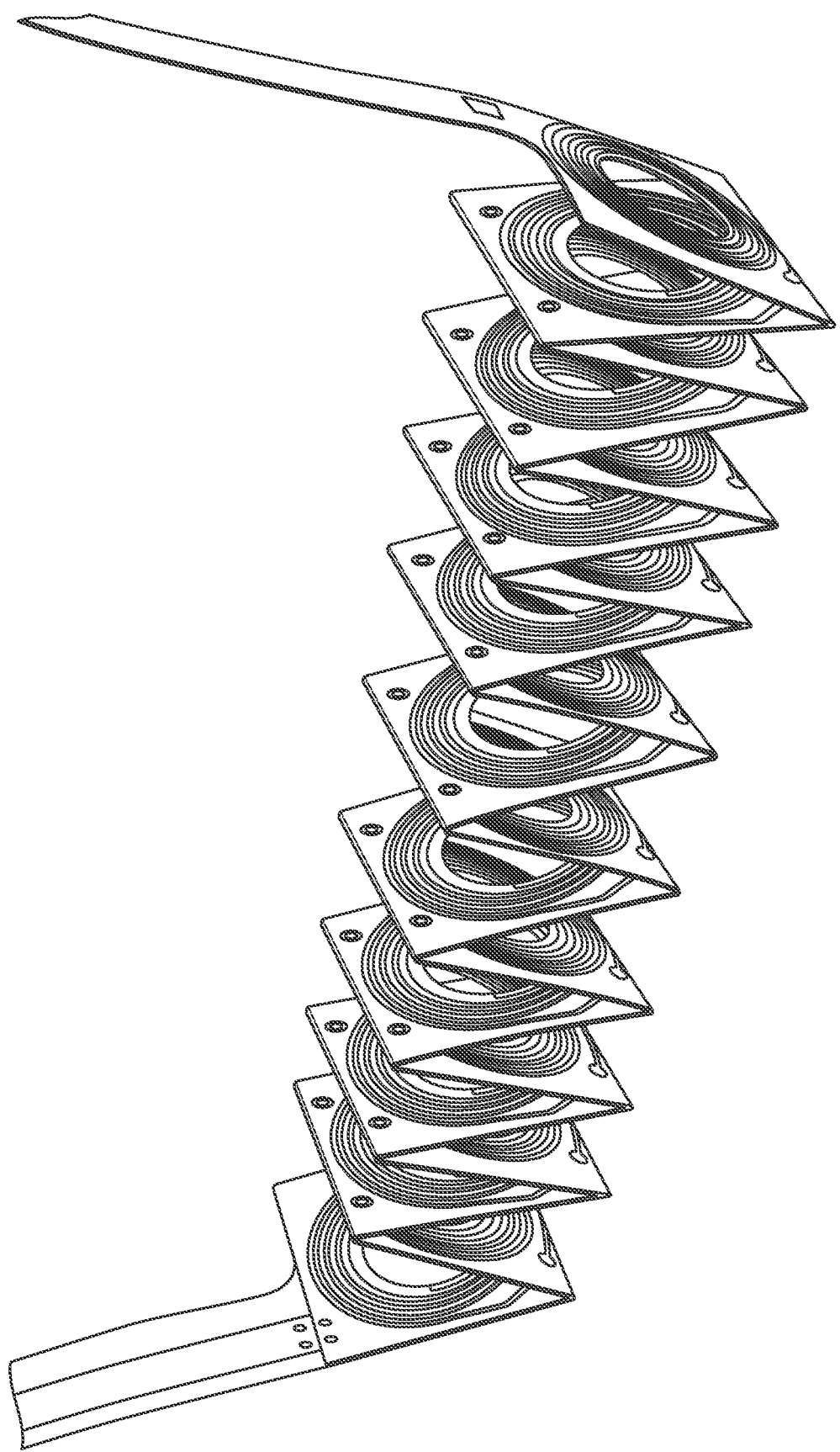
FIG. 25 shows a coil having several layers made with Faltflex® produced by Würth Elektronik GmbH & Co. KG, Germany.
Figure 26:
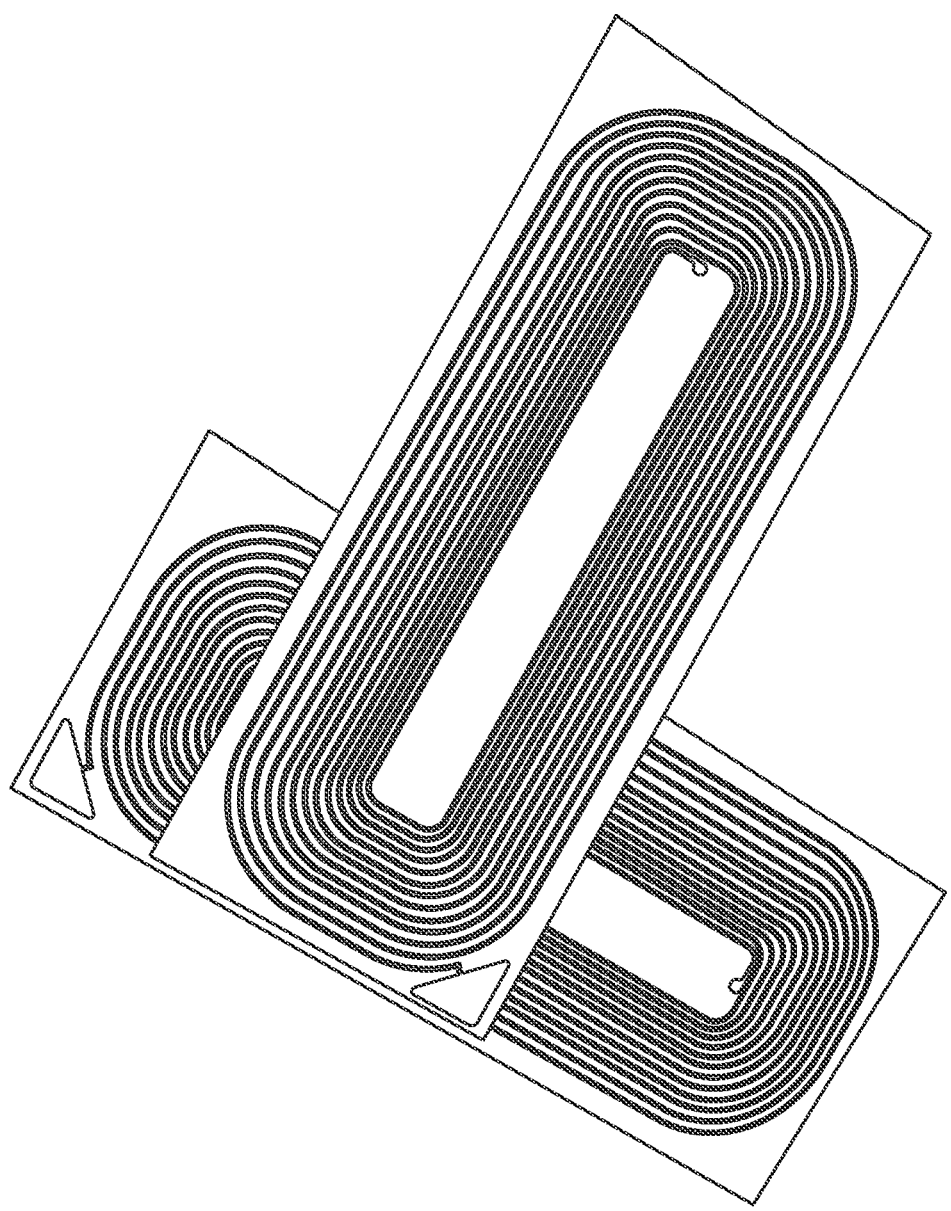
FIG. 26 shows a PCB integrated coil produced by Würth Elektronik GmbH & Co. KG, Germany.

When using embedded coils, a force outward or inward can be applied in the region of one coil pair such as can be seen in FIGS. 3D and 3E. The material of region (4) may be relatively stiff (lightest gray) compared to the material in region (3), which enables a limited elastic popping in or out of the area of the inner coil. When applying a static current, the magnetic field with the strength B ($\mu \times H$) of the inner coil acts orthogonal to the magnetic field with another the strength B of the outer coil which causes a transversal force from one coil to the other. Since the inner coil area is movable within the elastically material's limits it becomes pressed outward counter wise the immobile outer coil. By applying an AC current a vibration can be generated. The coils may be printed to a foil in front (of a stiff display) or behind or integrated (in an elastic display) or onto a dedicated touch area. The coils may have several layers (FIG. 25) or may be integrated to a PCB (FIG. 26), such as like with Faltflex® produced by \Mirth Elektronik GmbH & Co. KG, Germany. Alternatively to having a pair of coils there may be just one coil surrounding an area having a high permeable particles as like ferrites ($\mu_r:=4.15000$) or diamagnetic particles as like Copper ($0 \leq \mu_r < 1$) both for resulting the inner area tending to escape the inducting magnetic field, applying a force outward. The particles may become printed sputtered onto or molded into the carrying (partially elastic) substrate.

Figure 3H:
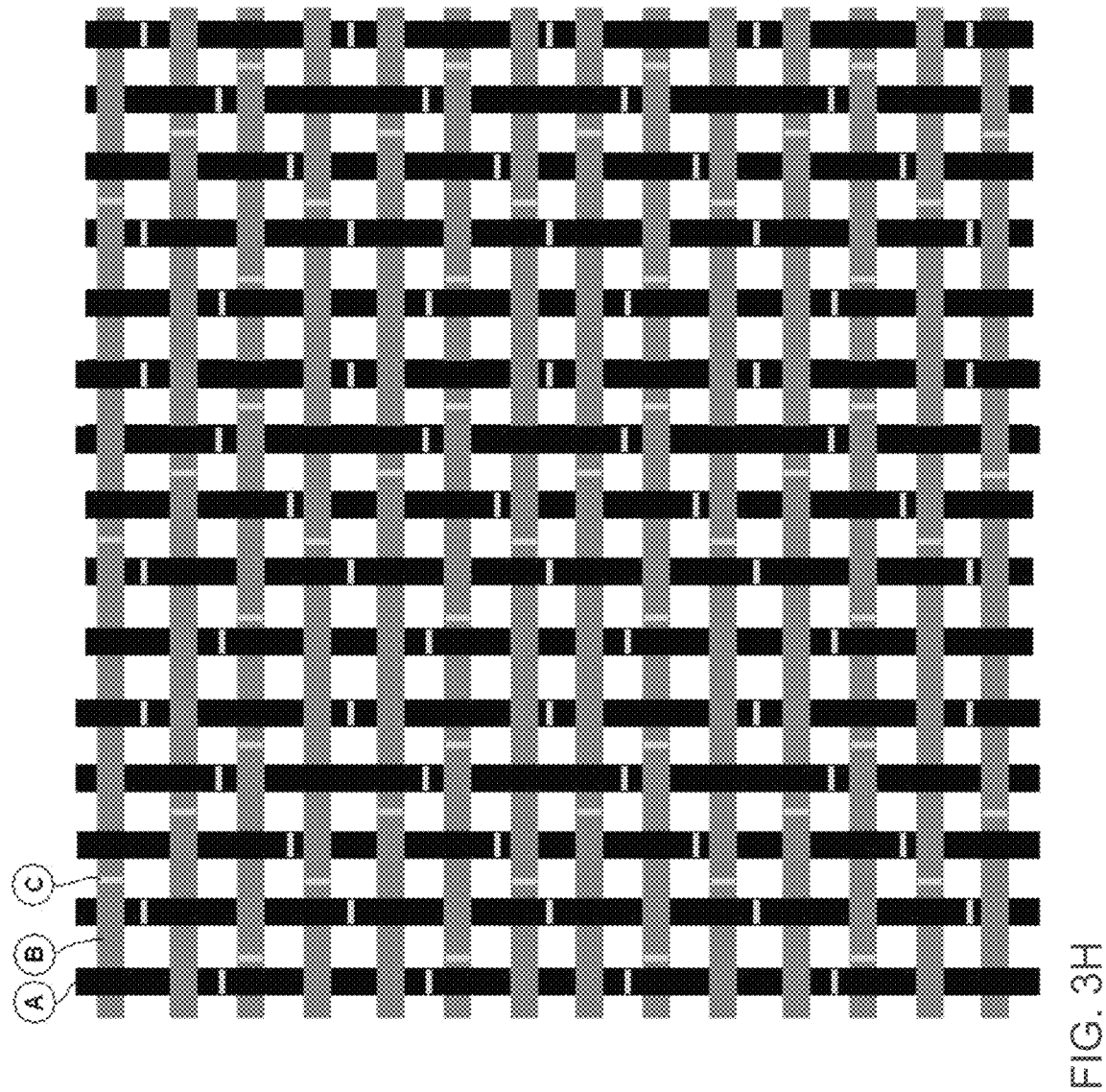
FIG. 3H is a schematic of a touch screen actuator pad of the present invention, utilizing CNMs actuator strings set up in a staggered meshwork when no muscle actuation is controlled.
Figure 31:
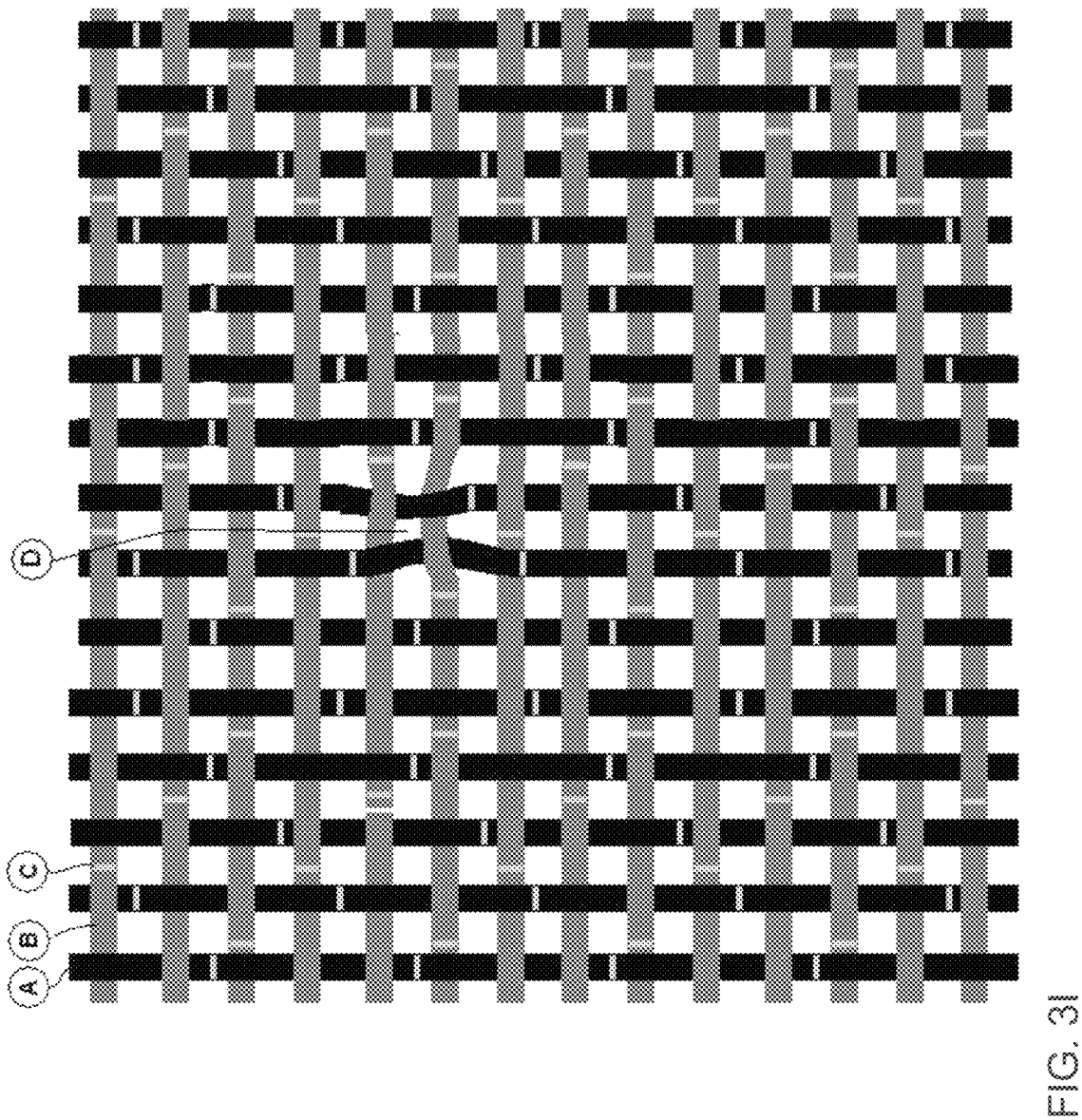

When using EAPs or CNMs, the actuator pad may consist of actuator strings set up in a meshwork in which the strings are weaved into one another in a primarily two dimensional extension. FIG. 3H shows an example according to the present invention that has a touch screen actuator pad utilizing CNMs actuator strings set up in a staggered meshwork when no muscle actuation is controlled. As shown in FIG. 3H, the gray colored muscle strings B act horizontally and the black colored muscle strings A act vertically. The fixation points C of the muscle sections are where the muscle sections are fixed or attached at or to the screen.

To apply force at a specific spot, the strings (both the horizontal and the vertical strings) in a direct neighborhood or region are controlled in concert (see FIG. 3I). When actuated, the actuators shorten, in that way the fixation points become pulled towards one another. As shown in FIGS. 3I and 3J, when the muscles in region D are controlled to actuation, the screen bends outbound in that region. As best shown in FIG. 3J, the screen E bends outbound or outward generally orthogonal to the A-B plane in that region. A force F is applied in that orthogonal direction. In the schematic of FIG. 3J, the screen's surface is implied or shown as a grid E, but it would comprise a continuous surface in an actual embodiment, and the fixation points are shown at C, with the horizontal actuator strings B shown as dark gray and the vertical actuator strings A shown as light gray.

When actuated, the screen material flexes or pops out or protrudes (see FIG. 3J) or applies a force in the orthogonal direction to the actuator strings. When popping out is inhibited (such as, for example, when a finger of a user sets on that spot of the screen), the applied force, by a reaction (in force) by the screen, becomes receptivable or perceptible or discernible to the user. The actuator strings of the screen of the present invention are preferably staggered relative to one another, which enables the screen's outbounding force to be applied equally, such as is shown schematically in FIGS. 3H-J.

Therefore, the present invention provides a vehicle vision system that allows a user to manually select and control the display of a top down or surround view image or images to provide a desired view at the display of the vehicle, such as to assist the driver of the vehicle in reversing the vehicle or parking the vehicle or the like. The vision system includes a touch screen that is accessible and usable by the driver of the vehicle to adjust the displayed images (such as a virtual view point, virtual viewing angle, pan, zoom and/or the like) to provide a desired view to the driver of the vehicle. The vision system may provide information from other vehicle vision systems or other information sources, such as parking space information and the like, to assist the driver of the vehicle in finding an empty parking space and parking the vehicle in that space. Some of the information may be displayed or provided to the driver automatically. The vehicle vision system of the present invention thus provides enhanced display of information and images to the driver of the vehicle based on images captured by a plurality of cameras or image sensors of the vehicle and having exterior fields of view, such as forwardly, rearwardly and sidewardly of the vehicle.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The camera or imager or imaging sensor may comprise any suitable camera or imager or sensor. Optionally, the camera may comprise a "smart camera" that includes the imaging sensor array and associated circuitry and image processing circuitry and electrical connectors and the like as part of a camera module, such as by utilizing aspects of the vision systems described in PCT Application No. PCT/US2012/066571, filed Nov. 27, 2012, and published on Jun. 6, 2013 as International Publication No. WO 2013/081985, which is hereby incorporated herein by reference in its entirety.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, an array of a plurality of photosensor elements arranged in at least about 640 columns and 480 rows (at least about a 640×480 imaging array), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data. For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, PCT Application No. PCT/US2010/047256, filed Aug. 31, 2010 and published Mar. 10, 2011 as International Publication No. WO 2011/028686 and/or International Publication No. WO 2010/099416, published Sep. 2, 2010, and/or PCT Application No. PCT/US10/25545, filed Feb. 26, 2010 and published Sep. 2, 2010 as International Publication No. WO 2010/099416, and/or PCT Application No. PCT/US2012/048800, filed Jul. 30, 2012, and published on Feb. 7, 2013 as International Publication No. WO 2013/019707, and/or PCT Application No. PCT/US2012/048110, filed Jul. 25, 2012, and published on Jan. 31, 2013 as International Publication No. WO 2013/016409, and/or PCT Application No. PCT/CA2012/000378, filed Apr. 25, 2012, and published Nov. 1, 2012 as International Publication No. WO 2012/145822, and/or PCT Application No. PCT/US2012/056014, filed Sep. 19, 2012, and published Mar. 28, 2013 as International Publication No. WO 2013/043661, and/or PCT Application No. PCT/US12/57007, filed Sep. 25, 2012, and published on Apr. 4, 2013 as International Publication No. WO 2013/048994, and/or PCT Application No. PCT/US2012/061548, filed Oct. 24, 2012, and published on May 2, 2013 as International Publication No. WO 2013/063014, and/or PCT Application No. PCT/US2012/062906, filed Nov. 1, 2012, and published on May 10, 2013 as International Publication No. WO 2013/067083, and/or PCT Application No. PCT/US2012/063520, filed Nov. 5, 2012, and published on May 16, 2013 as International Publication No. WO 2013/070539, and/or PCT Application No. PCT/US2012/064980, filed Nov. 14, 2012, and published May 23, 2013 as International Publication No. WO 2013/074604, and/or PCT Application No. PCT/US2012/066570, filed Nov. 27, 2012, and published on Jun. 6, 2013 as International Publication No. WO 2013/081984, and/or PCT Application No. PCT/US2012/066571, filed Nov. 27, 2012, and published on Jun. 6, 2013 as International Publication No. WO 2013/081985, and/or PCT Application No. PCT/US2012/068331, filed Dec. 7, 2012, and published Jun. 13, 2013 as International Publication No. WO 2013/086249, and/or PCT Application No. PCT/US2012/071219, filed Dec. 21, 2012, and published on Jul. 11, 2013 as International Publication No. WO 2013/103548, and/or U.S. patent application Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012, and published on Jan. 3, 2013 as U.S. Patent Publication No. US-2013-0002873, and/or U.S. provisional applications, Ser. No. 61/736,104, filed Dec. 12, 2012; Ser. No. 61/736,103, filed Dec. 12, 2012; Ser. No. 61/735,314, filed Dec. 10, 2012; Ser. No. 61/734,457, filed Dec. 7, 2012; Ser. No. 61/733,598, filed Dec. 5, 2012; Ser. No. 61/733,093, filed Dec. 4, 2012; Ser. No. 61/727,912, filed Nov. 19, 2012; Ser. No. 61/727,911, filed Nov. 19, 2012; Ser. No. 61/727,910, filed Nov. 19, 2012; Ser. No. 61/718,382, filed Oct. 25, 2012; Ser. No. 61/710,924, filed Oct. 8, 2012; Ser. No. 61/696,416, filed Sep. 4, 2012; Ser. No. 61/682,995, filed Aug. 14, 2012; Ser. No. 61/682,486, filed Aug. 13, 2012; Ser. No. 61/680,883, filed Aug. 8, 2012; Ser. No. 61/676,405, filed Jul. 27, 2012; Ser. No. 61/666,146, filed Jun. 29, 2012; Ser. No. 61/648,744, filed May 18, 2012; Ser. No. 61/624,507, filed Apr. 16, 2012; Ser. No. 61/616,126, filed Mar. 27, 2012; Ser. No. 61/615,410, filed Mar. 26, 2012; Ser. No. 61/613,651, filed Mar. 21, 2012; Ser. No. 61/607,229, filed Mar. 6, 2012; Ser. No. 61/602,876, filed Feb. 24, 2012; Ser. No. 61/600,205, filed Feb. 17, 2012, which are all hereby incorporated herein by reference in their entireties. The system may communicate with other communication systems via any suitable means, such as by utilizing aspects of the systems described in PCT Application No. PCT/US10/038477, filed Jun. 14, 2010, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, and/or U.S. patent application Ser. No. 12/508,840, filed Jul. 24, 2009, and published Jan. 28, 2010 as U.S. Pat. Publication No. US 2010-0020170, and/or PCT Application No. PCT/US2012/048110, filed Jul. 25, 2012, and published on Jan. 31, 2013 as International Publication No. WO 2013/016409, and/or U.S. patent application Ser. No. 13/534,657, filed Jun. 27, 2012, and published Jan. 3, 2013 as U.S. Patent Publication No. US-2013-0002873, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361, and/or Ser. No. 13/260,400, filed Sep. 26, 2011, now U.S. Pat. No. 8,542,451, and/or 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; and/or 7,720,580, and/or U.S. patent application Ser. No. 10/534,632, filed May 11, 2005, now U.S. Pat. No. 7,965,336; and/or PCT Application No. PCT/US2008/076022, filed Sep. 11, 2008 and published Mar. 19, 2009 as International Publication No. WO 2009/036176, and/or PCT Application No. PCT/US2008/078700, filed Oct. 3, 2008 and published Apr. 9, 2009 as International Publication No. WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US2011/062834, filed Dec. 1, 2011 and published Jun. 7, 2012 as International Publication No. WO 2012/075250, and/or PCT Application No. PCT/US2012/048993, filed Jul. 31, 2012, and published Feb. 7, 2013 as International Publication No. WO 2013/019795, and/or PCT Application No. PCT/US11/62755, filed Dec. 1, 2011 and published Jun. 7, 2012 as International Publication No. WO 2012-075250, and/or PCT Application No. PCT/CA2012/000378, filed Apr. 25, 2012, and published Nov. 1, 2012 as International Publication No. WO 2012/145822, and/or PCT Application No. PCT/US2012/066571, filed Nov. 27, 2012, and published on Jun. 6, 2013 as International Publication No. WO 2013/081985, and/or U.S. patent application Ser. No. 13/333,337, filed Dec. 21, 2011, now U.S. Pat. No. 9,264,672, and/or U.S. provisional applications, Ser. No. 61/615,410, filed Mar. 26, 2012, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular vision system comprising:
a plurality of cameras disposed at a vehicle equipped with the vehicular vision system and having respective exterior fields of view, the plurality of cameras comprising a forward viewing camera having at least a forward field of view, a rearward viewing camera having at least a rearward field of view, a driver-side sideward viewing camera at a driver side of the equipped vehicle and having at least a sideward field of view, and a passenger-side sideward viewing camera at a passenger side of the equipped vehicle and having at least a sideward field of view;
a display screen for displaying video images derived from image data captured by the plurality of cameras in a surround view format where image data captured by the plurality of cameras is merged to provide a single composite display image representative of a view from a virtual viewing position;
a control comprising a processor for processing image data captured by the plurality of cameras;
wherein the control, responsive to processing at the control of image data captured by the plurality of cameras, detects an object present in the field of view of at least one camera of the plurality of cameras;
wherein, during a driving maneuver of the equipped vehicle, the display screen displays surround view video images derived from image data captured by the plurality of cameras;
wherein, during the driving maneuver of the equipped vehicle, and at least in part responsive to processing at the control of image data captured by the plurality of cameras, the control determines that the detected object constitutes a potential hazard;
wherein, during the driving maneuver of the equipped vehicle, and responsive to detection by the control of the object present in the field of view of the at least one camera, and responsive to the control determining that the detected object constitutes a potential hazard, the display screen displays an enlarged view of the detected potentially hazardous object; and
wherein, during the driving maneuver of the equipped vehicle, the display screen displays the enlarged view of the detected potentially hazardous object while also continuing to display the surround view video images including a non-enlarged view of the detected potentially hazardous object.

2. The vehicular vision system of claim 1, wherein the vehicular vision system, responsive to detection by the control of the object, and responsive to the control determining that the detected object constitutes a potential hazard, centers the virtual viewing position on the detected potentially hazardous object.

3. The vehicular vision system of claim 1, wherein the vehicular vision system, responsive to detection by the control of the object, and responsive to the control determining that the detected object constitutes a potential hazard, displays multiple images in a split screen format.

4. The vehicular vision system of claim 3, wherein the displayed multiple images comprises at least two displayed images of the detected potentially hazardous object.

5. The vehicular vision system of claim 1, wherein the display screen displays the enlarged view of the detected potentially hazardous object and the surround view video images in a split screen format.

6. The vehicular vision system of claim 1, wherein the vehicular vision system, responsive to detection by the control of the object, and responsive to the control determining that the detected object constitutes a potential hazard, displays an overlay at the displayed detected potentially hazardous object.

7. The vehicular vision system of claim 1, wherein the vehicular vision system, responsive to detection by the control of the object, and responsive to the control determining that the detected object constitutes a potential hazard, highlights the detected potentially hazardous object via a color change in the displayed images of the detected potentially hazardous object.

8. The vehicular vision system of claim 1, wherein the control, responsive to processing at the control of image data captured by the plurality of cameras, detects a plurality of objects, and wherein the display screen, responsive to detection by the control of the plurality of objects, and responsive to the control determining that the detected objects constitute a plurality of potential hazards, displays the plurality of detected potentially hazardous objects in separate respective enlarged views of the respective detected potentially hazardous objects.

9. The vehicular vision system of claim 1, comprising a gesture sensing device operable to sense a gesture made by a driver of the equipped vehicle, wherein, responsive at least in part to determination, via the gesture sensing device, of a gesture made by the driver, the control adjusts at least one selected from the group consisting of (i) the virtual viewing position for the displayed composite image and (ii) a virtual viewing angle of the displayed composite image from the virtual viewing position.

10. The vehicular vision system of claim 9, wherein the control calculates the virtual viewing position or the virtual viewing angle in real time without use of precalculated mapping tables.

11. The vehicular vision system of claim 9, wherein the control adjusts the displayed images responsive to detection by the gesture sensing device of one or more fingers of a hand of the driver touching and moving at a touch screen of the gesture sensing device.

12. The vehicular vision system of claim 9, wherein the gesture sensing device comprises at least one of (i) a time of flight sensor, (ii) at least one camera having a field of view interior of the equipped vehicle, (iii) a single camera having a field of view interior of the equipped vehicle and comprising motion disparity detection, and (iv) two cameras having fields of view interior of the equipped vehicle and comprising stereo camera disparity detection.

13. The vehicular vision system of claim 9, wherein, responsive to a determination by the gesture sensing device of a head movement made by the driver of the equipped vehicle, the control adjusts a virtual viewing location of the displayed images.

14. A vehicular vision system comprising:
at least one camera disposed at a vehicle equipped with the vehicular vision system and having a respective exterior field of view, the at least one camera comprising a rearward viewing camera having at least a rearward field of view;
a display screen for displaying video images derived from image data captured by the at least one camera;

a control comprising a processor for processing image data captured by the at least one camera;

wherein the control, responsive to processing at the control of image data captured by the at least one camera, detects an object present in the field of view of the at least one camera;

wherein, during a reverse driving maneuver of the equipped vehicle, the display screen displays rearward view video images derived from image data captured by the at least one camera;

wherein, during the driving maneuver of the equipped vehicle, and at least in part responsive to processing at the control of image data captured by the at least one camera, the control determines that the detected object constitutes a potential hazard;

wherein, during the reverse driving maneuver of the equipped vehicle, and responsive to detection by the control of the object present in the field of view of the at least one camera, and responsive to the control determining that the detected object constitutes a potential hazard, the display screen displays in a split screen format (i) an enlarged view of the detected potentially hazardous object and (ii) the rearward view video images; and wherein, during the driving maneuver of the equipped vehicle, the display screen displays the enlarged view of the detected potentially hazardous object while also continuing to display the rearward view video images including a non-enlarged view of the detected potentially hazardous object.

15. The vehicular vision system of claim 14, wherein the vehicular vision system, responsive to detection by the control of the object, and responsive to the control determining that the detected object constitutes a potential hazard, centers a virtual viewing position on the detected potentially hazardous object.

16. The vehicular vision system of claim 14, wherein the vehicular vision system, responsive to detection by the control of the object, and responsive to the control determining that the detected object constitutes a potential hazard, displays an overlay at the displayed images of the detected potentially hazardous object.

17. The vehicular vision system of claim 14, wherein the control, responsive to processing at the control of image data captured by the at least one camera, detects a plurality of objects, and wherein the display screen, responsive to detection by the control of the plurality of objects, and responsive to the control determining that the detected objects constitute a plurality of potential hazards, displays the plurality of detected potentially hazardous objects in separate respective enlarged views of the respective detected potentially hazardous objects.

18. A vehicular vision system comprising:

a plurality of cameras disposed at a vehicle equipped with the vehicular vision system and having respective exterior fields of view, the plurality of cameras comprising a forward viewing camera having at least a forward field of view, a rearward viewing camera having at least a rearward field of view, a driver-side sideward viewing camera at a driver side of the equipped vehicle and having at least a sideward field of view, and a passenger-side sideward viewing camera at a passenger side of the equipped vehicle and having at least a sideward field of view;

a display screen for displaying video images derived from image data captured by the plurality of cameras in a surround view format where image data captured by the plurality of cameras is merged to provide a single composite display image representative of a view from a virtual viewing position;

a control comprising a processor for processing image data captured by the plurality of cameras;

wherein the control, responsive to processing at the control of image data captured by the plurality of cameras, detects an object present in the field of view of at least one camera of the plurality of cameras;

wherein, during a driving maneuver of the equipped vehicle, the display screen displays surround view video images derived from image data captured by the plurality of cameras;

wherein, during the driving maneuver of the equipped vehicle, and at least in part responsive to processing at the control of image data captured by the plurality of cameras, the control determines that the detected object constitutes a potential hazard;

wherein, during the driving maneuver of the equipped vehicle, and responsive to detection by the control of the object present in the field of view of the at least one camera, and responsive to the control determining that the detected object constitutes a potential hazard, the display screen displays multiple images in a split screen format, and wherein the displayed multiple images comprise at least the single composite display image and an enlarged view of the detected potentially hazardous object;

wherein, during the driving maneuver of the equipped vehicle, the display screen displays the enlarged view of the detected potentially hazardous object while also continuing to display the single composite display image including a non-enlarged view of the detected potentially hazardous object; and wherein the vehicular vision system, responsive to detection by the control of the object, and responsive to the control determining that the detected object constitutes a potential hazard, displays an overlay at the detected potentially hazardous object in at least one of the displayed multiple images.

19. The vehicular vision system of claim 18, wherein the control, responsive to processing at the control of image data captured by the plurality of cameras, detects a plurality of objects, and wherein the display screen, responsive to detection by the control of the plurality of objects, and responsive to the control determining that the detected objects constitute a plurality of potential hazards, displays the plurality of potentially hazardous objects in separate respective enlarged views of the respective detected potentially hazardous objects, and wherein the displayed multiple images comprise the single composite display image and the separate respective enlarged views of the respective detected potentially hazardous objects.

* * * * *

UNITED STATES PATENT AND TRADEMARK OFFICE
CERTIFICATE OF CORRECTION

PATENT NO. : 11,503,251 B2
APPLICATION NO. : 16/392036
DATED : November 15, 2022
INVENTOR(S) : Goerg Pflug et al.

It is certified that error appears in the above-identified patent and that said Letters Patent is hereby corrected as shown below:

In the Specification

Column 5
Line 14, "to" should be --$t_0$--

Column 15
Line 26, "to according" should be --$t_0$ according--

Signed and Sealed this
Thirteenth Day of December, 2022

Katherine Kelly Vidal
*Director of the United States Patent and Trademark Office*